United States Patent
Slater, Jr. et al.

(10) Patent No.: US 11,620,293 B2
(45) Date of Patent: Apr. 4, 2023

(54) MATCHING OF MULTIPLE SIDES WITH MULTIPLE LEVELS OF MIXED CREDIBILITY ATTRIBUTES

(71) Applicant: Metabyte, Inc., Fremont, CA (US)

(72) Inventors: Lynn Randolph Slater, Jr., Pleasanton, CA (US); Manu Mehta, Fremont, CA (US); Anjali Dayal, Pleasanton, CA (US); Saiba Singh, Pleasanton, CA (US); Nitin Mehta, Fremont, CA (US); Yiu Wan Lau, Pacheco, CA (US); Aradhana Mehta, Fremont, CA (US)

(73) Assignee: Metabyte, Inc.

( * ) Notice: Subject to any disclaimer, the term of this patent is extended or adjusted under 35 U.S.C. 154(b) by 0 days.

(21) Appl. No.: 16/600,517

(22) Filed: Oct. 13, 2019

(65) Prior Publication Data
US 2020/0117670 A1    Apr. 16, 2020

Related U.S. Application Data

(60) Provisional application No. 62/745,323, filed on Oct. 13, 2018.

(51) Int. Cl.
| | | |
|---|---|---|
| *G06F 16/2457* | (2019.01) | |
| *G06F 16/22* | (2019.01) | |
| *G06F 16/28* | (2019.01) | |
| *G06Q 10/10* | (2012.01) | |
| *G06Q 10/1053* | (2023.01) | |

(52) U.S. Cl.
CPC ...... *G06F 16/24578* (2019.01); *G06F 16/221* (2019.01); *G06F 16/2272* (2019.01); *G06F 16/24573* (2019.01); *G06F 16/282* (2019.01); *G06Q 10/1053* (2013.01)

(58) Field of Classification Search
CPC ......... G06F 16/24578; G06F 16/24573; G06F 16/221; G06F 16/2272; G06F 16/282
See application file for complete search history.

(56) References Cited

U.S. PATENT DOCUMENTS

| | | | |
|---|---|---|---|
| 2007/0022113 A1* | 1/2007 | Heino | G06Q 30/00 |
| 2008/0027747 A1* | 1/2008 | McGovern | G06Q 10/1053 705/321 |
| 2008/0243682 A1 | 10/2008 | Shavit et al. | |
| 2017/0287212 A1 | 10/2017 | Tran et al. | |

* cited by examiner

*Primary Examiner* — Brittany N Allen
*Assistant Examiner* — William P Bartlett
(74) *Attorney, Agent, or Firm* — Ashok Tankha

(57) ABSTRACT

A method and a multi-directional attribute matching system (MAMS) determining a degree of match between item profiles with respective attributes possessed (AP) and respective attributes needed (AN) of varying credibility and varying importance are provided. The MAMS receives an attributes possessed list including the AP and an attributes needed list including the AN, from a predefined attribute list database. The AP and the AN have parent attributes or hierarchical sub-attributes. The MAMS merges multiple occurrences of AP and inputs to the attributes possessed list. The MAMS generates a matched attribute list for a side by matching the AP in an item profile with the AN in an item profile of another item by matching the AP with the AN. The MAMS computes a raw score and an attribute match score for each side using match formulae and computes a final score of the multi-directional match between the item profiles.

13 Claims, 52 Drawing Sheets

| SIDESPEC_ID | PARENT SIDESPEC_ID | SIDE NAME | SIDE FORMULA | ATTR_ID | IMPORTANCE | ITEM NAME | NEED NAME |
|---|---|---|---|---|---|---|---|
| 100 | 0 | EVENT MUSIC | ROLLUP | 0 | 1 | | |
| 101 | 100 | PERSON NEEDS | ROLLUP | 0 | 0.5 | | |
| 102 | 101 | PERSON NEEDS FROM BAND | SCORE | BAND_4_PERSON_FIT_SCORE | 0.1 | BAND | PERSON |
| 103 | 101 | PERSON NEEDS FROM VENUE | SCORE | VENUE_4_PERSON_FIT_SCORE | 0.1 | VENUE | PERSON |
| 104 | 100 | VENUE NEEDS | ROLLUP | 0 | 0.3 | | |
| 105 | 104 | VENUE NEEDS FROM BAND | SCORE | BAND_4_VENUE_FIT_SCORE | 0.1 | BAND | VENUE |
| 106 | 104 | VENUE NEEDS FROM PERSON | SCORE | PERSON_4_VENUE_FIT_SCORE | 0.1 | PERSON | VENUE |
| 107 | 103 | BAND NEEDS | ROLLUP | 0 | 0.1 | | |
| 108 | 107 | BAND NEEDS FROM VENUE | SCORE | VENUE_4_BAND_FIT_SCORE | 0.1 | VENUE | BAND |

FIG. 17

| SIDESPEC_ID | PARENT SIDESPEC_ID | SIDE NAME | SIDE FORMULA | ATTR_ID | IMPORTANCE MEASURE | ITEM NAME | NEED NAME |
|---|---|---|---|---|---|---|---|
| 1 | 0 | EMPLOYMENT | ROLLUP | 0 | 1 | | |
| 2 | 1 | JOB NEEDS FROM CANDIDATE | SCORE | 1 | 0.2 | CAND | JOB |
| 3 | 1 | CANDIDATE NEEDS FROM JOB | SCORE | 2 | 0.1 | JOB | CAND |
| 4 | 0 | EMPLOYER | ROLLUP | 0 | 1 | | |
| 5 | 4 | JOB NEEDS FROM CANDIDATE | SCORE | 1 | 0.2 | CAND | JOB |

FIG. 18

| | CREATED IN STEP 101 | | | | | | CREATED DURING SCORING | | |
|---|---|---|---|---|---|---|---|---|---|
| SCORE_ID | PARENT SCORE_ID | SIDE SPEC ID | ITEM KEY | ITEM ID | NEED KEY | NEED ID | HAS REQUIREMENTS | RAW SCORE | MATCH SCORE |
| 100 | | 1 | | | | | | 0.40 | 0.40 |
| 101 | 100 | 2 | CAND_1 | 1 | JOB_1 | 100 | TRUE | 0.17 | 0.03 |
| 102 | 100 | 3 | JOB_1 | 100 | CAND_1 | 1 | TRUE | 0.85 | 0.09 |
| 103 | | 1 | | | | | | 0.40 | 0.40 |
| 104 | 103 | 2 | CAND_2 | 2 | JOB_1 | 100 | TRUE | 0.16 | 0.03 |
| 105 | 103 | 3 | JOB_1 | 100 | CAND_2 | 2 | TRUE | 0.88 | 0.09 |
| 106 | | 1 | | | | | | 0.76 | 0.76 |
| 107 | 106 | 2 | CAND_3 | 3 | JOB_1 | 100 | TRUE | 0.71 | 0.14 |
| 108 | 106 | 3 | JOB_1 | 100 | CAND_3 | 3 | TRUE | 0.85 | 0.09 |
| 109 | | 1 | | | | | | 0.57 | 0.57 |
| 110 | 109 | 2 | CAND_1 | 1 | JOB_2 | 200 | TRUE | 0.51 | 0.10 |
| 111 | 109 | 3 | JOB_2 | 200 | CAND_1 | 1 | TRUE | 0.70 | 0.07 |
| 112 | | 1 | | | | | | 0.75 | 0.75 |
| 113 | 112 | 2 | CAND_2 | 2 | JOB_2 | 200 | TRUE | 0.70 | 0.14 |
| 114 | 112 | 3 | JOB_2 | 200 | CAND_2 | 2 | TRUE | 0.86 | 0.09 |
| 115 | | 1 | | | | | | 0.42 | 0.42 |
| 116 | 115 | 2 | CAND_3 | 3 | JOB_2 | 200 | TRUE | 0.26 | 0.05 |
| 117 | 115 | 3 | JOB_2 | 200 | CAND_3 | 3 | TRUE | 0.74 | 0.07 |

FIG. 19

| ATTR ID | PARENT ATTR ID | LEVEL | ATTRIBUTE | IS TRAIT | MULTI VALUE | DATA TYPE | MATCH FORMULA | MATCH FORMULA PARAM | DEFAULT CREDIBILITY | DEFAULT VALUE PRESENT PERCENT | DEFAULT VALUE PRESENT MIN | DEFAULT VALUE PRESENT MAX | DEFAULT VALUE PRESENT BOOL | DEFAULT VALUE PRESENT TEXT | DEFAULT IMPORTANCE | DEFAULT REQUIREMENT | DEFAULT VALUE NEEDED PERCENT | DEFAULT VALUE NEEDED MIN | DEFAULT VALUE NEEDED MAX | DEFAULT VALUE NEEDED BOOL | DEFAULT VALUE TEXT |
|---|---|---|---|---|---|---|---|---|---|---|---|---|---|---|---|---|---|---|---|---|---|
| 1 | 0 | 0 | ITEM FIT SCORE | FALSE | FALSE | NONE | ROLL UP | | | | | | | | 1 | | | | | | |
| 2 | 0 | 0 | NEED FIT SCORE | FALSE | FALSE | NONE | | | | | | | | | 1 | | | | | | |
| 3 | 1 | 1 | SKILLS | FALSE | FALSE | NONE | ROLL UP | | 0 | 0 | 0 | 0 | 0 | 0 | 1 | 0 | 0 | 0 | 0 | 0 | |
| 4 | 3 | 2 | EXCELL | FALSE | TRUE | PERCENT | PERCENTS | <OU>SKILLS</OU> | 0 | 0 | 0 | 0 | 0 | 0 | 0 | 0 | 0 | 0 | 0 | 0 | |

FIG. 20A

| | | | | | | | | | | | | | | | | |
|---|---|---|---|---|---|---|---|---|---|---|---|---|---|---|---|---|
| 5 | 3 | 2 | MICROSOFT WORD | FALSE | TRUE | PERCENT | PERCENTS | <OU>SKILLS</OU> | o | o | o | o | o | o | o | o |
| 6 | 3 | 2 | DATA MINING | FALSE | TRUE | PERCENT | PERCENTS | <OU>SKILLS</OU> | o | o | o | o | o | o | o | o |
| 7 | 3 | 2 | PHP | FALSE | TRUE | PERCENT | PERCENTS | <OU>SKILLS</OU> | o | o | o | o | o | o | o | o |
| 8 | 3 | 2 | HAZMAT DRIVER | FALSE | TRUE | PERCENT | PERCENTS | <OU>SKILLS</OU> | o | o | o | o | o | o | o | o |
| 9 | 3 | 2 | ESOPHAGEAL STENT PLACEMENT | FALSE | TRUE | | PERCENTS | <OU>SKILLS</OU> | o | o | o | o | o | o | o | o |
| 10 | 3 | 2 | FIRE FIGHTER II | FALSE | TRUE | PERCENT | PERCENTS | <OU>SKILLS</OU> | o | o | o | o | o | o | o | o |

| | | | | | | | | | | | | | | | | |
|---|---|---|---|---|---|---|---|---|---|---|---|---|---|---|---|---|
| 11 | 3 | 2 | CERTIFIED PUBLIC ACCOUNTANT (CPA) | FALSE | TRUE | PERCENT | PERCENTS | <OU>SKILLS</OU> | 0 | 0 | 0 | 0 | 0 | 0 | 0 | 0 |
| 12 | 3 | 2 | INTEGRITY | TRUE | TRUE | PERCENT | PERCENTS | <OU>SKILLS</OU> | 0.3 | 0.3 | 0 | 0 | 0 | 0 | 0 | 0 |
| 13 | 3 | 2 | CONFIDENCE | TRUE | TRUE | PERCENT | PERCENTS | <OU>SKILLS</OU> | 0.3 | 0.5 | 0 | 0 | 0 | 0.3 | 0 | 0 |
| 14 | 3 | 2 | DEPENDABILITY | TRUE | TRUE | PERCENT | PERCENTS | <OU>SKILLS</OU> | 0.25 | 0.5 | 0 | 0 | 0 | 0.3 | 0 | 0 |
| 15 | 2 | 1 | JOB OPPORTUNITY | FALSE | FALSE | NONE | ROLL UP | | 0 | 0 | 0 | 0 | 0 | 1 | 0 | 0 |
| 16 | 15 | 2 | SALARY | FALSE | FALSE | NONE | ROLL UP | | 0 | 0 | 0 | 0 | 0 | 0.3 | 0 | 0 |
| 17 | 16 | 3 | TOTAL COMPENSATION | FALSE | FALSE | RANGE | MORE ISBETTER | | 1 | 0 | 0 | 0 | 0 | 1 | 0 | 0 |

| | | | | | | | | | | | | | | | | | | | | | |
|---|---|---|---|---|---|---|---|---|---|---|---|---|---|---|---|---|---|---|---|---|---|
| 18 | 16 | 3 | BASE | FALSE | FALSE | MIN | ATLEAST | | 1 | 0 | 0 | 0 | 0 | 0 | 0 | 0 | 0 | 0 | 0 | 0 | |
| 19 | 16 | 3 | COMMISSION | FALSE | FALSE | MIN | ATLEAST | | 1 | 0 | 0 | 0 | 0 | 0 | 0 | 0 | 0 | 0 | 0 | 0 | |
| 20 | 16 | 3 | BONUS | FALSE | FALSE | MIN | ATLEAST | | 1 | 0 | 0 | 0 | 0 | 0 | 0 | 0 | 0 | 0 | 0 | 0 | |
| 21 | 16 | 3 | OVERTIME | FALSE | FALSE | MIN | ATLEAST | | 0 | 0 | 0 | 0 | 0 | 0 | 0 | 0 | 0 | 0 | 0 | 0 | |
| 22 | 15 | 2 | HEALTHCARE | FALSE | FALSE | NONE | ROLLUP | | 0 | 0 | 0 | 0 | 0 | 0.25 | 0 | 0 | 0 | 0 | 0 | 0 | |
| 23 | 22 | 3 | MEDICAL | FALSE | FALSE | NONE | ROLLUP | | 0 | 0 | 0 | 0 | 0 | 0.5 | 0 | 0 | 0 | 0 | 0 | 0 | |
| 24 | 23 | 4 | SELF | FALSE | FALSE | BOOLEAN | MUSTHAVE | | 0 | 0 | 0 | TRUE | 0 | 0.75 | 0 | 0 | 0 | 0 | 0 | 0 | |
| 25 | 23 | 4 | SPOUSE | FALSE | FALSE | BOOLEAN | MUSTHAVE | | 0 | 0 | 0 | FALSE | 0 | 0.25 | 0 | 0 | 0 | 0 | 0 | 0 | |
| 26 | 22 | 3 | DENTAL | FALSE | FALSE | NONE | ROLLUP | | 0 | 0 | 0 | 0 | 0 | 0.25 | 0 | 0 | 0 | 0 | 0 | 0 | |

FIG. 20D

| | | | | | | | | | | | | | | | | | | | | | |
|---|---|---|---|---|---|---|---|---|---|---|---|---|---|---|---|---|---|---|---|---|---|
| 27 | 26 | 4 | SELF | FALSE | FALSE | BOOLEAN | MUSTHAVE | | 0 | 0 | 0 | 0 | TRUE | 0 | 0.75 | 0 | 0 | 0 | 0 | 0 | |
| 28 | 26 | 4 | SPOUSE | FALSE | FALSE | BOOLEAN | MUSTHAVE | | 0 | 0 | 0 | 0 | FALSE | 0 | 0.25 | 0 | 0 | 0 | 0 | 0 | |
| 29 | 15 | 2 | WORK ENVIRONMENT | FALSE | FALSE | NONE | ROLLUP | | 0 | 0 | 0 | 0 | 0 | 0 | 0.2 | 0 | 0 | 0 | 0 | 0 | |
| 30 | 29 | 3 | NICE PEOPLE | FALSE | TRUE | PERCENT | PERCENTS | <OU>HA SMI N</OU> | 0.5 | 0.5 | 0 | 0 | 0 | 0 | 0.5 | 0 | 0 | 0 | 0 | 0 | |
| 31 | 29 | 3 | GOOD FOOD CHOICES | FALSE | TRUE | PERCENT | PERCENTS | <OU>HA SMI N</OU> | 0 | 0 | 0 | 0 | 0 | 0 | 0 | 0 | 0 | 0 | 0 | 0 | |

FIG. 20E

| PROFILE_ID | ATTR_ID | CREDIBILITY MEASURE | VALUE PRESENT PERCENT | VALUE PRESENT MIN | VALUE PRESENT MAX | VALUE PRESENT BOOL | VALUE PRESENT TEXT |
|---|---|---|---|---|---|---|---|
| CAND_1 | 3 | | | | | | |
| CAND_1 | 13 | 0.43 | 1 | | | | |
| CAND_1 | 12 | 1 | 0.5 | | | | |
| CAND_1 | 5 | 0.67 | 0.64 | | | | |
| CAND_1 | 6 | 0.74 | 0.33 | | | | |
| CAND_1 | 7 | 0.7 | 0.5 | | | | |
| CAND_1 | 4 | 0.62 | 0.81 | | | | |
| CAND_3 | 1 | 0 | 0 | 0 | 0 | 0 | 1 |
| CAND_3 | 3 | | | | | | |
| CAND_3 | 13 | 0.8 | 0.7 | | | | |
| CAND_3 | 12 | 0.8 | 0.9 | | | | |
| CAND_3 | 14 | 0.75 | 0.9 | 0 | 0 | 0 | 0.3 |
| CAND_3 | 5 | 0.9 | 0.3 | | | | |
| CAND_3 | 6 | 0.9 | 0.6 | | | | |
| CAND_3 | 7 | 0.8 | 0.8 | | | | |
| CAND_2 | 3 | | | | | | |
| CAND_2 | 13 | 0.6 | 0.5 | | | | |
| CAND_2 | 12 | 0.6 | 0.4 | | | | |
| CAND_2 | 5 | 0.8 | 0.5 | | | | |
| CAND_2 | 7 | 0.8 | 0.4 | | | | |

FIG. 21A

| | | | | | | | |
|---|---|---|---|---|---|---|---|
| JOB_1 | 16 | | | | | | |
| JOB_1 | 17 | 1 | | 75000 | 100000 | | |
| JOB_1 | 22 | | | | | | |
| JOB_1 | 23 | | | | | | |
| JOB_1 | 24 | 1 | | | | TRUE | |
| JOB_1 | 25 | 1 | | | | TRUE | |
| JOB_1 | 29 | | | | | | |
| JOB_1 | 30 | 0.8 | 0.9 | | | | |
| JOB_1 | 31 | 0.7 | 0.4 | | | | |
| JOB_2 | 17 | 1 | | 60000 | 80000 | | |
| JOB_2 | 22 | | | | | | |
| JOB_2 | 23 | | | | | | |
| JOB_2 | 24 | 1 | | | | TRUE | |
| JOB_2 | 25 | 1 | | | | FALSE | |
| JOB_2 | 29 | | | | | | |
| IMPLIED ATTRIBUTES POSSESSED. | | | | | | | |
| CAND_2 | 1 | 0 | 0 | 0 | 0 | 0 | 0 |
| CAND_2 | 14 | 0.25 | 0.5 | 0 | 0 | 0 | 0 |
| CAND_2 | 4 | 0 | 0 | 0 | 0 | 0 | 0 |
| CAND_2 | 2 | 0 | 0 | 0 | 0 | 0 | 0 |
| JOB_2 | 2 | 0 | 0 | 0 | 0 | 0 | 0 |
| JOB_2 | 15 | 0 | 0 | 0 | 0 | 0 | 0 |
| JOB_2 | 16 | 0 | 0 | 0 | 0 | 0 | 0 |
| JOB_2 | 27 | 0 | 0 | 0 | 0 | TRUE | 0 |
| JOB_2 | 28 | 0 | 0 | 0 | 0 | FALSE | 0 |

FIG. 21B

| JOB_2 | 30 | 0.5 | 0.5 | 0 | 0 | 0 | 0 |
|---|---|---|---|---|---|---|---|
| JOB_2 | 31 | 0 | 0 | 0 | 0 | 0 | 0 |
| JOB_1 | 2 | 0 | 0 | 0 | 0 | 0 | 0 |
| JOB_1 | 15 | 0 | 0 | 0 | 0 | 0 | 0 |
| CAND_1 | 14 | 0.25 | 0.5 | 0 | 0 | 0 | 0 |
| CAND_1 | 1 | 0 | 0 | 0 | 0 | 0 | 0 |

FIG. 21C

| PROFILE_ID | ATTR_ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT |
|---|---|---|---|---|---|---|---|---|
| JOB_1 | 1 | | 1 | | | | | |
| JOB_1 | 3 | | 0.7 | | | | | |
| JOB_1 | 13 | | 0.4 | 0.7 | | | | |
| JOB_1 | 5 | | 0.8 | 0.2 | | | | |
| JOB_1 | 4 | 1 | 0.3 | 0.5 | | | | |
| JOB_1 | 14 | | 0.9 | 0.9 | | | | |
| JOB_2 | 1 | | 1 | | | | | |
| JOB_2 | 3 | | 0.3 | 0.4 | | | | |
| JOB_2 | 13 | | 0.3 | 0.4 | | | | |
| JOB_2 | 12 | | 0.1 | 0.3 | | | | |
| JOB_2 | 5 | | 0.4 | 0.6 | | | | |
| JOB_2 | 7 | | 0.6 | 0.4 | | | | |
| CAND_1 | 2 | | 0.7 | | | | | |
| CAND_1 | 15 | | 0.7 | | | | | |
| CAND_1 | 16 | | 0.7 | | | | | |
| CAND_1 | 17 | | 0.5 | | 80000 | 120000 | | |
| CAND_1 | 22 | | 0.2 | | | | | |
| CAND_1 | 23 | | 0.3 | | | | | |
| CAND_1 | 24 | 1 | 0.5 | | | | | TRUE |
| CAND_1 | 25 | 1 | 0.4 | | | | | TRUE |
| CAND_1 | 29 | | 0.1 | | | | | |
| CAND_1 | 30 | | 0.4 | 0.7 | | | | |
| CAND_1 | 31 | | 0.1 | 0.5 | | | | |
| CAND_3 | 2 | | 1 | | | | | |

FIG. 22A

| | | | | | | | |
|---|---|---|---|---|---|---|---|
| CAND_3 | 15 | | 0.7 | | | | |
| CAND_3 | 16 | | 0.7 | | | | |
| CAND_3 | 17 | | 0.5 | | 80000 | 110000 | |
| CAND_3 | 22 | | 0.2 | | | | |
| CAND_3 | 23 | | 0.3 | | | | |
| CAND_3 | 24 | 1 | 0.5 | | | | TRUE |
| CAND_3 | 25 | 1 | 0.4 | | | | TRUE |
| CAND_3 | 29 | | 0.1 | | | | |
| CAND_3 | 30 | | 0.4 | 0.7 | | | |
| CAND_3 | 31 | | 0.1 | 0.5 | | | |
| CAND_2 | 2 | | 1 | | | | |
| CAND_2 | 15 | | 0.8 | | | | |
| CAND_2 | 16 | | 0.5 | | | | |
| CAND_2 | 17 | | 0.5 | | 60000 | 85000 | |
| CAND_2 | 22 | | 0.2 | | | | |
| CAND_2 | 23 | | 0.3 | | | | |
| CAND_2 | 24 | 1 | 0.3 | | | | TRUE |
| CAND_2 | 25 | 1 | 0.4 | | | | FALSE |
| CAND_2 | 29 | | 0.1 | | | | |
| CAND_2 | 30 | | 0.4 | 0.3 | | | |
| CAND_2 | 31 | | 0.1 | 0.1 | | | |

FIG. 22B

| RATEE ID | POSSESSED _BY | ATTR_ID | CREDIBILITY | VALUE PRESENT PERCENT | VALUE PRESENT MIN | VALUE PRESENT MAX | VALUE PRESENT BOOL | VALUE PRESENT TEXT |
|---|---|---|---|---|---|---|---|---|
| 1 | ITEM | 13 | 0.50 | 1.00 | | | | |
| 1 | ITEM | 4 | 0.40 | 0.90 | | | | |
| 1 | ITEM | 4 | 0.80 | 0.70 | | | | |
| 1 | ITEM | 4 | 0.50 | 0.90 | | | | |
| 1 | ITEM | 12 | 0.70 | 0.70 | | | | |
| 1 | ITEM | 12 | 0.90 | 0.80 | | | | |
| 1 | ITEM | 5 | 0.60 | 0.50 | | | | |
| 1 | ITEM | 5 | 0.10 | 1.00 | | | | |
| 1 | ITEM | 5 | 0.80 | 0.70 | | | | |
| 1 | ITEM | 7 | 0.30 | 0.90 | | | | |
| 1 | ITEM | 6 | 0.10 | 1.00 | | | | |
| 1 | ITEM | 6 | 0.50 | 0.20 | | | | |
| 1 | ITEM | 6 | 0.10 | 1.00 | | | | |
| 1 | ITEM | 6 | 0.40 | 0.25 | | | | |
| 1 | ITEM | 6 | 0.10 | 1.00 | | | | |

FIG. 23

| PROFILE_ID | ATTR_ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT |
|---|---|---|---|---|---|---|---|---|
| JOB_1 | 1 |  | 1 |  |  |  |  |  |
| JOB_1 | 3 |  | 0.7 | 0.7 |  |  |  |  |
| JOB_1 | 13 |  | 0.4 | 0.2 |  |  |  |  |
| JOB_1 | 5 |  | 0.8 | 0.5 |  |  |  |  |
| JOB_1 | 4 | 1 | 0.3 |  |  |  |  |  |
| JOB_1 | 14 |  | 0.3 | 0.5 |  |  |  |  |

FIG. 24

| PROFILE_ID | ATTR ID | CREDIBILITY MEASURE | VALUE PRESENT PERCENT | VALUE PRESENT MIN | VALUE PRESENT MAX | VALUE PRESENT BOOL | VALUE PRESENT TEXT |
|---|---|---|---|---|---|---|---|
| CAND_1 | 13 | 0.43 | 1 | 0 | 0 | 0 | 0 |
| CAND_1 | 12 | 0.84 | 0.76 | 0 | 0 | 0 | 0 |
| CAND_1 | 5 | 0.67 | 0.64 | 0 | 0 | 0 | 0 |
| CAND_1 | 6 | 0.31 | 0.42 | 0 | 0 | 0 | 0 |
| CAND_1 | 7 | 0.21 | 0.90 | 0 | 0 | 0 | 0 |
| CAND_1 | 4 | 0.62 | 0.81 | 0 | 0 | 0 | 0 |

FIG. 25

COMPUTE ATTRIBUTE MODULE

| ATTR_ID | ATTRIBUTE | VALUE PRESENT MEASURE | CREDIBILITY MEASURE | WEIGHTED VALUE PRESENT MEASURE | WEIGHTED CREDIBILITY MEASURE |
|---|---|---|---|---|---|
| 13 | CONFIDENCE | 1.00 | 0.50 | 0.50 | 0.25 |

ATTRIBUTE COMBINER

| SUM(VALUE PRESENT MEASURE) | SUM(CREDIBILITY MEASURE) | SUM(WEIGHTED VALUE PRESENT MEASURE) | SUM(WEIGHTED CREDIBILITY MEASURE) | MERGED VALUE MEASURE | UNADJUSTED CREDIBILITY MEASURE | CREDIBILITY BUMP | MERGED CREDIBILITY MEASURE |
|---|---|---|---|---|---|---|---|
| 1.00 | 0.50 | 0.50 | 0.25 | 1.00 | 0.50 | -0.075 | 0.43 |

RETURNED TUPLE

| ATTRIBUTE | VALUE PRESENT MEASURE | CREDIBILITY MEASURE |
|---|---|---|
| CONFIDENCE | 1.00 | 0.43 |

FIG. 26A

| COMPUTE ATTRIBUTE MODULE | | | | | |
|---|---|---|---|---|---|
| ATTR_ID | ATTRIBUTE | VALUE PRESENT MEASURE | CREDIBILITY MEASURE | WEIGHTED VALUE PRESENT MEASURE | WEIGHTED CREDIBILITY MEASURE |
| 4 | EXCEL | 0.90 | 0.40 | 0.36 | 0.16 |
| 4 | EXCEL | 0.70 | 0.80 | 0.56 | 0.64 |
| 4 | EXCEL | 0.90 | 0.50 | 0.45 | 0.25 |
| ATTRIBUTE COMBINER | | | | | |
| SUM(VALUE PRESENT MEASURE) | SUM(CREDIBILITY MEASURE) | SUM(WEIGHTED VALUE PRESENT MEASURE) | SUM(WEIGHTED CREDIBILITY MEASURE) | MERGED VALUE MEASURE | |
| 2.50 | 1.70 | 1.37 | 1.05 | 0.81 | |
| | | | UNADJUSTED CREDIBILITY MEASURE | CREDIBILITY BUMP | MERGED CREDIBILITY MEASURE |
| | | | 0.62 | 0.005 | 0.62 |
| RETURNED TUPLE | | | | | |
| | ATTRIBUTE | VALUE PRESENT MEASURE | CREDIBILITY MEASURE | | |
| | EXCEL | 0.81 | 0.62 | | |

FIG. 26B

| COMPUTE ATTRIBUTE MODULE | | | | | | | | |
|---|---|---|---|---|---|---|---|---|
| ATTR_ID | ATTRIBUTE | VALUE PRESENT MEASURE | CREDIBILITY MEASURE | WEIGHTED VALUE PRESENT MEASURE | WEIGHTED CREDIBILITY MEASURE | | | |
| 12 | INTEGRITY | 0.70 | 0.70 | 0.49 | 0.49 | | | |
| 12 | INTEGRITY | 0.80 | 0.90 | 0.72 | 0.81 | | | |
| ATTRIBUTE COMBINER | | | | | | | | |
| | SUM(VALUE PRESENT MEASURE) | SUM(CREDIBILITY MEASURE) | SUM(WEIGHTED VALUE PRESENT MEASURE) | SUM(WEIGHTED CREDIBILITY MEASURE) | MERGED VALUE MEASURE | UNADJUSTED CREDIBILITY MEASURE | CREDIBILITY BUMP | MERGED CREDIBILITY MEASURE |
| | 1.50 | 1.60 | 1.21 | 1.30 | 0.76 | 0.81 | 0.030 | 0.84 |
| RETURNED TUPLE | | | | | | | | |
| | ATTRIBUTE | VALUE PRESENT MEASURE | CREDIBILITY MEASURE | | | | | |
| | INTEGRITY | 0.76 | 0.84 | | | | | |

FIG. 26C

| COMPUTE ATTRIBUTE MODULE | | | | | | | | |
|---|---|---|---|---|---|---|---|---|
| ATTR_ID | ATTRIBUTE | VALUE PRESENT MEASURE | CREDIBILITY MEASURE | WEIGHTED VALUE PRESENT MEASURE | WEIGHTED CREDIBILITY MEASURE | UNADJUSTED CREDIBILITY MEASURE | CREDIBILITY BUMP | MERGED CREDIBILITY MEASURE |
| 7 | PHP | 0.90 | 0.30 | 0.27 | 0.09 | | | |
| ATTRIBUTE COMBINER | | | | | | | | |
| | SUM(VALUE PRESENT MEASURE) | SUM(CREDIBILITY MEASURE) | SUM(WEIGHTED VALUE PRESENT MEASURE) | SUM(WEIGHTED CREDIBILITY MEASURE) | MERGED VALUE MEASURE | UNADJUSTED CREDIBILITY MEASURE | CREDIBILITY BUMP | MERGED CREDIBILITY MEASURE |
| | 0.9 | 0.30 | 0.27 | 0.09 | 0.90 | 0.30 | -0.091 | 0.21 |
| RETURNED TUPLE | | | | | | | | |
| | ATTRIBUTE | VALUE PRESENT MEASURE | CREDIBILITY MEASURE | | | | | |
| | PHP | 0.90 | 0.21 | | | | | |

FIG. 26D

| COMPUTE ATTRIBUTE MODULE | | | | | | | | |
|---|---|---|---|---|---|---|---|---|
| ATTR_ID | ATTRIBUTE | VALUE PRESENT MEASURE | CREDIBILITY MEASURE | WEIGHTED VALUE PRESENT MEASURE | WEIGHTED CREDIBILITY MEASURE | | | |
| 5 | MSWORD | 0.50 | 0.60 | 0.3 | 0.36 | | | |
| 5 | MSWORD | 1.00 | 0.10 | 0.1 | 0.01 | | | |
| 5 | MSWORD | 0.70 | 0.80 | 0.56 | 0.64 | | | |
| ATTRIBUTE COMBINER | | | | | | | | |
| | SUM(VALUE PRESENT MEASURE) | SUM(CREDIBILITY MEASURE) | SUM(WEIGHTED VALUE PRESENT MEASURE) | SUM(WEIGHTED CREDIBILITY MEASURE) | MERGED VALUE MEASURE | UNADJUSTED CREDIBILITY MEASURE | CREDIBILITY BUMP | MERGED CREDIBILITY MEASURE |
| | 2.20 | 1.50 | 0.96 | 1.01 | 0.64 | 0.67 | 0.001 | 0.67 |
| RETURNED TUPLE | | | | | | | | |
| | ATTRIBUTE | VALUE PRESENT MEASURE | CREDIBILITY MEASURE | | | | | |
| | MSWORD | 0.64 | 0.67 | | | | | |

FIG. 26E

| COMPUTE ATTRIBUTE MODULE | | | | | |
|---|---|---|---|---|---|
| ATTR_ID | ATTRIBUTE | VALUE PRESENT MEASURE | CREDIBILITY MEASURE | WEIGHTED VALUE PRESENT MEASURE | WEIGHTED CREDIBILITY MEASURE |
| 6 | DATA MINING | 1.0 | 0.1 | 0.1 | 0.01 |
| 6 | DATA MINING | 0.2 | 0.5 | 0.1 | 0.25 |
| 6 | DATA MINING | 1.0 | 0.1 | 0.1 | 0.01 |
| 6 | DATA MINING | 0.25 | 0.4 | 0.1 | 0.16 |
| 6 | DATA MINING | 1.0 | 0.1 | 0.1 | 0.01 |

| ATTRIBUTE COMBINER | | | | | | |
|---|---|---|---|---|---|---|
| SUM(VALUE PRESENT MEASURE) | SUM(CREDIBILITY MEASURE) | SUM(WEIGHTED VALUE PRESENT MEASURE) | SUM(WEIGHTED CREDIBILITY MEASURE) | MERGED VALUE MEASURE | UNADJUSTED CREDIBILITY MEASURE | CREDIBILITY BUMP | MERGED CREDIBILITY MEASURE |
| 3.45 | 1.20 | 0.50 | 0.44 | 0.42 | 0.37 | -0.056 | 0.31 |

| RETURNED TUPLE | | |
|---|---|---|
| ATTRIBUTE | VALUE PRESENT MEASURE | CREDIBILITY MEASURE |
| DATA MINING | 0.42 | 0.31 |

FIG. 26F

| PROFILE_ID | ATTR_ID | CREDIBILITY MEASURE | VALUE PRESENT PERCENT | VALUE PRESENT MIN | VALUE PRESENT MAX | VALUE PRESENT BOOL | VALUE PRESENT TEXT |
|---|---|---|---|---|---|---|---|
| CAND_1 | 1 | 0 | 0 | 0 | 0 | 0 | 0 |
| CAND_1 | 3 | 0 | 0 | 0 | 0 | 0 | 0 |

FIG. 27A

| PROFILE_ID | ATTR_ID | CREDIBILITY MEASURE | VALUE PRESENT PERCENT | VALUE PRESENT MIN | VALUE PRESENT MAX | VALUE PRESENT BOOL | VALUE PRESENT TEXT |
|---|---|---|---|---|---|---|---|
| CAND_1 | 1 | 0 | 0 | 0 | 0 | 0 | 0 |
| CAND_1 | 3 | 0 | 0 | 0 | 0 | 0 | 0 |
| CAND_1 | 13 | 0.43 | 1 | 0 | 0 | 0 | 0 |
| CAND_1 | 12 | 0.84 | 0.76 | 0 | 0 | 0 | 0 |
| CAND_1 | 5 | 0.67 | 0.64 | 0 | 0 | 0 | 0 |
| CAND_1 | 6 | 0.31 | 0.42 | 0 | 0 | 0 | 0 |
| CAND_1 | 7 | 0.21 | 0.90 | 0 | 0 | 0 | 0 |
| CAND_1 | 4 | 0.62 | 0.81 | 0 | 0 | 0 | 0 |

FIG. 27B

| SCORE ID | ATTR ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT | CREDIBILITY MEASURE | VALUE PRESENT PERCENT | VALUE PRESENT MIN | VALUE PRESENT MAX | VALUE PRESENT BOOL | VALUE PRESENT TEXT |
|---|---|---|---|---|---|---|---|---|---|---|---|---|---|---|
| 101 | 1 | 0 | 1 | 0 | 0 | 0 | 0 | 0 | 0 | 0 | 0 | 0 | 0 | 0 |
| 101 | 3 | 0 | 0.7 | 0 | 0 | 0 | 0 | 0 | 0 | 0 | 0 | 0 | 0 | 0 |
| 101 | 13 | 0 | 0.4 | 0.7 | 0 | 0 | 0 | 0 | 0.43 | 1 | 0 | 0 | 0 | 0 |
| 101 | 5 | 0 | 0.8 | 0.2 | 0 | 0 | 0 | 0 | 0.64 | 0.67 | 0 | 0 | 0 | 0 |
| 101 | 4 | 1 | 0.3 | 0.5 | 0 | 0 | 0 | 0 | 0.62 | 0.81 | 0 | 0 | 0 | 0 |
| 101 | 14 | 0 | 0.9 | 0.9 | 0 | 0 | 0 | 0 | 0.25 | 0.5 | 0 | 0 | 0 | 0 |

FIG. 28

| SCORE ID | ATTR ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT | CREDIBILITY MEASURE | VALUE PRESENT PERCENT | VALUE PRESENT MIN | VALUE PRESENT MAX | VALUE PRESENT BOOL | VALUE PRESENT TEXT | DELTA | OVER UNDER ADJUSTMENT | HAS REQUIRED | RAW SCORE | ATTRIBUTE MATCH SCORE |
|---|---|---|---|---|---|---|---|---|---|---|---|---|---|---|---|---|---|---|---|
| 101 | 11 | 0 | 1 | | | | 0 | 0 | 0 | 0 | 0 | 0 | 0 | 0 | | | | | |
| 101 | 13 | 0 | 0.7 | 0 | | | 0 | 0 | 0 | 0 | 0 | 0 | 0 | 0 | | | | | |
| 101 | 13 | 0 | 0.4 | 0.7 | 0 | 0 | 0 | 0 | 0.43 | 1 | 0 | 0 | 0 | 0 | 0.30 | 0.70 | TRUE | 0.70 | 0.12 |
| 101 | 5 | 0 | 0.8 | 0.2 | 0 | 0 | 0 | 0 | 0.67 | 0.64 | 0 | 0 | 0 | 0 | 0.44 | 0.10 | TRUE | 0.10 | 0.05 |
| 101 | 4 | 1 | 0.3 | 0.5 | 0 | 0 | 0 | 0 | 0.62 | 0.81 | 0 | 0 | 0 | 0 | 0.31 | 0.50 | TRUE | 0.50 | 0.09 |
| 101 | 14 | 0 | 0.9 | 0.9 | 0 | 0 | 0 | 0 | 0.25 | 0.5 | 0 | 0 | 0 | 0 | -0.40 | 0.60 | TRUE | 0.60 | 0.14 |

FIG. 29

| SCORE ID | ATTR ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT | CREDIBILITY MEASURE | VALUE PRESENT PERCENT | VALUE PRESENT MIN | VALUE PRESENT MAX | VALUE PRESENT BOOL | VALUE PRESENT TEXT | DELTA | OVER UNDER ADJUSTMENT | HAS REQUIRED | RAW SCORE | ATTRIBUTE MATCH SCORE |
|---|---|---|---|---|---|---|---|---|---|---|---|---|---|---|---|---|---|---|
| 101 | 1 | 0 | 1 | 0 | 0 | 0 | 0 | 0 | 0 | 0 | 0 | 0 | 0 | 0 | | | TRUE | 0.17 | 0.17 |
| 101 | 3 | 0 | 0.7 | 0 | 0 | 0 | 0 | 0 | 0 | 0 | 0 | 0 | 0 | 0 | | | TRUE | 0.17 | 0.12 |
| 101 | 13 | 0 | 0.4 | 0.7 | 0 | 0 | 0 | 0 | 0.43 | 1 | 0 | 0 | 0 | 0 | 0.30 | 0.70 | TRUE | 0.70 | 0.12 |
| 101 | 5 | 0 | 0.8 | 0.2 | 0 | 0 | 0 | 0 | 0.67 | 0.64 | 0 | 0 | 0 | 0 | 0.44 | 0.10 | TRUE | 0.10 | 0.05 |

FIG. 29A

| 101 | 4 | 1 | 0.3 | 0.5 | 0 | 0 | 0 | 0.62 | 0.81 | 0 | 0 | 0 | 0 | 0.31 | 0.50 | TRUE | 0.50 | 0.09 |
|-----|---|---|-----|-----|---|---|---|------|------|---|---|---|---|------|------|------|------|------|
| 101 | 14 | 0 | 0.9 | 0.9 | 0 | 0 | 0 | 0.25 | 0.5 | 0 | 0 | 0 | 0 | -0.40 | 0.60 | TRUE | 0.60 | 0.14 |

FIG. 29B

|  | IMPORTANCE MEASURE | ATTRIBUTE MATCH SCORE |
|---|---|---|
|  | 0.4 | 0.12 |
|  | 0.8 | 0.05 |
|  | 0.3 | 0.09 |
|  | 0.9 | 0.14 |
| SUM(IMPORTANCE MEASURE) | 2.4 |  |
| SUM(ATTRIBUTE MATCH SCORE) |  | 0.40 |
| NESTED UP RAW SCORE | 0.1675 |  |

FIG. 30

|  | IMPORTANCE MEASURE | ATTRIBUTE MATCH SCORE |
|---|---|---|
|  | 1.0 | 0.1675 |
|  |  |  |
| SUM | 1.0 | 0.1675 |
| ATTRIBUTE MATCH SCORE | 0.1675 |  |

FIG. 31

| SET NAME | DELTA % | COEFF |
|---|---|---|
| SKILLS | -2 | 0 |
| SKILLS | -1 | 0 |
| SKILLS | -0.9 | 0.2 |
| SKILLS | -0.8 | 0.3 |
| SKILLS | -0.7 | 0.4 |
| SKILLS | -0.6 | 0.5 |
| SKILLS | -0.5 | 0.6 |
| SKILLS | -0.4 | 0.7 |
| SKILLS | -0.3 | 0.8 |
| SKILLS | -0.2 | 0.9 |
| SKILLS | -0.1 | 1 |
| SKILLS | 0 | 1 |
| SKILLS | 0.1 | 1 |
| SKILLS | 0.2 | 0.9 |
| SKILLS | 0.3 | 0.8 |
| SKILLS | 0.4 | 0.7 |
| SKILLS | 0.5 | 0.6 |
| SKILLS | 0.6 | 0.5 |
| SKILLS | 0.7 | 0.4 |
| SKILLS | 0.8 | 0.3 |
| SKILLS | 0.9 | 0.2 |
| SKILLS | 1 | 0.1 |
| HASMIN | -2 | 0 |
| HASMIN | -1 | 0 |
| HASMIN | -0.8 | 0.2 |
| HASMIN | -0.6 | 0.3 |
| HASMIN | -0.3 | 0.4 |
| HASMIN | 0 | 1 |

FIG. 32

| PROFILE_ID | ATTR_ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT |
|---|---|---|---|---|---|---|---|---|
| CAND_1 | 15 | 0 | 0.7 | 0 | 0 | 0 | 0 | 0 |
| CAND_1 | 16 | 0 | 0.7 | 0 | 0 | 0 | 0 | 0 |
| CAND_1 | 17 | 0 | 0.5 | 0 | 80000 | 120000 | 0 | 0 |
| CAND_1 | 22 | 0 | 0.2 | 0 | 0 | 0 | 0 | 0 |
| CAND_1 | 23 | 0 | 0.3 | 0 | 0 | 0 | 0 | 0 |
| CAND_1 | 24 | 1 | 0.5 | 0 | 0 | 0 | TRUE | 0 |
| CAND_1 | 25 | 1 | 0.4 | 0 | 0 | 0 | TRUE | 0 |
| CAND_1 | 29 | 0 | 0.1 | 0 | 0 | 0 | 0 | 0 |
| CAND_1 | 30 | 0 | 0.4 | 0.7 | 0 | 0 | 0 | 0 |
| CAND_1 | 31 | 0 | 0.1 | 0.5 | 0 | 0 | 0 | 0 |

FIG. 33A

| PROFILE_ID | ATTR_ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT |
|---|---|---|---|---|---|---|---|---|
| CAND_1 | 2 | 0 | 1 | 0 | 0 | 0 | 0 | 0 |
| CAND_1 | 15 | 0 | 0.7 | 0 | 0 | 0 | 0 | 0 |

FIG. 33B

| PROFILE_ID | ATTR_ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT |
|---|---|---|---|---|---|---|---|---|
| CAND_1 | 29 | 0 | 0.1 | 0 | 0 | 0 | 0 | 0 |
| CAND_1 | 30 | 0 | 0.4 | 0.7 | 0 | 0 | 0 | 0 |

FIG. 33C

| SCORE ID | ATTR ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT | CREDIBILITY MEASURE | VALUE PRESENT PERCENT | VALUE PRESENT MIN | VALUE PRESENT MAX | VALUE PRESENT BOOL | VALUE PRESENT TEXT | DELTA | OVER UNDER ADJUSTMENT | HAS REQUIRED | RAW SCORE | ATTRIBUTE MATCH SCORE |
|---|---|---|---|---|---|---|---|---|---|---|---|---|---|---|---|---|---|---|
| 102 | 2 | 0 | 1.0 | 0 | 0 | 0 | 0 | 0 | 0 | 0 | 0 | 0 | 0 | 0 | | | TRUE | 0.85 | 0.85 |
| 102 | 15 | 0 | 0.7 | 0 | 0 | 0 | 0 | 0 | 0 | 0 | 0 | 0 | 0 | 0 | | | TRUE | 0.85 | 0.60 |
| 102 | 16 | 0 | 0.7 | 0 | 0 | 0 | 0 | 0 | N/A | N/A | N/A | N/A | N/A | 0 | | | TRUE | 0.83 | 0.58 |
| 102 | 17 | 0 | 0.5 | 0 | 80000 | 120000 | 0 | 0 | 1 | 0 | 75000 | 100000 | 0 | 0 | | | TRUE | 0.83 | 0.42 |

FIG. 34A

| | | | | | | |
|---|---|---|---|---|---|---|
| 0.20 | 0.30 | 0.50 | 0.40 | 0.07 | 0.29 | 0.06 |
| 1.00 | 1.00 | 1.00 | 1.00 | 0.70 | 0.90 | 0.90 |
| TRUE | TRUE | TRUE | TRUE | TRUE | TRUE | TRUE |
|  |  |  |  |  | 0.9 | 0.9 |
|  |  |  |  |  | 0.2 | -0.1 |
| 0 | 0 | 0 |  |  |  | 0 |
| 0 | 0 | TRUE | TRUE | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0.9 | 0.4 |
| 0 | 0 | 1 | 1 | 0 | 0.8 | 0.7 |
| 0 | 0 | 0 |  |  |  | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0.7 | 0.5 |
| 0.2 | 0.3 | 0.5 | 0.4 | 0.1 | 0.4 | 0.1 |
| 0 | 0 | 1 | 1 | 0 | 0 | 0 |
| 22 | 23 | 24 | 25 | 29 | 30 | 31 |
| 102 | 102 | 102 | 102 | 102 | 102 | 102 |

FIG. 34B

| SCORE ID | ATTR ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT | CREDIBILITY MEASURE | VALUE PRESENT PERCENT | VALUE PRESENT MIN | VALUE PRESENT MAX | VALUE PRESENT BOOL | VALUE PRESENT TEXT | OVER UNDER ADJUSTMENT DELTA | HAS REQUIRED | RAW SCORE | ATTRIBUTE MATCH SCORE |
|---|---|---|---|---|---|---|---|---|---|---|---|---|---|---|---|---|---|---|
| | | | 1 | | | | TRUE | | 1 | | | | TRUE | | | TRUE | 1.0 | 1.0 |
| | | | 1 | | | | TRUE | | 1 | | | | FALSE | | | FALSE | 0.0 | 0.0 |
| | | | 1 | | | | FALSE | | 1 | | | | TRUE | | | TRUE | 1.0 | 1.0 |
| | | | 1 | | | | FALSE | | 1 | | | | FALSE | | | TRUE | 1.0 | 1.0 |
| | | | 0.5 | | | | TRUE | | 1 | | | | TRUE | | | TRUE | 1.0 | 0.5 |
| | | | 0.5 | | | | TRUE | | 1 | | | | FALSE | | | FALSE | 0.0 | 0.0 |
| | | | 0.5 | | | | FALSE | | 1 | | | | TRUE | | | TRUE | 1.0 | 0.5 |

| CLASSIC PERCENT CALCULATION (ROWS=12) | | | | | TRUE | | | FALSE | | |
|---|---|---|---|---|---|---|---|---|---|---|
| MERGED VALUE | MERGED CREDIBILITY | | CRED BUMP | FINAL CRED | CREDIBILITY | MERGED VALUE | MERGED CREDIBILITY | CREDIBILITY | MERGED VALUE | MERGED CREDIBILITY |
| 0.31 | 0.62 | | 0.32 | 0.94 | | 1 | 0.58 | | 1 | 0.64 |
| 0.00 | 6.80 | 2.10 | 4.20 | 12.00 | 2.1 | 2.1 | 1.21 | 4.7 | 4.7 | 2.99 |
| SKILL | VALUE PRESENT BOOL | | | | CREDIBILITY | WEIGHTED VALUE | WEIGHTED CRED | CREDIBILITY | WEIGHTED VALUE | WEIGHTED CRED |
| KID FRIENDLY | FALSE | 0.40 | 0.00 | 0.16 | 0 | 0 | 0.00 | 0.4 | 0.4 | 0.16 |
| KID FRIENDLY | FALSE | 0.80 | 0.00 | 0.64 | 0 | 0 | 0.00 | 0.8 | 0.8 | 0.64 |
| KID FRIENDLY | FALSE | 0.50 | 0.00 | 0.25 | 0 | 0 | 0.00 | 0.5 | 0.5 | 0.25 |
| KID FRIENDLY | FALSE | 0.40 | 0.00 | 0.16 | 0 | 0 | 0.00 | 0.4 | 0.4 | 0.16 |
| KID FRIENDLY | FALSE | 0.80 | 0.00 | 0.64 | 0 | 0 | 0.00 | 0.8 | 0.8 | 0.64 |
| KID FRIENDLY | FALSE | 0.50 | 0.00 | 0.25 | 0 | 0 | 0.00 | 0.5 | 0.5 | 0.25 |
| KID FRIENDLY | TRUE | 0.40 | 0.40 | 0.16 | 0.4 | 0.4 | 0.16 | 0 | 0 | 0.00 |
| KID FRIENDLY | TRUE | 0.80 | 0.80 | 0.64 | 0.8 | 0.8 | 0.64 | 0 | 0 | 0.00 |
| KID FRIENDLY | TRUE | 0.50 | 0.50 | 0.25 | 0.5 | 0.5 | 0.25 | 0 | 0 | 0.00 |
| KID FRIENDLY | TRUE | 0.40 | 0.40 | 0.16 | 0.4 | 0.4 | 0.16 | 0 | 0 | 0.00 |

FIG. 36A

| KID FRIENDLY | FALSE | 0.80 | 0.00 | 0.64 | 0 | 0 | 0.00 | 0.8 | 0.8 | 0.64 |
|---|---|---|---|---|---|---|---|---|---|---|
| KID FRIENDLY | FALSE | 0.50 | 0.00 | 0.25 | 0 | 0 | 0.00 | 0.5 | 0.5 | 0.25 |

FIG. 36B

| SCORE ID | ATTR ID | REQUIREMENT MEASURE | IMPORTANCE MEASURE | VALUE NEEDED PERCENT | VALUE NEEDED MIN | VALUE NEEDED MAX | VALUE NEEDED BOOL | VALUE NEEDED TEXT | CREDIBILITY MEASURE | VALUE PRESENT PERCENT | VALUE PRESENT MIN | VALUE PRESENT MAX | VALUE PRESENT BOOL | VALUE PRESENT TEXT | OVER UNDER ADJUSTMENT DELTA | HAS REQUIRED | RAW SCORE | ATTRIBUTE MATCH SCORE |
|---|---|---|---|---|---|---|---|---|---|---|---|---|---|---|---|---|---|---|
| | | | 0.5 | | 80,000 | 1,00,000 | | | 1 | | 75,000 | 90,000 | | | | TRUE | 0.90 | 0.45 |
| | | | 0.5 | | 80,000 | 1,00,000 | | | 1 | | 60,000 | 2,00,000 | | | | TRUE | 1.00 | 0.50 |
| | | | 0.5 | | 80,000 | 1,00,000 | | | 1 | | 60,000 | 70,000 | | | | TRUE | 0.70 | 0.35 |
| | | 1 | 0.5 | | 80,000 | 1,00,000 | | | 1 | | 60,000 | 70,000 | | | | TRUE | 0.70 | 0.35 |
| | | | 0.5 | | 80,000 | 1,00,000 | | | 1 | | 60,000 | 70,000 | | | | FALSE | 0.70 | 0.00 |

FIG. 37

|  | MERGED AMOUNT MIN | MERGED AMOUNT MAX | MERGED CREDIBILITY |  |  | CRED BUMP | FINAL CREDIBILITY |
|---|---|---|---|---|---|---|---|
|  | 8.24 | 112.35 | 0.77 |  |  | 0.031 | 0.80 |
|  |  |  | 1.70 |  |  | 1.31 |  |
| SKILL | VALUE PRESENT MIN | VALUE PRESENT MAX | CREDIBILITY | WEIGHTED VALUE MIN | WEIGHTED VALUE MAX | WEIGHTED CRED |  |
|  | 5 | 100 | 0.70 | 3.50 | 70.00 | 0.49 | 1 |
|  | 10 | 120 | 0.90 | 9.00 | 108.00 | 0.81 | 1 |
|  | 15 | 130 | 0.10 | 1.50 | 13.00 | 0.01 | 1 |

FIG. 38

MATCHING OF MULTIPLE SIDES WITH MULTIPLE LEVELS OF MIXED CREDIBILITY ATTRIBUTES

CROSS-REFERENCE TO RELATED APPLICATIONS

This application claims priority to and the benefit of the non-provisional patent application No. 62/745,323, titled "Matching Of Multiple Sides With Multiple Levels Of Mixed Credibility Attributes", filed in United States Patent and Trademark Office on Oct. 13, 2018. The specification of the above referenced patent application is incorporated herein by reference in its entirety.

BACKGROUND

There is a need for items such as products, and/or services, and/or persons associated with various domains. For example, job seekers have skills and jobs need skills. People need medical treatment and medical practices provide treatments. A battery for an electronic device may be needed and many batteries are available. A person looking for a romantic meal may desire certain food items and live background music, and restaurants provide food items and music. However, not all items are identical and not all needs are identical. For example, one restaurant may excel in music but provide only acceptable food, while another may excel in food but only provide acceptable music. One person looking for a romantic meal may value music highly, while another may value food highly. Therefore, there is a need for matching items to needs while taking into account the importance of different aspects of the needs.

In a comparison of an item to a need, the number of items that may be considered for a need is generally much larger than a person trying to fill the need can actually consider for satisfying the need. The person seeking to fill a need would prefer to consider only the most suitable items. To identify the most suitable item for a need, there is a need for computing a single numerical score derived from comparing the attributes possessed by the item and the credibility of each of the attributes against the attributes needed and the importance of the needs, where the computed single numerical score can be used to sort the highest scoring items to present to the person seeking to fill a need.

Consider an example where job seekers enter an employment marketplace. There is a need to find jobs that the job seekers may fill. Often the matching of a job to a job seeker is based on a description of a job opening being compared to a resume of a job seeker. However, the resumes are often inaccurate. Therefore, there is a need for matching a job seeker to job descriptions using information beyond that present in a resume created by the job seeker. However, matching best job seekers to the job descriptions are not enough. From the point of view of an employer searching for the right job seeker, the job seeker may not have work authorization, such as, a visa that allows the job seeker to work, the job seeker may live too far from the workplace, the job seeker may not want to work in required shifts, the job seeker may not accept travel, etc. There are different attributes of the job seeker and the employer that need to be matched, such as, the compensation package, the benefits, the work location, work shifts, overtime, travel, visa/work authorizations, etc. Two job seekers with the same skill may match better or worse to an employer based on the different attributes such as, a job seeker does not want to work in Taiwan, while the other job seeker may want to work in Taiwan. Similarly, a job seeker would prefer a job closer to home over a job 90 minutes away. Hence, it does no good to find a suitable job seeker from the employer's point of view if the job seeker would not accept the job offer. Therefore, a description of the need, such as the description of the job opening, describe not only what the employer wants from the job seeker, but also what the employer offers to the job seeker. Similarly, the job seeker skills expands from not only what do the job seeker offers to the employer, as in, what skills the job seeker brings to the employer but also what the job seeker needs from the employer. The employer, on the basis of the need description may find that a job seeker has suitable skills, and the employer is happy to offer $1 USD per hour as compensation, but the job seeker may require a compensation amount that is considerably higher than the amount being offered by the employer.

Items have attributes to offer and there is need in an employment marketplace or in any service that is being offered by any domain for some of the attributes of the item. As used herein, "item" refers to an entity, for example, a product such as a battery, a cell phone, etc., or a service such as a teeth cleaning service, or a person offering a service such as a doctor, a job candidate whose service is the skills the job candidate brings to the job, etc., or any entity that can be characterized by attributes. However, matching the item to the need is often two-sided. For example, the job seeker offers PHP and HTML programming skills and wants an annual salary of $100K and healthcare in return. The job needs an applicant with PHP and HTML skills and the job offers compensation, benefits including healthcare, and some other benefits the job seeker does not value. It can be inferred that each side of the match between the job seeker and the job, both, the job seeker and the job possess attributes, and need attributes from the other side. The job seeker has needs and the job has attributes that are to be matched to the needs of the job seeker. Therefore, there is also a need for matching a job to a job seeker while taking into account the importance of different aspects of the needs of the job seeker. However, in some items, such as, products, the matching of the item to the need is one-sided, for example, a measuring tape does not care who buys the measuring tape. But, a medical practice may care who uses the medical practice, for example, if the medical practice is only for females, or a medical practice is for a service like a free dental clinic that matches needs against attributes of low income, single parent child, etc.

Sometimes, more than one comparison of an item's needs to attributes possessed may be involved in a match, and the matches may be N sided. Sometimes it is a simple bidirectional match between two items such as one side being what an employer needs from a job candidate, while the other side is what a job candidate needs from an employer. More sides are also possible; consider a person wanting to engage a band at a venue. The first side of the match between the person, the band, and the venue may be that the person has needs that the band must fulfill, such as, styles of music. The second side of the match between the person, the band, and the venue may be that the band has needs that the person must fulfill, such as, no children birthday parties. The third side of the match between the person, the band, and the venue may be that the person has needs that the venue must fulfill, such as, space and style of seating. The fourth side of the match between the person, the band, and the venue may be that the venue has needs that the person must fulfill, such as, being a member. The fifth side of the match between the person, the band, and the venue may be that the band has needs that the venue must fulfill, such as, a pit for pyro techniques. The sixth side of the match between the person, the band, and the venue may be that the venue has needs that the band must fulfill, such as, a damage bond. Numerous persons can engage many bands at different venues and if the various sides of the matches between the persons, the bands, and the venues could be scored and combined into a single score, then the score can be used to suggest the better matches between a person, a band, and a venue. However, not all possible sides of the match need to be enabled. That is, in the example of a person wanting to engage a band in a venue, the needs of the venue need not be included in the matching.

Whenever there is more than one side involved in a match, there is a need to compute a final score to determine a multi-directional match between the profiles of the items and needs, and this combination must include the relative importance of the sides. In the case of a candidate and a job, it may be that what the job needs from a candidate is given twice as much importance as what the candidate needs from the job. Nested computations may be needed as the number of sides increase. In the example of the multi-directional match between the person, the venue, and the band, the numerical scores of the 6 sides could be given importance values and combined into a single numerical score. But it might be easier to understand if the scores were nested. A score for "Person needs" could be a combination of side 1 and 3; a score for "Venue needs" could be a combination of sides 4 and 6; a score for "Band needs" could be a combination of sides 2 and 5. The final score could be considered to be a rollup of "Person needs", "Venue needs", and "Band needs" where these combinations become sides that have importance measures and nested sub sides. A more complicated case might be the treatment of cancer. With the many different kinds of providers, facilities, and procedures involved, the number of sides can exceed 500. The single numerical match score computed from these sides may seem to be mysterious and incomprehensible unless these sides are nested into hierarchies. There is a need to compute a single numerical match score from the scores of N sides where these scores have importance measures and where the scores may be nested.

Needs often differ. Some of the attributes of an item may not be needed, others may be required, and only certain amounts of the attribute may be needed. For example, there may be a need for a battery with a 2-year shelf life. One need may consider additional shelf life to be highly desirable, while another need may not consider a longer shelf life to be important. Needs can be characterized by amounts of attributes needed in an item and the importance of those attributes when comparing items to the need. There are important measures for the needs of the job seekers as well. One job seeker may absolutely need good healthcare for dependents, while another job seeker may not care. Similarly, one job seeker may highly value better healthcare while another job seeker values tuition reimbursement. There is a need to consider the importance of needs when computing a match score.

All attributes possessed have a credibility level. Some attributes possessed are known with absolute credibility such as does the job seeker have a medical degree, does the employer sponsor for the position, etc. Others, particularly those derived from mixed ratings, may have lesser credibility levels. For example, how "nice" an employer is, or how well "PHP" is mastered by a candidate may be known with less than perfect credibility. There is a need to consider the credibility of an attribute possessed when matching that attribute against a need.

The ratings of the attributes of the items are typically represented by whole numbers as a percentage or a number in the range 0 to 1. However, many more attributes of the items are required for accurate matching of the items to the needs. The attributes are well rated in different data types, such as, Boolean values for representing TRUE or FALSE, ranges with minimum values and maximum values for salary, etc. Hence, there is a need for including the ratings of the attributes of the item and the credibility of each of the ratings in different data types.

Furthermore, in a side, the attributes possessed and attributes needed by the items and the needs follow a hierarchy. For example, benefits offered to a candidate by a job may be broken down to sub-attributes insurance, and tuition with corresponding importance measures. Consider, at the same level in the hierarchy of the attributes possessed, an applicant's Compensation. Compensation may have an importance of 0.6 relative to an importance of Benefits of 0.4. A change might cause the tuition sub attribute to score higher or lower and this will affect the score of its parent attribute Benefits. However, that Benefits may have changed its score does not change how important it is relative to Compensation. Also, within Benefits, the importance of tuition might be changed and this can affect the score for Benefits. But the importance of tuition does not change how important Compensation is relative to Benefits. There is a need to determine the numerical scores corresponding to parent attributes from the numerical scores corresponding to the sub-attributes using the importance of the parent attributes.

Descriptions of items created by providers of the items often do not provide the information desired, or are inaccurate such as when describing only the best attributes of an item, or even substantially misstating the attributes of the item. Dissatisfaction with an item often results when the need is filled by an item where the required attributes of the item are not present in the item. The need may be performed inefficiently by the item, and a need may have to be filled again soon. Hence, there is a need for matching items to needs, even when attributes of the item are discovered using information beyond that present in a description created by the item provider.

An alternative source of information about the attributes of an item, for example, music quality, is ratings provided by those claiming to have used or to know of the item. As with information present in a description of the item, the ratings provided by people may be inaccurate, possibly from personal bias or possibly from a lack of knowledge about certain attributes possessed by the item. Moreover, while using a computer system to determine whether a rating provided for the attributes of an item is accurate and not feasible, the computer system can be programmed to assign a credibility measure to the rating and the credibility of the rating can be a factor when using the rating to match an item to a need. For example, a person who is known to have actually used the item may have a higher credibility in their ratings than one who has not. Or a user who gives only the best score to every attribute may have their ratings considered less credible. Hence, there is a need for including ratings provided to the items, and also the credibility of each of the ratings, an item to a need. Furthermore, the attribute ratings may occur multiple times with different ratings and credibility measures for the attribute. Hence, there is a need to compute an aggregation of ratings for each attribute possessed by the item.

Hence, there is a long felt but unresolved need for a method and a system for determining a degree of match between N different kinds of item profiles with respective attributes possessed of varying credibility and respective attributes needed of varying importance by computing a single numerical final score for the degree of match.

SUMMARY OF THE INVENTION

This summary is provided to introduce a selection of concepts in a simplified form that are further disclosed in the detailed description of the invention. This summary is not intended to determine the scope of the claimed subject matter. The method and the system disclosed herein address the above recited need for determining a degree of match between item profiles, for example, job seeker profiles, profiles of restaurants, profiles of physicians, profiles of products, job descriptions, food item choices of customers, health conditions of patients, etc., with respective attributes possessed, for example, skills and core traits, and respective attributes needed, for example, job description attributes, skill of the physician treating the patient, skills of the restaurants in preparing the food item of choice of the customers, etc., of varying importance and varying credibility by computing a single numerical final score. For example, an item profile may be the set of attributes possessed and the sets of attributes needed with a common profile_id. The method and the system disclosed herein relate to how item profiles are matched with each other. The method and the system match attributes possessed by an item profile with attributes needed by other item profiles, and the method and the system match attributes needed by an item profile with the attributes possessed by other item profiles. The method and system disclosed herein also relate to how ratings of attributes are aggregated into a combined attribute possessed, with combined value present and combined credibility measures. Multiple item profiles may be involved in a match, for example patient, physician, and hospital. The method and the system disclosed herein also relate to how the results from matching N item profiles are combined.

The method disclosed herein employs a multi-directional attribute matching system (MAMS) incorporating a computer system architecture comprising at least one computer server. The computer server comprises at least one database server and at least one processing computer server. The database server hosts one or more databases for storing a predefined attribute list, an attributes possessed list, an attributes needed list, and a matched attribute list. The processing computer server comprises at least one processor communicatively coupled to the database server via a network. The processor is configured to execute computer program instructions defined by modules of the MAMS for determining a degree of match between the item profiles with the respective attributes possessed of varying credibility and respective attributes needed of varying importance.

The multi-directional attribute matching system (MAMS) receives a side specification list comprising rows that either specifies the importance weighted rollup along with subrows of importance weighted rollup and inclusion of a specific attribute score formed by matching the attributes needed by an item profile against the item possessed from another item profile. The side specification rows are listed as parent rows or hierarchical sub-rows of the parent rows in the side specification list. In the side specification rows, the profiles are represented by abstract place holder names rather than specific profile ids. When invoked with the id of a parent row in the side specification list, and with tuples that associate profile names to actual profile ids, entries are made in a fit score table corresponding to the parent row from the side specification list and for each sub-row in its hierarchy, except that the actual profile ids are used instead of the placeholder names. The rows inserted into the fit score table retain links to the side list to which they correspond to the side specification table.

The multi-directional attribute matching system (MAMS) receives an attributes possessed list comprising the attributes possessed, a profile_id, and an attribute_id from a predefined attribute list. The attributes possessed are listed as parent attributes or hierarchical sub-attributes of the parent attributes in the predefined attribute list. The attributes possessed list comprises the attributes possessed and first tuples corresponding to the attributes possessed. The first tuples comprise value present measures corresponding to the attributes possessed and credibility measures indicating credibility of the value present measures.

The multi-directional attribute matching system (MAMS) further receives an attributes needed list comprising the attributes needed from the predefined attribute list. The attributes needed are listed as parent attributes or hierarchical sub-attributes of the parent attributes in the predefined attribute list. The attributes needed list comprises the attributes needed, and second tuples corresponding to the attributes needed. The second tuples comprise requirement measures, corresponding attribute importance measures, and value needed measures associated with the attributes needed. The value present measures and the value needed measures are of different data types comprising a percentage, a numerical range, a Boolean value, and a text.

For every row in the fit score table that specifies a match, the multi-directional attribute matching system (MAMS) generates and stores a raw score and Has Requirements measure computed using the Item_id and Profile_id of the item with attributes possessed, and the Item_id and Profile_id of the item with attributes needed. The MAMS generates a table of matched attributes by creating a row for the attribute possessed identified by the attribute id from the side specification entry for the match and from the profile_id of the item with the attributes needed, and for all of its sub-attributes, and with the values from the attributes possessed table for the attribute and for the profile_id of the item with the attributes possessed. The MAMS generates an attribute match score for each of the matched attributes in the generated matched attribute list from a raw score corresponding to each of the matched attributes using the value possessed measures and the credibility measures corresponding to the attributes possessed, and the value needed measures, the attribute importance measures, and the requirement measures associated with the attributes needed.

If a matched attribute is a parent attribute and the other matched attributes are hierarchical sub-attributes of the parent attribute in the matched attribute list, the multi-directional attribute matching system (MAMS) computes a nested raw score corresponding to the parent attribute using the attribute match scores corresponding to the hierarchical sub-attributes. Using the nested raw score and attribute importance measure corresponding to the parent attribute, the MAMS generates an attribute match score and Has Requirements measure for the parent attribute. The score match row identified by the attribute id from the side specification entry for the match becomes the raw score in the Fit Score table, and the Has Requirement measure becomes the Has Requirement measure in the same row in the Fit Score table identified by the attribute_id from the side specification entry for the match as disclosed in the detailed description of FIG. 19. A match score in the Fit Score table for the corresponding raw score is computed by multiplying the raw score match by the importance measures from the linked side specification list row as disclosed in the detailed description of FIG. 19.

For every row in the fit score table that specifies a rollup, a match score is computed using the importances as weights in the aggregation of the match scores of the sub rows into a single match score. The Has Requirements measure is true, if the Has Requirement measure is true for every sub-row. The multi-directional attribute matching system (MAMS) uses the match score and Has Requirements measure of the parent row in the Fit Score table as the final score defining the degree of match between each of the items.

The attributes possessed and the attributes needed follow a hierarchy. The attributes possessed and the attributes needed may have sub-attributes. The hierarchy is not merely a human organizational aid, but encapsulates the possibly changing sub-attributes for generating a single score. The importance of the sub-attributes gives a parent attribute a weight relative to other attributes at the same level in the hierarchy. The method disclosed herein performs nesting of attributes with rollups of each sublevel of attributes in the hierarchy to a single numerical score. The attributes possessed and the attributes needed have credibility and value present measures corresponding to the attributes possessed can be consolidated from multiple ratings, with consolidated credibility. The attributes needed have corresponding importances; some attributes needed are required.

Some attributes possessed are flagged to be computed from an aggregation of ratings. In a list of attribute ratings, the attributes possessed may occur multiple times with different corresponding value present measures and different corresponding credibility measures. The list of attribute ratings is not a unified list. The attributes possessed in the item profile are, for example, expertise in Microsoft® Word of Microsoft Corporation when the item is a job seeker, capacity when the item is a battery, ambiance when the item is a restaurant, neurology when the item is a medical provider and the attributes possessed by the need are, for example, compensation offered by the job, benefits offered by the job, etc. The multi-directional attribute matching system (MAMS) generates unique attributes possessed with corresponding merged value present measures and merged credibility measures indicating credibility of the merged value present measures, by performing merging actions on the attributes possessed in the list of attribute ratings and input to the attributes possessed list. Even for a single rating that goes through the process, a credibility adjustment may be required. In an embodiment, the multi-directional attribute matching system (MAMS) determines whether an attribute needed in the matched attribute list has no ratings and assigns default values to a value present measure and a credibility measure corresponding to the absent attribute needed.

The final score indicates a multi-directional match between multiple item profiles. The computation of the final score comprises an importance weighted aggregation of the scores of each direction, where each such score comprises the credibility of the assessments of the attributes in an item profile to a need and importance of attributes in another item profile.

The multi-directional attribute matching system (MAMS) for determining a degree of match between the item profiles with respective attributes possessed of varying credibility and respective attributes needed of varying importance comprises at least one computer server, at least one database server, and at least one processing computer server. The at least one computer server of the multi-directional attribute matching system (MAMS) determines a degree of match between the item profiles with respective attributes possessed of varying credibility and respective attributes needed of varying importance. The at least one database server of the multi-directional attribute matching system (MAMS) hosts one or more databases for storing a predefined attribute list, an attributes possessed list, an attributes needed list, and a matched attribute list.

The processing computer server of the multi-directional attribute matching system (MAMS) comprises at least one processor communicatively coupled to the database server via a network. The processor is configured to execute the computer program instructions defined by modules of the multi-directional attribute matching system (MAMS). The modules of the multi-directional attribute matching system (MAMS) comprise a side specification list receiving module, an attributes possessed list receiving module, an attributes needed list receiving module, a generation and storage module, a table generation module, a first attribute match score generation module, a computation module, a second attribute match score generation module, and a match score computation module.

The side specification list receiving module of the multi-directional attribute matching system (MAMS) receives a side specification list comprising rows that specify one of importance weighted rollup along with subrows of importance weighted rollup and inclusion of a specific attribute score formed by matching attributes needed by an item profile against item possessed from another item profile. The side specification rows are listed as parent rows or hierarchical sub-rows of the parent rows in the side specification list. The profiles are represented by an abstract place holder names in the side specification rows. When invoked with id of a parent row in the side specification list, and with tuples that associate profile names to actual profile ids, entries are made in a fit score table corresponding to the parent row from the side specification list and for each of the hierarchical sub-rows of the parent rows using actual profile ids. The rows inserted into the fit score table retain links to the side list to which the inserted rows correspond to the side specification table.

The attributes possessed list receiving module of the multi-directional attribute matching system (MAMS) receives the attributes possessed list comprising one or more attributes possessed, a profile_id, an attribute_id from a predefined attribute list. The attributes possessed are listed as one of parent attributes and hierarchical sub-attributes of the parent attributes in the predefined attribute list. The attributes possessed list comprises the attributes possessed and first tuples corresponding to the attributes possessed. The first tuples comprise value present measures corresponding to the attributes possessed and credibility measures indicating credibility of the value present measures.

The attributes needed list receiving module of the multi-directional attribute matching system (MAMS) receives the attributes needed list comprising the attributes needed from the predefined attribute list. The attributes needed are listed as one of parent attributes and hierarchical sub-attributes of the parent attributes in the predefined attribute list. The attributes needed list comprises the attributes needed, and second tuples corresponding to the attributes needed. The second tuples comprise requirement measures, corresponding attribute importance measures, and value needed measures associated with the attributes needed. The value present measures and the value needed measures are of different data types comprising a percentage, a numerical range, a Boolean value, and a text.

The generation and storage module of the multi-directional attribute matching system (MAMS) generates and stores, for every row in the fit score table that specifies a match, a raw score and Has Requirements measure computed using the Item_id and Profile_id of the item with attributes possessed, and the Item_id and Profile_id of the item with attributes needed. The table generation module of the multi-directional attribute matching system (MAMS) generates a table of matched attributes by creating a row for with the attribute possessed identified by the attribute_id from the side specification entry for the match and from the profile_id of the item with the attributes needed, and for all of its sub-attributes, and with the values from the attributes possessed table for the attribute and for the profile_id of the item with the attributes possessed.

The first attribute match score generation module of the multi-directional attribute matching system (MAMS) generates an attribute match score for each of the matched attributes in the generated matched attribute list from a raw score corresponding to each of the matched attributes using the value possessed measures and the credibility measures corresponding to the attributes possessed, and the value needed measures, the attribute importance measures, and the requirement measures associated with the attributes needed. The computation module of the multi-directional attribute matching system (MAMS) computes a nested raw score corresponding to the parent attribute using the attribute match scores corresponding to the hierarchical sub-attributes, if a matched attribute is a parent attribute and the other matched attributes are hierarchical sub-attributes of the parent attribute in the matched attribute list.

The second attribute match score generation module of the multi-directional attribute matching system (MAMS) generates an attribute match score and Has Requirements measure for the parent attribute using the nested raw score and attribute importance measure corresponding to the parent attribute. The score match row identified by the attribute_id from side specification entry for the match becomes the raw score in the Fit Score table. The Has Requirement measure becomes the Has Requirement measure in the same row in the Fit Score table identified by the attribute id from the side specification entry for the match. A match score in the Fit Score table for the corresponding raw score is computed by multiplying the raw score match by the importance measures from the linked side specification list row.

The match score computation module of the multi-directional attribute matching system (MAMS) computes a match score for every row in the fit score table that specifies a rollup using the importances as weights in the aggregation of the match scores of the sub rows into a single match score. The Has Requirements measure is true, if the Has Requirements measure is true for every sub-row. The multi-directional attribute matching system uses the match score and Has Requirements measure of the parent row in the Fit Score table as the final score defining the degree of match between each of the items.

BRIEF DESCRIPTION OF THE DRAWINGS

The foregoing summary, as well as the following detailed description of the invention, is better understood when read in conjunction with the appended drawings. For illustrating the invention, exemplary constructions of the invention are shown in the drawings. However, the invention is not limited to the specific methods and components disclosed herein.

FIG. 17 exemplarily illustrates a tabular representation of a side specification list generated for multi-directional match between different item profiles.

FIGS. 18-38 exemplarily illustrate tabular representations of computations for determining a degree of match between candidate profiles and job profiles with respective attributes possessed and respective attributes needed of varying credibility and varying importance by the multi-directional attribute matching system (MAMS).

DETAILED DESCRIPTION OF THE INVENTION

Figure 1:
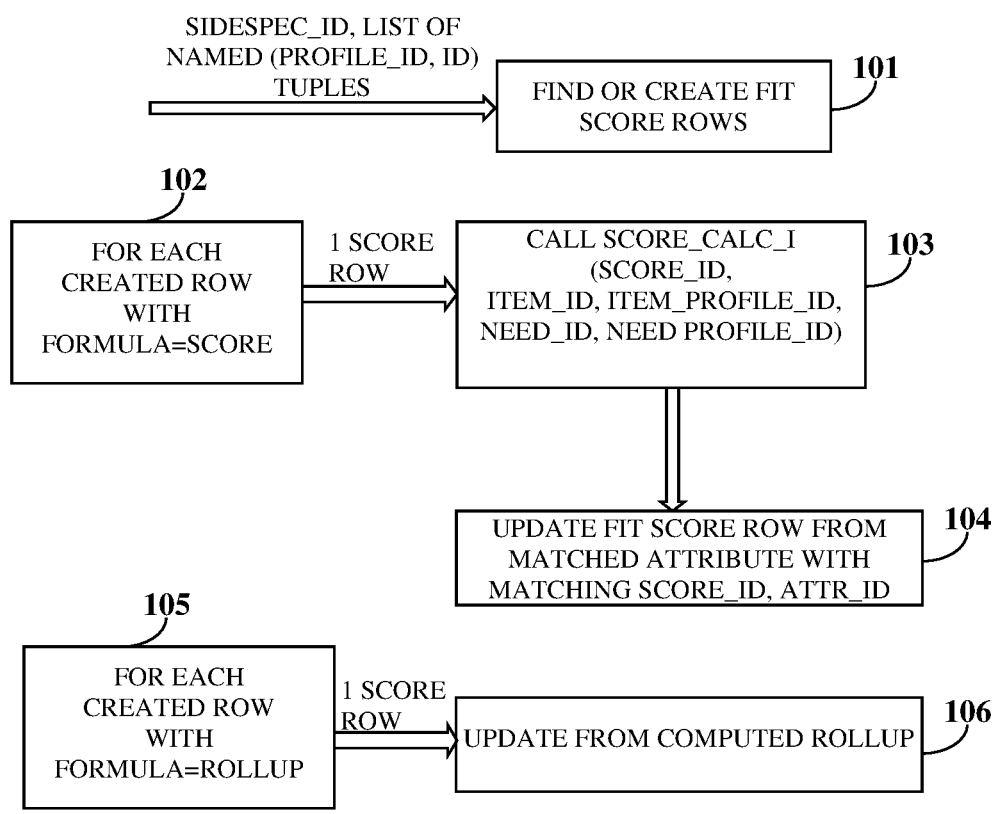
FIG. 1 exemplarily illustrates a method for generating a final score by a multi-directional attribute matching system on comparison of attributes possessed of varying credibility with attributes needed of varying importance in item profiles.

Disclosed herein is a method for determining a degree of match between item profiles with respective attributes possessed and respective attributes needed of varying importance and varying credibility. As used herein, "item" refers to an entity, for example, a product such as a battery, a cell phone, etc., or a service such as a teeth cleaning service, treatment provided to patients by hospitals, a job role in an organization performed by an employee, etc., or a person or an individual offering a service such as a doctor, a job seeker whose service is the skills the job seeker brings to the job, a tradesman offering certain good quality services such as work on cabinets at a low price rate, an organization such as a hospital, a company, a restaurant, etc., or any entity that can be characterized by attributes. In the method disclosed herein, the attributes possessed in an item profile are to be matched to the attributes needed in other item profiles and the attributes needed in an item profile are to be matched to the attributes possessed in the other item profiles. The items possess some attributes required for filling a need smoothly and efficiently and need some attributes to perform the function desired by the need smoothly and efficiently. The attributes for a product comprise core traits of the product. The attributes for a service or a person comprise core traits and/or domains of expertise of the service or the person. The attributes possessed by the person are, for example, programming skills, such as PHP and HTML needed for a job requiring the programming skills. The attributes needed by the person are, for example, an annual compensation of $100K and healthcare benefits from the job for performing the function defined in the job smoothly and efficiently. The attributes possessed by a job, are flexible work shifts, overtime compensation, salary, etc., and the attributes needed by the job from employees are, for example, PHP and HTML programming skills, confidence, integrity, etc. An item, for example, an underlying job, may have multiple profiles, with IDs J1_p1 and J1_p2. In the first profile J1_p1, the attributes possessed, for example, base compensation may be high but healthcare is not offered. In the second profile J1_p2, the base compensation is lower but healthcare is offered. Similarly, for another item, for example, a job seeker, the attributes needed may be a job location as hometown at a lower compensation, or a job location as a big city at a higher compensation. Thus, an item may have multiple profiles of attributes needed and attributes possessed. A side match score may be computed from matching of the needs held by one item profile against the attributes possessed by another item profile. A side match is one parent attribute needed, and all of its subrows of one profile id against the attributes possessed from another profile_id. Any number of item profiles may be matched and a final score is formed from an aggregation of the matches, as indicated by a side specification control table. The method disclosed herein employs a multi-directional attribute matching system (MAMS) incorporating a computer system architecture comprising at least one computer server. The computer server comprises at least one database server and at least one processing computer server. The database server hosts one or more databases for storing a predefined attribute list, an attributes possessed list, an attributes needed list, a matched attribute list, a side specification list, attribute ratings, a fit score table and a matched attribute table. The processing computer server comprises at least one processor communicatively coupled to the database server via a network. The processor is configured to execute computer program instructions defined by modules of the MAMS for determining a degree of match between the item profiles with the respective attributes possessed and respective attributes needed of varying importance and varying credibility.

The multi-directional attribute matching system (MAMS) performs multi-directional match between different item profiles, for example, a match between a job seeker, a job, and housing, a match between a traveler, an airline, a hotel, and a car, etc. The multi-directional match involves different sides, where each side comprises a match between an attribute needed by one item profile, and all of its sub attributes, against the attributes possessed by another item profile. That is, in every side, there is an item and a need. In the example for determining a match between the job seeker, the job, and housing, the different sides are a match between attributes possessed by a job seeker and attributes needed by job, a match between attributes possessed by the job and attributes needed by the job seeker, a match between attributes possessed by housing and attributes needed by the job seeker, a match between attributes possessed by the job seeker and attributes needed by the housing, a match between attributes possessed by the job and attributes needed by the housing, and the match between attributes possessed by the housing and attributes needed by the job. In an example of 23 interrelated factors to be matched, such as, social workers, psychiatrists, nurses, rehabilitation specialists, nutritionists, clergy, hospice workers, radiologist, neurologist, surgeon, treatment plan, education, hospital, radiology center, home aides, pharmacy, insurance, type of tumor, deficits, transportation, lodging, prosthesis, and wheelchair, the MAMS performs multi-directional matching of 506 sides. If another factor, for example, an oncologist is added, the MAMS performs multi-directional matching of 552 sides. If another factor is added, the MAMS performs multi-directional matching of 600 sides. The sides are identified by rows whose side formula is SCORE in a side list as exemplarily illustrated in FIG. 18.

The attributes possessed and the attributes needed in the item profiles in the sides of a multi-directional match are parent attributes or hierarchical sub-attributes of the parent attributes as defined in the predefined attribute list exemplarily illustrated in FIGS. 20A-20E. Consider, for example, an attribute possessed by an item, for example, a job compensation. The hierarchical sub-attributes that constitute the attribute possessed are base salary, bonus, and overtime. The attributes possessed that are parent attributes or hierarchical sub-attributes of the parent attributes constitute an attributes possessed list and the attributes needed that are parent attributes or hierarchical sub-attributes of parent attributes constitute an attributes needed list. In the predefined attribute list, the attributes possessed and the attributes needed are identified by ATTR_ID. If the attributes possessed and the attributes needed are hierarchical sub-attributes of the parent attributes, the hierarchical sub-attributes are also identified with a PARENT_ATTR_ID of the parent attribute in the predefined attribute list. The hierarchy of the sub-attributes under a parent attribute can be multi-leveled. That is, for example, a parent attribute possessed by a job is benefits, the first level sub-attributes of benefits are healthcare, relocation assistance, sick leave, paternity leave, etc. The sub-attributes health, vision, and mental care of the first level attribute healthcare form the second level of sub-attributes of the parent attribute. The second level of sub-attribute health further comprises a third level of sub-attributes such as, for self, for spouse, and for children. In the predefined attribute list, the sub-attributes are identified with the corresponding level in the hierarchy.

In the predefined attribute list, the attributes possessed and the attributes needed are properties or domains of expertise of items extracted from item profiles. Some of the properties can be considered to be a "core trait" where the core traits are possessed by all items in the multi-directional attribute matching system (MAMS), while the other attributes are possessed by some items. For example, every product has quality and durability; every doctor has bedside manner and communication skills; and every restaurant has service quality. The core traits comprise, for example, dependability, integrity, confidence, responsiveness, punctuality, communication, cleanliness, ambience, etc. The core traits are flagged using an "isTrait" flag in the predefined attribute list exemplarily illustrated in FIGS. 20A-20E. Attributes not marked as a core trait are specific to the items. For job seekers, the non core trait attributes are domains of expertise, for example, Microsoft Word, hypertext preprocessor (PHP) programming attributes, etc. For restaurants, the non core trait attributes are the expertise of the restaurant in certain food preparations, for example, chicken soup, pepperoni pizza, etc. For physicians, the non core trait attributes are knowledge in a specific domain such as orthodontics, orthopedics, pediatrics, etc. For physical items such as products, the core attributes comprise, for example, color, electrical capacity, size, quality, and durability.

The attributes possessed in the attributes possessed list have a corresponding value present measures and corresponding credibility measures indicating credibility of the value present measures. All attributes possessed may have credibility, but only some attributes are built from ratings. From the item profiles, for example, job profiles such as resumes or reviews of the job seekers, profiles of the restaurants, profiles of the hospitals, a rating of the proficiency of the item is provided by a reviewer associated with the items and the needs. The ratings are provided by the entities, for example, the companies, the job seekers, the physicians, the restaurants, etc., to the attributes possessed by the items. As used herein, "value present measure" refers to a quantized value of the proficiency of the items in the attributes possessed. The value present measure is a numerical value between 0 and 1, a boolean, a range or text. The value present measure represents a degree to which an attribute is present in an item. A value of 1 of the value present measure indicates that the attribute is possessed to a maximum level possible, that is, the item is highly proficient in the attribute. A value of 0 of the value present measure indicates that the attribute is not present, that is, the item does not possess the attribute. A value of NULL of the value present measure indicates that the attribute possessed is not known. An attribute possessed by an item, for example, ambience of a restaurant is rated by the customer and a value present measure of 1 is awarded by the customer. The value present measure of 1 for the ambience indicates the ambience offered by the restaurant is excellent. Attributes in the predefined attribute list may have corresponding default values for the value present measures and the credibility measures. In an embodiment, the attributes in the predefined attribute list do not have corresponding default values for the value present measures and the credibility measures.

The credibility measure refers to a numerical value between 0 and 1, both inclusive and NULL. The credibility measure represents the probability of the value present measure being accurate. For example, a value present measure for an attribute possessed in the attributes possessed list with a credibility of 0.9 is treated to represent that the attribute is actually present or is true 9 times out of 10. Furthermore, any particular attribute possessed may be present multiple times with possibly different values for value present measures and the credibility measures in a list of attribute ratings exemplarily illustrated in FIG. 23. The different values of the value present measures and the credibility measures are obtained from multiple reviewers reviewing the attributes possessed. The value present measures and the credibility measures from the list of attribute ratings exemplarily illustrated in FIG. 23 are merged to form a unique attribute possessed in the attributes possessed list with a single corresponding merged value present measure and a single corresponding merged credibility measure as exemplarily illustrated in FIG. 25 using merging actions exemplarily illustrated in FIGS. 26A-26F.

The attributes needed in the attributes needed list have corresponding value needed measures, corresponding requirement measures, and corresponding attribute importance measures as exemplarily illustrated in FIGS. 22A-22B. As used herein, "value needed measure" refers to a quantized value of the proficiency of an item in satisfying requirements of a need. The value needed measure is a numerical value between 0 and 1, both inclusive, a boolean, a range or text. The value needed measure represents the degree to which the attributes needed are required. A value of 1 of the value needed measure indicates that the attribute is needed to a maximum level possible and a value of 0 of the value needed measure indicates that the attribute is not needed. A value of 0.2 of the value needed measure indicates that only 20% proficiency in the attribute is needed from the item. The value needed measure is defined by the other items or entities, for example, companies, customers, patients, etc., seeking services from the items, and also, by the items delivering services to other items. For the smooth performance of the service, the need defines the attributes needed from the item with corresponding requirement measures and corresponding attribute importance measures.

Also, as used herein, "requirement measure" is a Boolean value associated with an attribute needed representing that the value present measure of the attribute possessed by an item is required to be possessed to some degree where the attribute possessed is the same as the attribute needed. The attribute has a match formula and when matching this controls which matching subroutine will be used to compute both a raw match score and a Has Requirements measure. The match is considered to be a non-match if any attribute needed with a true requirement measure has a non-true computed Has Requirements measure. The requirement measure is associated with the attributes needed that are basic and mandatory for satisfying a requirement, for example, licenses and certifications such as a medical license for a physician to treat a patient, a certified public accountant (CPA) for auditing accounts of a company, minimum salaries, etc.

Also, as used herein, "attribute importance measure" is a quantized value representing the degree to which presence of an attribute needed in the attributes possessed list is needed for the computation of the parent attribute needed for an item. That is, the attribute importance measure is the weightage associated with an attribute possessed for the need. The attribute importance measure is a numerical value between 0 and 1, both inclusive. The importance measure is relative to the importances of any sibling attributes. For example, an attribute needed with an attribute importance measure of 0.2 is weighed twice as strongly as a sibling with an importance of 0.1 when computing the match of the parent attribute. If there are no other sibling attributes, the attribute with the importance measure of 0.2 is the dominant attribute when computing the score of the parent attribute. The importance measures have no effect beyond the computation of the score of their parent. For example, compensation might have an importance of 0.8 and a sub-attribute bonus with an importance of 0.3, while benefits might have an importance of 0.1 and a sub attribute health care with an importance of 0.9. In the final score, health care with its importance of 0.9 might not have contributed more to the score than bonus with its importance of 0.3 because these importances only affected the score of their parent attributes, in conjunction with the scores and importance measures of sibling attributes, and the parent attributes have their own importance measures.

In the method disclosed herein, the multi-directional attribute matching system (MAMS) receives a side specification list as exemplarily illustrated in FIG. 18 that defines the sides to be scored and the relative importances of the sides. When invoked with tuples supplying named profile_ids and item_ids corresponding to every placeholder Item Name and Need Name, MAMS inserts into the fit score table as exemplarily illustrated in FIG. 19 rows corresponding with and linked to the side spec list but with the profile_ids and item_ids taken from the invocation tuples, FIG. 1, step 101. The MAMS selects from the fit score list a side whose linked side spec row formula is "score" and identified by the SIDESPEC_ID and PARENT SIDESPEC_ID. For the selected side, the MAMS retrieves the attributes needed list, comprising the attributes needed in the item profiles from the predefined attribute list. The attributes needed list exemplarily illustrated in FIGS. 22A-22B comprises the attributes needed and second tuples corresponding to the attributes needed. The MAMS finds a matched attribute list by matching the attributes possessed in the attributes possessed list exemplarily illustrated in FIGS. 21A-21C, with the attributes needed in the attributes needed list exemplarily illustrated in FIGS. 22A-22B. The attributes possessed and the attributes needed listed in the predefined attribute list are defined using different datatypes comprising a percentage, a numerical range, a Boolean value, and a text. The numerical range is expressed using a minimum value and a maximum value. In an embodiment, the Boolean values are expressed as percentages where 0% and 100% indicate TRUE and FALSE respectively.

The multi-directional attribute matching system (MAMS) generates a table of matched attributes by creating a row for the attribute possessed identified by the attribute_id from the side specification entry for the match and from the profile_id of the item with the attributes needed, and for all of its sub-attributes, and with the values from the attributes possessed table for the attribute and for the profile_id of the item with the attributes possessed. For each attribute needed whose match formula is not RollUp, the MAMS generates a Has Requirement measure and calculates a raw score corresponding to each of the matched attributes by using the value present measures corresponding to the attributes possessed, and the value needed measures corresponding to the attributes needed. A match score is then computed using the calculated raw score, the importance measure associated with the attributes needed, and the credibility measure associated with the attributes possessed.

For each attribute needed whose match formula is RollUp, and the other matched attributes are hierarchical sub-attributes of the attribute in the matched attribute list, the multi-directional attribute matching system (MAMS) computes a nested raw score using the importances as weights in the aggregation of the match scores of the sub-attributes, and the Has Requirements measure is computed as true if the Has Requirements measure is true for each of the sub-attributes. Using the nested raw score and attribute importance measure corresponding to the parent attribute, the MAMS generates an attribute match score for the parent attribute. A match score is computed by multiplying the raw score match score by the importance from the linked side specification list row. The attribute with ATTR_ID 3 is a sub-attribute of a matched attribute of ATTR_ID 1. Using the nested raw score and attribute importance measure corresponding to the parent attribute, for example, the attribute with ATTR_ID 1, the MAMS generates an attribute match score and Has Requirements measure for the parent attribute with ATTR_ID 1. The score the match row identified by the attribute_id from the side specification entry for the match becomes the raw match score in the Fit Score table row that specified the match and the Has Requirement measure becomes the Has Requirement measure in this row for the SCORE_ID 101, as exemplarily illustrated in FIG. 20.

For every row in the fit score table that specifies a rollup, a match score is computed using the importances as weights in the aggregation of the match scores of the sub rows into a single match score. The multi-directional attribute matching system (MAMS) computes the final score corresponding to SCORE_ID 100 as (need fit score*need fit score importance+item fit score*item fit score importance)/(need fit score importance+item fit score importance). This score becomes the raw match score in the Fit Score table row that specified the match and the Has Requirement measure becomes the Has Requirement measure in this row. A match score is computed by multiplying the raw score match score by the importance from the linked side specification list row.

For every row in the fit score table that specifies a rollup, a match score is computed using the importances as weights in the aggregation of the match scores of the sub rows into a single match score. The Has Requirements measure is true if the Has Requirement measure is true for every sub-row as disclosed in the detailed description of FIG. 19.

The match score in the fit score table for rows, whose linked side specification row formula is score, is taken from the table of matched attributes for the attribute identified in the linked side specification table. Thus, the attribute match scores for the different sides and the final score for a combination of item profiles is stored in the fit score table exemplarily illustrated in FIG. 19. Using the attribute match scores and the final match score computations, the multi-directional attribute matching system (MAMS) implementing the method disclosed herein allows candidates and companies to explore questions, such as, why the companies that look so good to a candidate do not want the candidate, why the candidates that look so good to a company will not hire the candidates, and why the candidates are not being shown jobs from companies that seem to really want the candidates. That is, the needs of the candidates are too picky, maybe if the candidates adjust their requirement a bit, more jobs will appear. Also phrased another way, what is it from the requirements of the candidates that causes companies that like the candidates to not be considered a fit. The MAMS provides the data that enables this analysis, but the MAMS does not have a user interface and does not by itself directly offer such analysis.

The final match score computations also allow the candidates and the companies to explore questions such as why the companies are not being shown candidates that really want to work for the companies, that is, the job requirements of the companies are too picky, maybe if the companies loosen the requirements a bit, more candidates will appear. The final score computations allow the companies to explore questions such as what is it about job requirements of the companies that cause the candidates to like the companies to not be considered and allows users of the multi-directional attribute matching system (MAMS) to judge maybe one or two of the attributes possessed and attributes needed by the users are causing the bad final scores between the item profiles. Using the MAMS, the companies are aware that the companies can be matched to many better candidates if the candidates only offered additional facilities to the employees, such as daycare. Using the MAMS, the companies decide what benefits to reduce or increase by testing what impact the altered benefits would have on the candidate pool. The candidates will be aware that lack of travel is holding the candidate back, which skill the candidate should work hardest to enhance. The MAMS advices educational institutions about the skills that are holding people back, and provides the educational institutions the statistics to use in advertising. The MAMS provides the data that enables this analysis, but the MAMS does not have a user interface and does not by itself directly offer such analysis.

In an embodiment, the multi-directional attribute matching system (MAMS) receives an attributes needed list for the selected side comprising the attributes needed in the item profiles from the predefined attribute list. The attributes needed list exemplarily illustrated in FIGS. 22A-22B comprises the attributes needed and second tuples corresponding to the attributes needed. The second tuples comprise the requirement measures, the corresponding attribute importance measures, and the value needed measures associated with the attributes needed. The multi-directional attribute matching system (MAMS) generates a matched attribute list for the selected side as exemplarily illustrated in FIG. 29 and FIGS. 36A-36B comprising matched attributes by matching the attributes possessed with the attributes needed. The MAMS determines whether an attribute needed is absent in the attribute possessed list and assigns default values to a value present measure and a credibility measure corresponding to the absent attribute possessed. The MAMS generates a Has Requirement measure, a raw score, and a match score corresponding to each of the matched attributes by invoking the match formula associated with the attribute where the match formula uses the match formula parameter, the value present measures and the credibility measures corresponding to the attributes possessed, and the value needed measures, the attribute importance measures, and the requirement measures associated with the attributes needed as disclosed in the detailed description of FIG. 29 and FIGS. 29A-29B.

In an embodiment, the multi-directional attribute matching system (MAMS) computes a nested raw score of the sub-attributes of the parent matched attributes in the matched attribute list. An attribute match score for each of the sub-attributes of the parent matched attributes is computed by the MAMS and the computed attribute match score is used to generate the attribute match score for the parent matched attribute as disclosed in the detailed description of FIGS. 29A-29B.

Consider an example where the matched attributes and a hierarchy of the sub-attributes of matched attributes are as shown below:
1. Skills Match Score
    1.1. Skill1 match score
    1.2. Skill2 match score
    1.3. Another skill from a large and varying list
2. Compensation
    2.1. Base
    2.2. Bonus
    2.3. Overtime
3. Benefits
    3.1. Healthcare
        3.1.1. Health
            3.1.1.1. for self
            3.1.1.2. for spouse
            3.1.1.3. for children
        3.1.2. Vision
            3.1.2.1. for self
            3.1.2.2. for spouse
            3.1.2.3. for children
        3.1.3. Mental care
            3.1.3.1. for self
            3.1.3.2. for spouse
            3.1.3.3. for children
    3.2. Relocation Assistance
    3.3. Sick Leave
    3.4. Paternity/Maternity Leave
4. Location Match As exemplarily illustrated above, compensation is a parent matched attribute. The sub-attributes of the parent matched attribute are base, bonus, and overtime as indicated by 2.1, 2.2, and 2.3 respectively. Similarly, for the parent matched attribute, benefits, the sub-attributes are healthcare, relocation assistance, sick leave, paternity or maternity leave indicated by 3.1, 3.2, 3.3, and 3.4. The attributes health, vision, and mental care are sub-attributes of the sub-attribute healthcare. Similarly, the attributes for self, for spouse, and for children are sub-attributes of each of the sub-attributes of the sub-attribute healthcare. The hierarchy is stored in the predefined attribute list to allow analysis and drill down such that the score for a parent such as 3.1 Healthcare is the score for all of its children combined, such that their individual scores are not relevant for any further "preceeding" attributes hierarchy.

The attribute match scores for 3.1.3.1, 3.1.3.2, and 3.1.3.3 are rolled-up and combined into a single attribute match score corresponding to the sub-attribute 3.2.3. Similarly, the attribute match scores for 3.1.2.1, 3.1.2.2, and 3.1.2.3 are rolled-up and combined into a single attribute match score corresponding to the sub-attribute 3.1.2. At the next level in the hierarchy, the attribute match scores of the sub-attributes 3.1.1, 3.1.2, and 3.1.3 are combined into an attribute match score corresponding to the sub-attribute healthcare 3.1, without any regard to the attribute match scores of the deeper levels as the attribute match scores corresponding to the sub-attributes are accounted for. Further, at the next level, the attribute match scores of the sub-attributes 3.1, 3.2, 3.3, and 3.4 are combined into an attribute score corresponding to the parent matched attribute benefits, without any regard to the attribute match scores of the deeper levels as the attribute match scores corresponding to the sub-attributes 3.1, 3.2, 3.3, and 3.4 is accounted for. Further, at the next level, the attribute match scores corresponding to the parent matched attributes 1, 2, 3, and 4 are combined into an attribute match score, without any regard to the attribute match scores of the deeper levels as the attribute match scores corresponding to the sub-attributes of 1, 2, 3, and 4 are accounted for. The parent in the hierarchy does not have an attribute match score or a formula of its own. There is no attribute match score for 3.1.3 than roll-up of the attribute match score of the children or the sub-attributes. The parent matched attribute compensation has base, bonus, overtime as the sub-attributes. If a rule for computing total compensation is to be added to the parent matched attribute, the "total compensation" is added as a sub-attribute 2.4.

Consider an example, where attribute importance measures associated with the sub-attribute Healthcare and each of the sub-attributes of Healthcare are as shown below:
0.3 Health Care
  0.4 Medical
    0.5 self
    0.3 spouse
  0.2 Dental
    0.1 self
    0 spouse Within the sub-attribute medical, the attribute importance measure 0.5 associated with the sub-attribute self is stronger than the attribute importance measure 0.3 associated with the sub-attribute spouse. The attribute importance measures of the sub-attributes at a same level in the hierarchy are relative to each other, that is, 0.5/0.8 and 0.3/0.8. The attribute importance measures do not add up to anything. The attribute importance measures of 0.2 and 0.2 of the sibling sub-attributes in the hierarchy is same as the attribute importance measures 1 and 1 of the sibling sub-attributes in the hierarchy since the ratio of the attribute importance measures 0.2/0.4 and ½ is same. Within the sub-attribute dental, an attribute importance measure of 0.1 associated with self gets full weight as the attribute importance measure associated with the spouse is 0. That is, the spouse dental coverage is not important. When the attribute match score corresponding to dental is computed using the attribute match scores corresponding to the sub-attributes self and spouse, the attribute importance measures of the sub-attributes self and spouse is irrelevant. When the attribute match score corresponding to medical is computed using the attribute match scores corresponding to the sub-attributes self and spouse, the attribute importance measures of the sub-attributes self and spouse is irrelevant. The attribute importance measure of medical is 0.4 and the attribute importance measure of dental is 0.2. That is, medical is twice as important as dental. The attribute match scores of the medical and dental are combined into the attribute match score of Healthcare with the attribute match score for medical carrying more weight than the attribute match score for dental. Healthcare has an attribute match score with the attribute importance measure of 0.3 that combines with the other sub-attributes relocation assistance, sick leave, etc., to generate the attribute match score corresponding to the parent matched attribute benefits based on the attribute importance measures of the other sub-attributes relocation assistance, sick leave, etc. Therefore, the parent matched attributes with no sub-attributes have no formulae of their own and no value present measures. The attribute importance measures are the values that are carried forward in the hierarchy.

Match formulae using the match formula parameters are stored in the predefined attribute list. For different parent attributes, sub-attributes, the attribute match score is computed differently using the corresponding match formula parameters. The match formulae can cause, for example, the matching in the matched attribute list to use a different set of over/under adjustment defined in FIG. 32. The different match formulae allow for different matching functions between the attributes possessed and the attributes needed in the matched attribute list. Using different matching functions, the difference between a range where more is better, for example, compensation, and a range where less is better, for example, distance, can be compared or where a Boolean being present is good or bad can be compared. The over/under adjustment is used for downgrading or penalizing matches with large differences between the sub-attributes of the parent attributes possessed and the parent attributes needed in the matched attribute list. For example, if a job seeker does not fully have the level of dental skills needed by an employer, or if their level of dental skills greatly exceeds that needed by an employer, the over/under adjustment is used to lookup their raw match score. Depending on the over/under adjustment used not all mismatches are downgraded. For example, if an employer wants to pay extra, over presence of pay in the attributes possessed by the employer than expected by a job seeker need not be penalized. Similarly, if the amount of travel offered by an employer is less than the amount of travel the job seeker is willing to do, under presence of travel in the attributes possessed by the employer need not be penalized. Therefore, the multi-directional attribute matching system (MAMS) penalizes or performs over/under adjustment based on the different match formulae. The match formulae, such as, LessIsBetter, MoreIsBetter, etc., are applied on ranges like commute time, location distance, etc., and match formulae, such as, MustHave, MustNotHave, etc., are applied on Booleans, etc.

In an embodiment, some of the attributes possessed are derived from the list of attribute ratings exemplarily illustrated in FIG. 23. The list of attribute ratings for the selected side comprises multiple ratings, such as from different reviewers, for the same attribute. The multi-directional attribute matching system (MAMS) generates unique attributes possessed with corresponding merged value present measures and merged credibility measures indicating credibility of the merged value present measures, by performing merging actions on the attributes possessed in the list of attribute ratings. As used herein, "unique attributes possessed" refer to attributes possessed with multiple occurrences in the list of attribute ratings that are merged to a single occurrence. Also, as used herein, a "merged value present measure" refers to a combined value of the value present measures corresponding to the multiple occurrences of the attributes possessed in the list of attribute ratings. Also, as used herein, a "merged credibility measure" refers to a combined value of the credibility measures corresponding to the multiple occurrences of the attributes possessed in the list of attribute ratings. The generated unique attributes possessed with corresponding merged value present measures and merged credibility measures are input to the attributes possessed list.

FIG. 1 exemplarily illustrates a method for generating a final score by the multi-directional attribute matching system (MAMS) on comparison of attributes possessed of varying credibility with attributes needed of varying importance in the item profiles. As exemplarily illustrated in FIG. 1, the MAMS receives a SIDESPEC_ID and list of names tuples associated with the SIDESPEC_ID from the side list exemplarily illustrated in FIG. 17. A different ITEM_ID or NEED_ID is used for the list of attribute ratings than is used in the other lists. That is, the attributes possessed list and the attributes needed list use ITEM_PROFILE_ID OR NEED_PROFILE_ID. The ITEM_ID and the NEED_ID are applied only to the attributes possessed in the list of attribute ratings that are merged. Consider two attributes possessed "PHP" and "Nice People". The value measures and the credibility measures of the attributes possessed are gathered by ratings from different reviewers. Some attributes are directly entered in the attributes possessed list while some attributes are merged in the list of attribute ratings and entered into the attributes possessed list.

In the step find or create fit score rows 101, the MAMS finds rows in the side list with the passed SIDESPEC_ID. In an embodiment, the MAMS finds direct or indirect children of the row in the side list identified with the SIDESPEC_ID. For each found row in the side list, the MAMS creates a row in the fit score table with a new SCORE_ID and with the SIDESPEC_ID of the row from the side list. The SIDESPEC_ID in the fit score table is the same as the passed SIDESPEC_ID for the rows with children rows in the side list. For the children rows in the side list, the SIDESPEC_ID in the fit score table is the same as the SIDESPEC_ID in the side list and the PARENT SCORE IDs are set in the fit score table to the SIDESPEC_ID of the parent row in the side list. ITEM KEY and ITEM NAME are found in the fit score table by finding in the list of names tuples, a tuple whose name is the same as the ITEM NAME in the row identified by SIDESPEC_ID in the side list. NEED KEY and NEED NAME are found in the fit score table by finding in the list of names tuples, a tuple whose name is the same as the NEED NAME in the row identified by SIDESPEC_ID in the side list. For each created row in the fit score table whose corresponding match formula in the side list is score 102, the MAMS calls 103 the function SCORE_CALC_I (SCORE_ID, ITEM_ID, ITEM_PROFILE_ID, "NEED", NEED_ID, NEED PROFILE_ID).

On computation of the attribute match scores using the function SCORE_CALC_I (SCORE_ID, ITEM_ID, ITEM_PROFILE_ID, "NEED", NEED_ID, NEED PROFILE_ID), the multi-directional attribute matching system (MAMS) updates 104 a row in the fit score table with a matching SCORE_ID. For each created row in the fit score table with a match formula as rollup 105, the MAMS updates 106 the attribute match score using the rollups as disclosed in the detailed description of FIG. 19. The match formula for the children rows in the side list is score and the match formula for the parent rows in the side list is rollup. The MAMS fetches the SCORE_ID of the children row but does not fetch the SCORE_ID of the parent row.

The SCORE_ID is input to the score_calc_i module and the ATTR_ID corresponding to the SIDESPEC_ID in the side list is stored in the fit score table with the SCORE_ID. The score_calc_i module uses the inputted SCORE_ID to fetch the row from the fit score table and retrieve the item key, item id, need key and need id. As part of its processing, the score_calc_i module creates a matched attribute list exemplarily illustrated in FIG. 28. The score_calc_i module receives the SCORE_ID, item key_item id, need key, and need id. The generated matched attributes in the matched attribute list will be keyed by the SCORE_ID, which is specific to one side identified by the SIDESPEC_ID in the side specification list. In other words, the fit score table holds SIDESPEC IDs for each row, and a row of the side specification list can be fetched to get the ATTRIBUTE_ID. Once a matched attribute is found and listed in the matched attribute list, Has Requirements and raw score of the matched attribute are updated 104 into the corresponding columns of the fit score table. The attribute match score is 0 if Has Requirements is FALSE for the matched attribute. If Has Requirements is TRUE for the matched attribute, the attribute match score is computed as attribute importance measure*raw score, where importance measure is in the side list corresponding to the SIDESPEC_ID. For each created 105 parent rows with the match formula Rollup in the side list, the MAMS sets Has_Requirements to FALSE if any children rows in the side list have a FALSE Has_Requirements. For a parent row, the MAMS computes the nested raw score as sum(attribute match scores of the direct children)/sum(importance measures of the direct children). The final score for the parent row is computed as the nested raw score*the importance measure of the parent row. The MAMS updates the computed nested raw score and match score for each parent row in the fits score table using rollups of the children row as disclosed in the detailed description of FIG. 19. The following input data to the computer, for example, the side specification list, the attributes possessed list, the attributes needed list, are processed and transformed into the following output data, for example, generating a table of matched attributes, generating an attribute match score, computing the match score for every row in the fit score table that specifies a rollup using the importance as weight in the aggregation of the match scores of the sub rows into a single match score for determining a degree of match between the item profiles with respective attributes possessed of varying credibility and respective attributes needed of varying importance.

Figure 2:
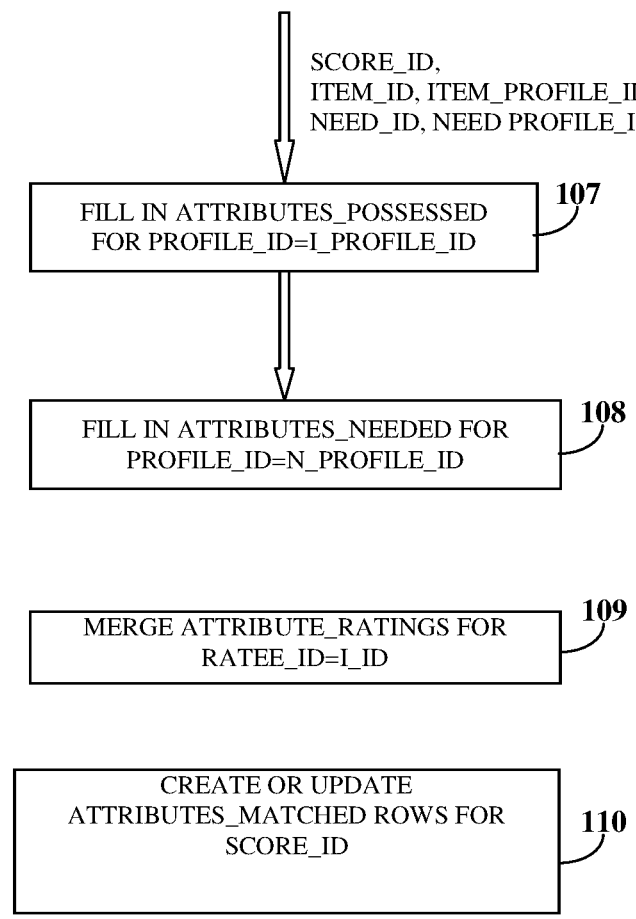
FIG. 2 exemplarily illustrates a flow diagram comprising the steps performed by a score_calc_i module of the multi-directional attribute matching system exemplarily illustrated in FIG. 1, for creating or updating attribute match scores corresponding to matched attributes in a matched attribute list.

FIG. 2 exemplarily illustrates a flow diagram comprising the steps performed by the score_calc_i module of the multi-directional attribute matching system (MAMS) exemplarily illustrated in FIG. 1, for creating or updating attribute match scores corresponding to the matched attributes in the matched attribute list. The score_calc_i module receives the SCORE_ID, ITEM_ID, ITEM_PROFILE_ID, NEED_ID, NEED_PROFILE_ID. The score_calc_i module fills 107 the attributes possessed list with the attributes possessed from the list of attribute ratings for PROFILE_ID=I_PROFILE_ID as disclosed in the detailed description of FIG. 3. Similarly, the score_calc_i module fills 108 the attributes needed list with the attributes needed from the predefined attribute list for PROFILE_ID=N_PROFILE_ID as disclosed in the detailed description of FIG. 5. The score_calc_i module merges 109 the attributes possessed that are multi-valued in the list of attribute ratings for RATEE_ID=I_ID as disclosed in the detailed description of FIG. 8 and updates the attributes possessed list. The score_calc_i module further creates or updates 110 the matched attribute list for the SCORE_ID as disclosed in the detailed description of FIG. 12.

Figure 3:
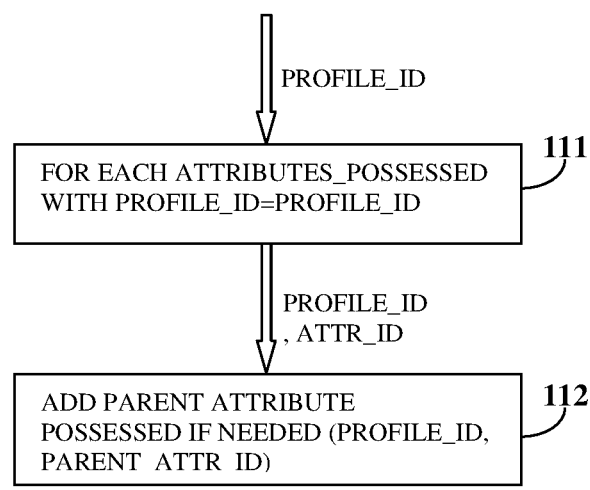
FIG. 3 exemplarily illustrates a flow diagram comprising the steps performed by the score_calc_i module of the multi-directional attribute matching system for filling an attributes possessed list with the attributes possessed from a list of attribute ratings.

FIG. 3 exemplarily illustrates a flow diagram comprising the steps performed by the score_calc_i module of the multi-directional attribute matching system (MAMS) for filling the attributes possessed list with the attributes possessed from the list of attribute ratings. The score_calc_i module receives PROFILE_ID from the list of attribute ratings and for each attribute possessed with ATTR_ID in the list of attribute ratings with PROFILE_ID=received PROFILE ID 111, the score_calc_i module performs 112 ADD PARENT ATTRIBUTE POSSESSED IF NEEDED (PROFILE_ID, PARENT_ATTR_ID) function as disclosed in the detailed description of FIG. 4.

Figure 4:
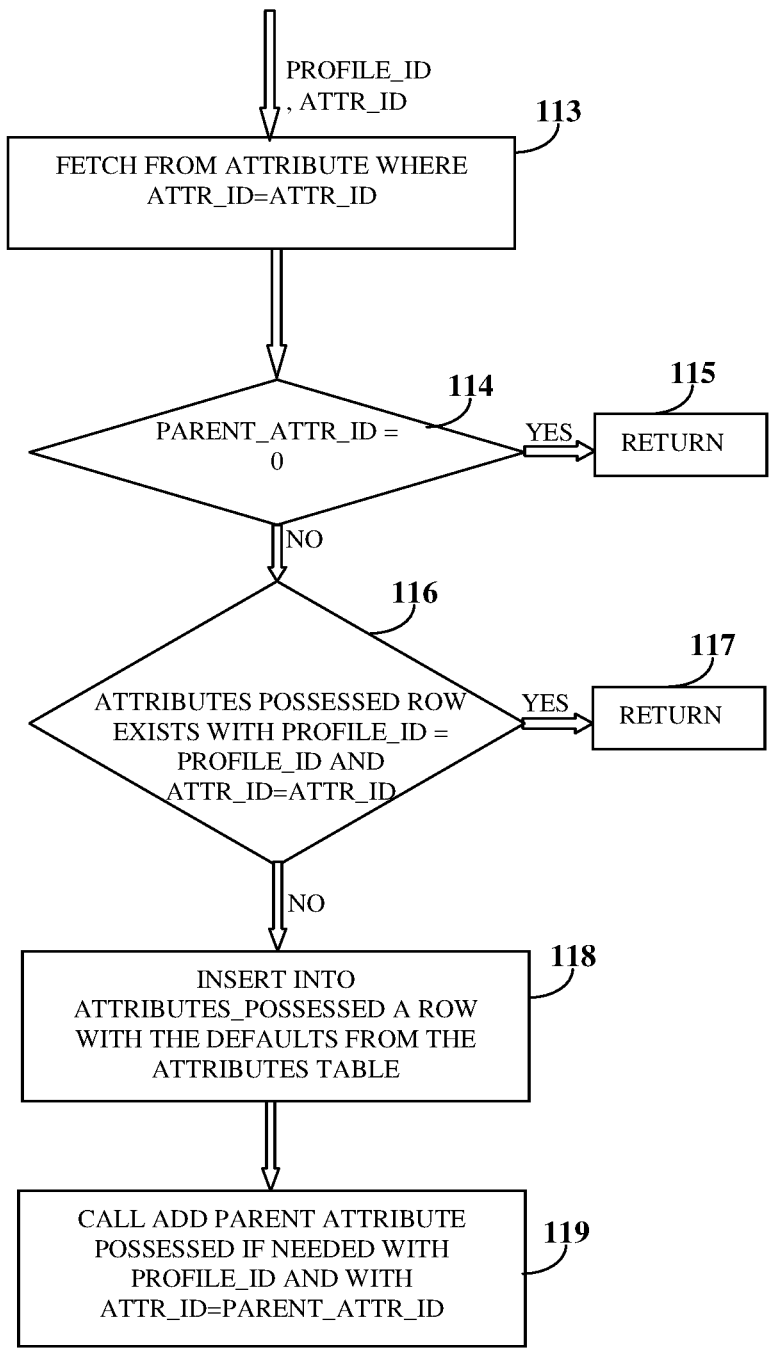
FIG. 4 exemplarily illustrates a flow diagram comprising the steps performed by the score_calc_i module the multi-directional attribute matching system for adding a parent attribute to each attribute possessed in the attributes possessed list.

FIG. 4 exemplarily illustrates a flow diagram comprising the steps performed by the score_calc_i module the multi-directional attribute matching system (MAMS) for adding a parent attribute to each attribute possessed in the attributes possessed list. Using the ADD PARENT ATTRIBUTE POSSESSED IF NEEDED (PROFILE_ID, PARENT_ATTR_ID) function, the score_calc_i module recursively adds a parent attribute to the attributes possessed, if the attributes possessed are hierarchical sub-attributes of a parent attribute according to the predefined attribute list exemplarily illustrated in FIGS. 20A-20E, using the default values from the predefined attribute list as exemplarily illustrated in FIGS. 27A-27B. With PROFILE_ID and ATTR_ID, the score_calc_i module fetches 113 the attribute possessed from the attributes possessed list with ATTR_ID=received ATTR_ID. The score_calc_i module determines 114 if PARENT_ATTR_ID=0. If yes, the score_calc_i module returns 115 and continues with the next attribute possessed in the attributes possessed list. If the PARENT_ATTR_ID is not equal to 0, the score_calc_i module determines 116 if a row already exists in the attributes possessed list with PROFILE_ID=PROFILE_ID and ATTR_ID=ATTR_ID. If the row does not exist, the score_calc_i module inserts 118 a row in the attributes possessed list with default values for the value present measures and the credibility measures from the predefined attribute list. If the row already exists, the score_calc_i module returns 117 and continues with the next attribute possessed in the attributes possessed list. The ADD PARENT ATTRIBUTE POSSESSED IF NEEDED (PROFILE_ID, PARENT_ATTR_ID) function 119 is called again with the ATTR_ID equal to PARENT_ATTR_ID from the inserted parent attribute.

Figure 5:
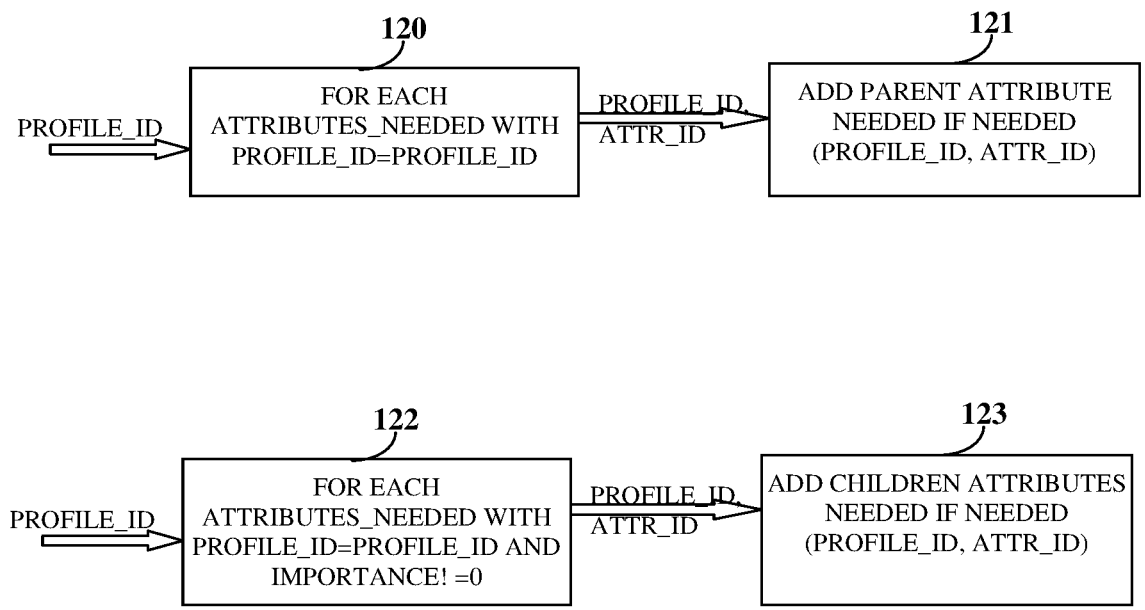
FIG. 5 exemplarily illustrates a flow diagram comprising the steps performed by the score_calc_i module of the multi-directional attribute matching system for filling an attributes needed list with attributes needed, from a predefined attribute list.

FIG. 5 exemplarily illustrates a flow diagram comprising the steps performed by the score_calc_i module of the multi-directional attribute matching system (MAMS) for filling the attributes needed list with attributes needed, from the predefined attribute list. The score_calc_i module receives PROFILE_ID from the attributes needed list and for each attribute needed with ATTR_ID with PROFILE_ID equal to received PROFILE ID 120, the score_calc_i module performs 121 ADD PARENT ATTRIBUTE NEEDED IF NEEDED (PROFILE_ID, ATTR_ID) function as disclosed in the detailed description of FIG. 6. For each row in the attributes needed list with PROFILE_ID equal to received PROFILE_ID and a non-zero attribute importance measure 122, the score_calc_i module performs 123 ADD CHILDREN ATTRIBUTES NEEDED IF NEEDED (PROFILE_ID, ATTR_ID) as disclosed in the detailed description of FIG. 7.

Figure 6:
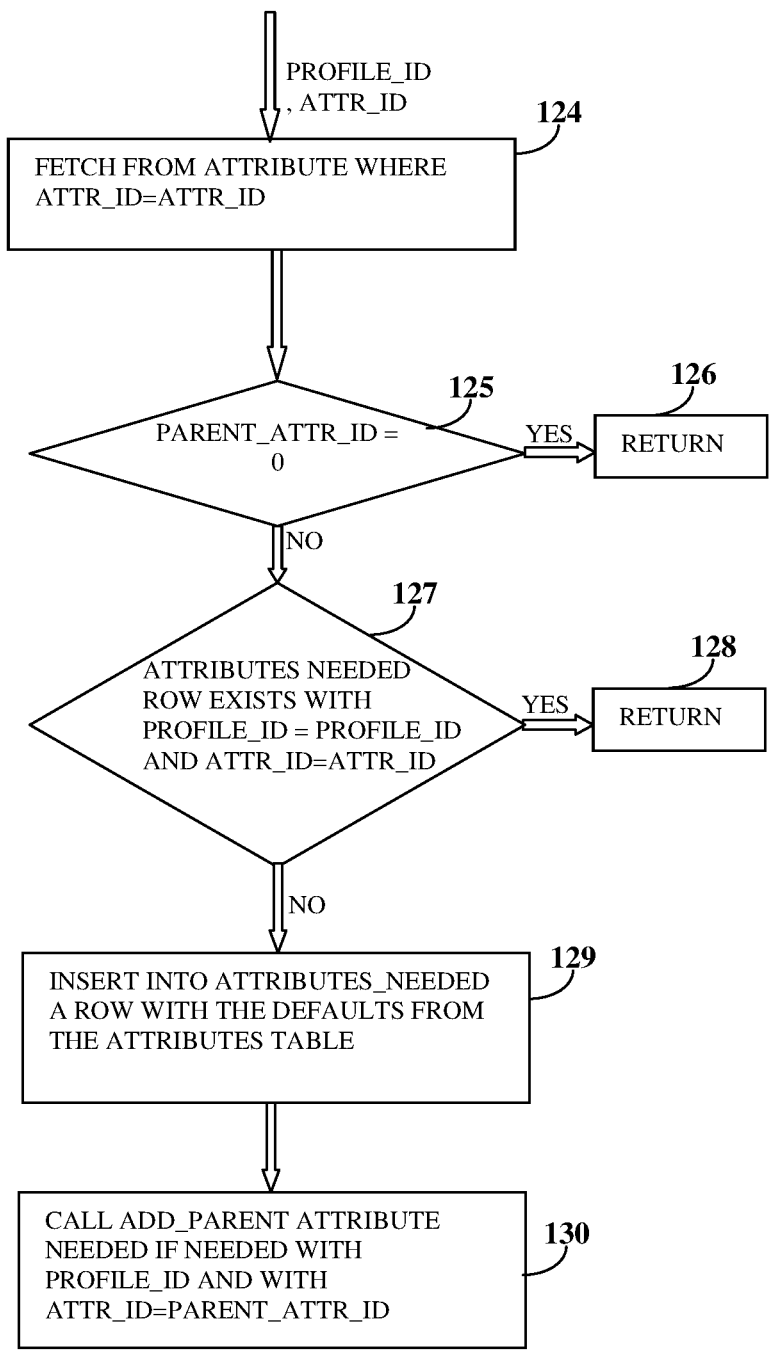
FIG. 6 exemplarily illustrates a flow diagram comprising the steps performed by the score_calc_i module of the multi-directional attribute matching system for adding a parent attribute to each attribute needed in the attributes needed list.

FIG. 6 exemplarily illustrates a flow diagram comprising the steps performed by the score_calc_i module of the multi-directional attribute matching system (MAMS) for adding a parent attribute to each attribute needed in the attributes needed list. Using the ADD PARENT ATTRIBUTE NEEDED IF NEEDED (PROFILE_ID, PARENT_ATTR_ID), the score_calc_i module recursively adds a parent attribute to the attributes needed, if the attributes needed are hierarchical sub-attributes of a parent attribute according to the predefined attribute list exemplarily illustrated in FIGS. 20A-20E, using the default values from the predefined attribute list as exemplarily illustrated in FIGS. 33A-33B and FIG. 24. With the PROFILE_ID and ATTR_ID, the score_calc_i module fetches 124 the attribute needed from the predefined attribute list with ATTR_ID equal to the ATTR_ID that invokes the ADD PARENT ATTRIBUTE NEEDED IF NEEDED (PROFILE_ID, PARENT_ATTR_ID) function. The score_calc_i module determines 125 if PARENT_ATTR_ID=0. If yes, the score_calc_i module returns 126 and continues with the next attribute needed in the attributes needed list. If the PARENT_ATTR_ID is not equal to 0, the score_calc_i module determines 127 if a row already exists in the attributes needed list with PROFILE_ID=PROFILE_ID and ATTR_ID=ATTR_ID. If the row does not exist, the score_calc_i module inserts 129 a row in the attributes needed list with default values for the value needed measures, the attribute importance measures, and the requirement measures from the predefined attribute list. If the row already exists, the score_calc_i module returns 128 and continues with the next attribute needed in the attributes needed list. The ADD PARENT ATTRIBUTE NEEDED IF NEEDED (PROFILE_ID, PARENT_ATTR_ID) function is called 130 again with the ATTR_ID equal to PARENT_ATTR_ID from the inserted parent attribute.

Figure 7:
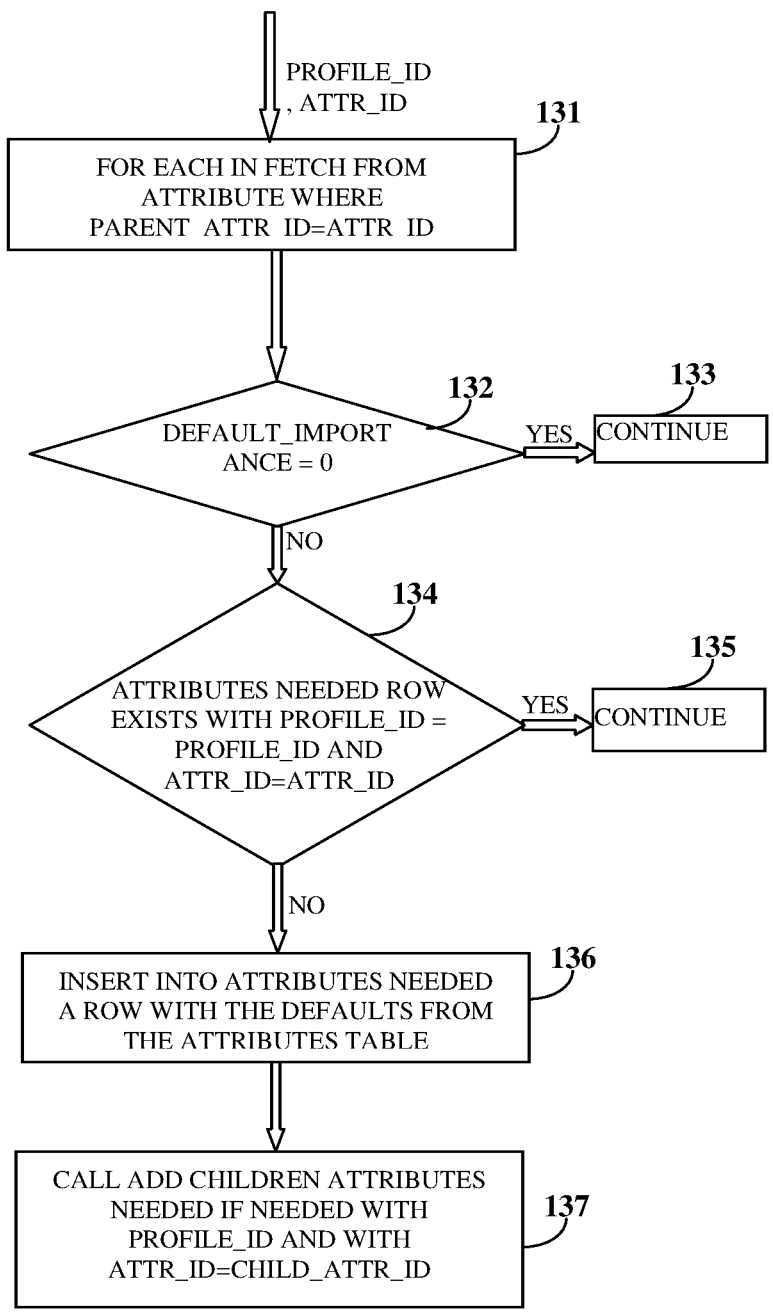
FIG. 7 exemplarily illustrates a flow diagram comprising the steps performed by the score_calc_i module of the multi-directional attribute matching system for adding sub-attributes to each attribute needed in the attributes needed list, if the attribute needed in the attributes needed list is a parent attribute.

FIG. 7 exemplarily illustrates a flow diagram comprising the steps performed by the score_calc_i module of the multi-directional attribute matching system (MAMS) for adding sub-attributes to each attribute needed in the attributes needed list, if the attribute needed in the attributes needed list is a parent attribute. Using the ADD CHILDREN ATTRIBUTES NEEDED IF NEEDED (PROFILE_ID, ATTR_ID) function, the score_calc_i module recursively adds a sub-attribute to the parent attributes needed, using the default values from the predefined attribute list as exemplarily illustrated in FIG. 37C. With the PROFILE_ID and ATTR_ID, for each sub-attribute in the predefined attribute list fetched with PARENT_ATTR_ID equal to the ATTR_ID 131, the score_calc_i invokes the ADD CHILDREN ATTRIBUTES NEEDED IF NEEDED (PROFILE_ID, ATTR_ID) function. The score_calc_i module determines 132 if default attribute importance measure of the fetched sub-attribute is 0. If yes, the score_calc_i module continues 133 with the next attribute needed in the attributes needed list. If the default attribute importance measure of the fetched sub-attribute is not equal to 0, the score_calc_i module determines 134 if a row already exists in the attributes needed list with PROFILE_ID=PROFILE_ID and ATTR_ID=ATTR_ID. If the row does not exist, the score_calc_i module inserts 136 a row in the attributes needed list with default values for the value needed measures, the attribute importance measures, and the requirement measures from the predefined attribute list. If the row already exists, the score_calc_i module continues 135 with the next attribute needed in the attributes needed list. The ADD CHILDREN ATTRIBUTES NEEDED IF NEEDED (PRO- FILE_ID, ATTR_ID) is called 137 again with the ATTR_ID equal to CHILD_ATTR_ID from the inserted sub-attribute of a parent attribute needed.

Consider an example, where work environment is a sub-attribute of an attribute needed in the predefined attribute list for a job opportunity. Work environment has sub-attributes nice people and good food choices. In an attributes needed list, work environment is present with an attribute importance measure. According to the predefined attribute list, work environment is a rollup and the sub-attributes or children attributes of work environment are not specified in the attributes needed list. The score_calc_i module fetches the sub-attributes nice people and good food choices from the predefined attribute list and determines whether the default values state that nice people matter but good food choices do not matter.

Figure 8:
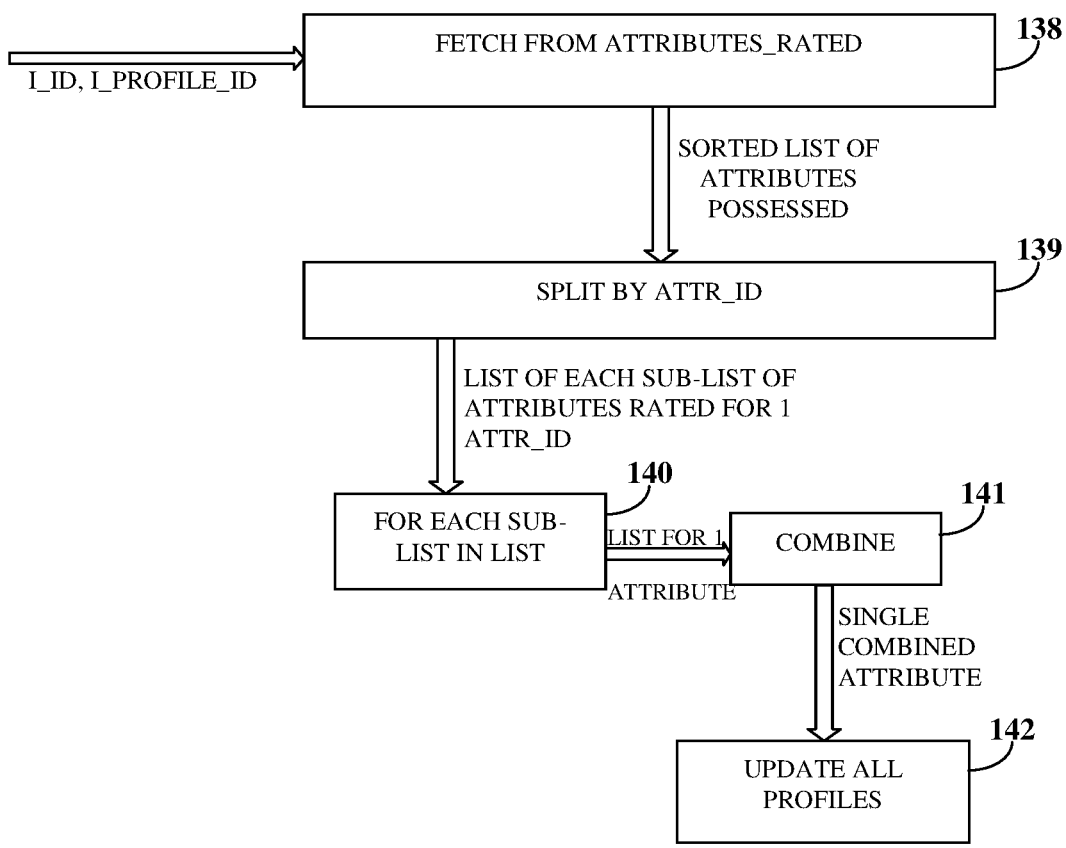
FIG. 8 exemplarily illustrates a flow diagram comprising the steps performed by the score_calc_i module of the multi-directional attribute matching system for merging the attributes possessed that are multi-valued in the list of attribute ratings.

FIG. 8 exemplarily illustrates a flow diagram comprising the steps performed by the score_calc_i module of the multi-directional attribute matching system (MAMS) for merging the attributes possessed that are multi-valued in the list of attribute ratings. The RATEE_ID=I_ID and the PROFILE_ID are passed to the score_calc_i module. The I_ID is not per-PROFILE_ID of the item, that is, there are multiple occurrences of the attributes possessed with the same I_ID. The score_calc_i module fetches 138 the attributes possessed from the list of attribute ratings using the PROFILE_ID and the I_ID. The pseudo code for fetching the attributes possessed from the list of attribute ratings by the score_calc_i module is shown below:

Select*from attributes rated where RATEE_ID=I_ID and
       ATTR_ID in (select distinct ATTR_ID from attributes_
       possessed where
       PROFILE_ID=I_PROFILE_ID) sort by ATTR_ID The score_calc_i module sorts the entries in the list of attribute ratings by the attributes possessed and then splits 139 the list of attribute ratings into N sub-lists of attribute ratings 140, where each sub-list of attribute ratings 140 contains entries for a common attribute, that is, for a single attribute possessed. The score_calc_i module comprises a combine module 141 for generating a single merged attribute, that is, a unique attribute possessed from each of the N sub-lists of attribute ratings 140 as disclosed in the detailed description of FIG. 11. The score_calc_i module updates 142 the item profiles where ATTR_ID=ATTR_ID and PROFILE_ID=I_PROFILE_ID, with the unique attributes possessed and corresponding merged value present measures and merged credibility measures. In an embodiment, the score_calc_i module updates the item profiles that have the same I_PROFILE_ID in the list of attribute ratings. In another embodiment, the score_calc_i module stores a date of update in the attributes possessed list and the list of attribute ratings and compares the stored dates to know which attributes possessed do not need to be re-merged.

Therefore, out of all the attributes possessed that are rated, the attributes that are actually used in the item profile are to be scored. There is no need, for example, to aggregate the brewing skills of a candidate if the employer is looking for filling a web development job. If no ratings are present in the list of attribute ratings for an attribute, then the attributes possessed have default values for the value present measures and the credibility measures from the predefined attribute list. In an embodiment, the merged credibility measure is not updated by the combine module 141 if the merged credibility measure is less than the default credibility measure in the predefined attribute list. Therefore, a single rating with no other ratings for an attribute in the attributes possessed list from a low credibility source will not impact the scoring.

Figure 9:
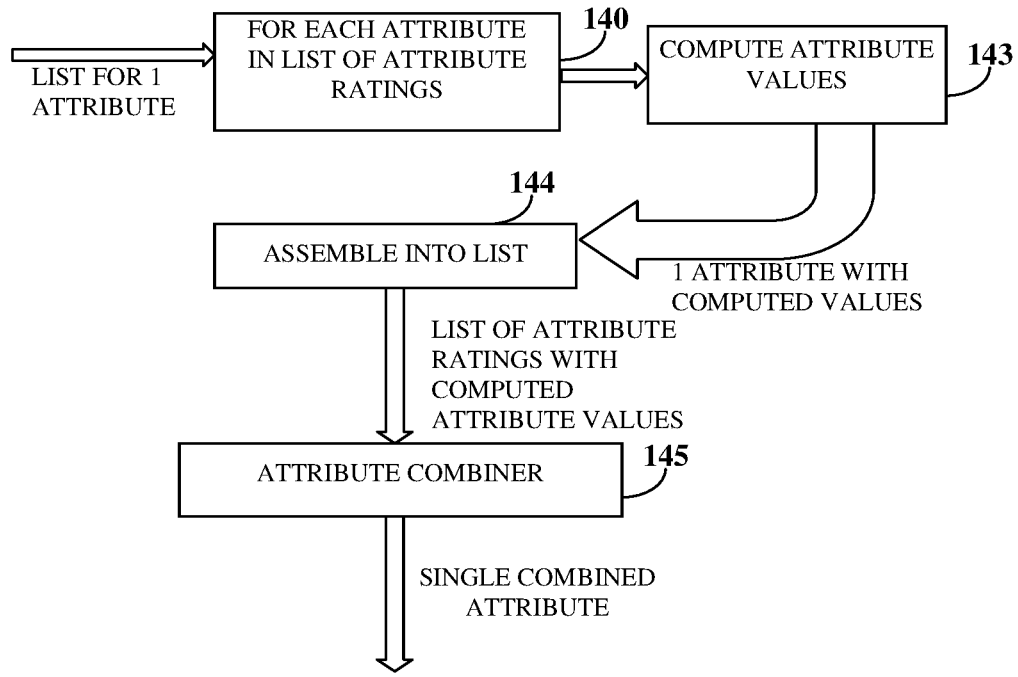
FIG. 9 exemplarily illustrates a flow diagram comprising the steps performed by a combine module exemplarily illustrated in FIG. 8, of the multi-directional attribute matching system for combining multiple occurrences of an attribute possessed in the list of attribute ratings into a single merged attribute, that is, a unique attribute possessed with a corresponding merged value present measure and a corresponding merged credibility measure.

FIG. 9 exemplarily illustrates a flow diagram comprising the steps performed by the combine module 141 exemplarily illustrated in FIG. 8, of the multi-directional attribute matching system (MAMS) for combining multiple occurrences of an attribute possessed in the list of attribute ratings into a single merged attribute, that is, a unique attribute possessed with a corresponding merged value present measure and a corresponding merged credibility measure. The MAMS invokes the combine module 141 with a sub-list of attribute ratings 140 as disclosed in the detailed description of FIG. 8, such that each entry in the sub-list of attribute ratings 140 is for the same attribute possessed. The match formula considered for execution of the steps exemplarily illustrated in FIG. 9 is Percents that allows mathematical addition. The combine module 141 comprises a compute attribute values module 143 and an attribute combiner 145. The compute attribute values module 143 computes attribute values, that is, a weighted value present measure and a weighted credibility measure for each attribute possessed in the N sub-lists of attributes ratings 140 as disclosed in the detailed description of FIG. 10. The compute attribute values module 143 adds values for the weighted value present measure and the weighted credibility measure to each attribute in the N sub-lists of attribute ratings 140 to create tuples in the N sub-lists of attribute ratings 140 as disclosed in the detailed description of FIG. 11. The combine module 141 assembles 144 the single sub-list of attribute ratings 140 comprising the attributes possessed with corresponding computed attribute values into a list. The attribute combiner 145 returns a single merged or combined attribute, that is, a unique attribute possessed on combining the enhanced attributes present tuples, that is, the tuples with the attributes possessed and corresponding weighted value present measures and corresponding weighted credibility measures as disclosed in the detailed description of FIG. 11.

Figure 10:
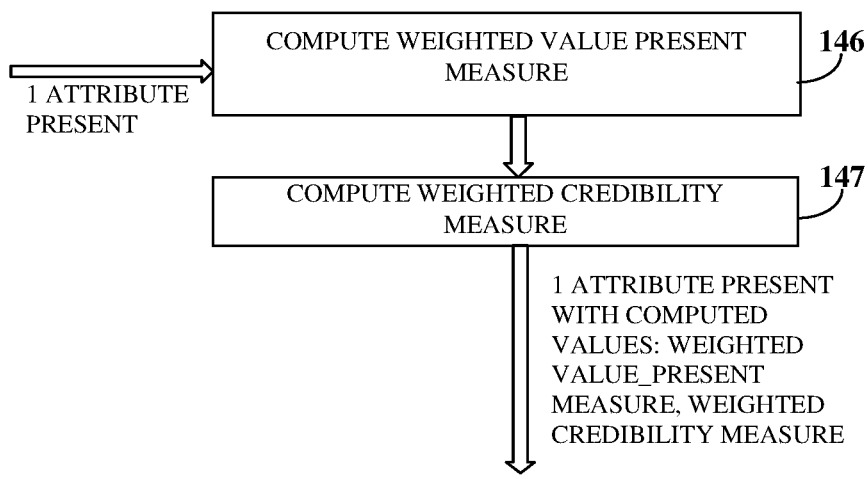
FIG. 10 exemplarily illustrates a flow diagram comprising the steps performed by a compute attribute values module of the multi-directional attribute matching system for computing attribute values, that is, a weighted value present measure and a weighted credibility measure for each attribute possessed in the N sub-lists of attribute ratings exemplarily illustrated in FIG. 8.

FIG. 10 exemplarily illustrates a flow diagram comprising the steps performed by the compute attribute values module 143 of the multi-directional attribute matching system (MAMS) for computing attribute values, that is, a weighted value present measure and a weighted credibility measure for each attribute possessed in the N sub-lists of attribute ratings 140 exemplarily illustrated in FIG. 8. The compute attribute values module 143 computes 146 a weighted value present measure. The formula for computation of the weighted value present measure will change based on the match formula. For the execution of the flow diagram in FIG. 10, the match formula is assumed to be Percents. According to Percents match formula, the weighted value present measure is computed as value present percent measure*credibility measure of the attribute possessed. Not all match formulae support combining values. The compute attribute values module 143 computes 147 a weighted credibility measure as credibility measure*credibility measure of the attribute possessed. The compute attribute values module 143 returns an attribute possessed in the sub-list of attribute ratings 140 with the computed values of the weighted value present measure and the weighted credibility measure.

In the computation of the weighted value present measures and the weighted credibility measures of the attributes possessed in the N sub-list of attribute ratings 140, the credibility measures affect the weightage provided to the value present amount measures of the attributes possessed in the N sub-list of attribute ratings 140. The credibility measures also affect the weightage provided to the credibility measures. A sum of the weighted credibility measures of an attribute possessed in a sub-list of attribute ratings 140 is used to calculate a credibility adjustment, that is, a credibility bump that is added to an unadjusted credibility measure to generate a merged credibility measure of the attribute possessed as disclosed in the detailed description of FIG. 11.

Figure 11:
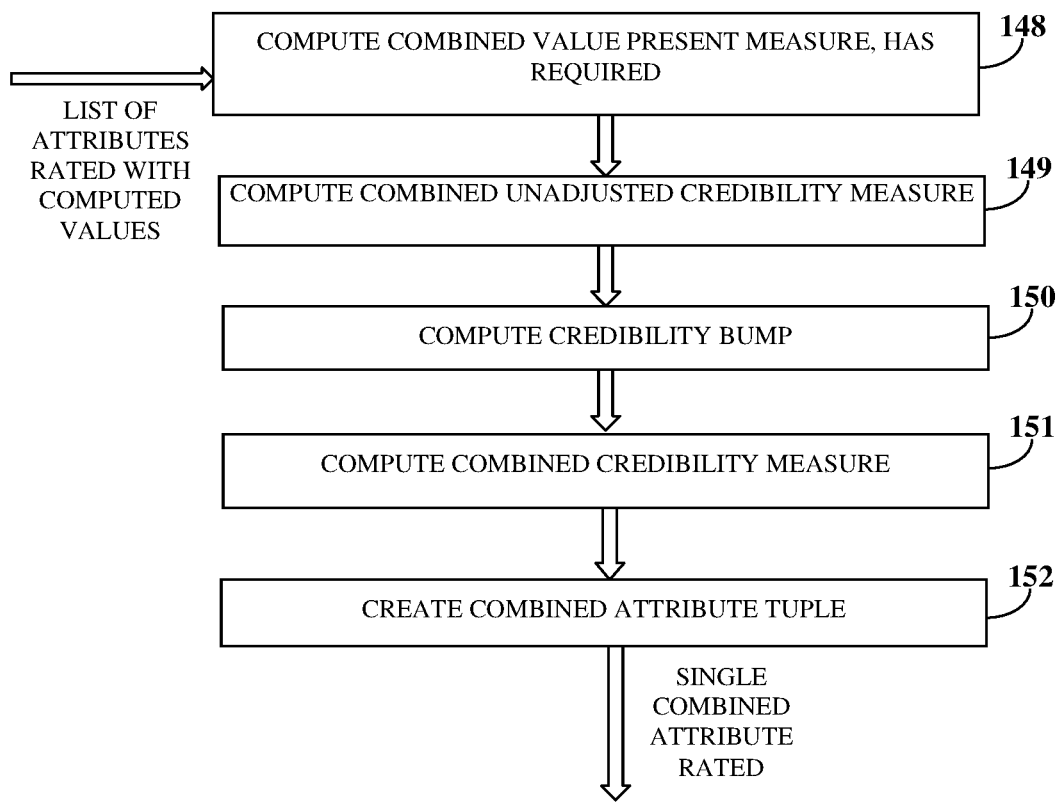
FIG. 11 exemplarily illustrates a flow diagram comprising the steps performed by an attribute combiner of the multi-directional attribute matching system for generating a unique attribute possessed with a corresponding merged value present measure and a corresponding merged credibility measure.

FIG. 11 exemplarily illustrates a flow diagram comprising the steps performed by the attribute combiner 145 of the multi-directional attribute matching system (MAMS) for generating a unique attribute possessed with a corresponding merged value present measure and a corresponding merged credibility measure. The attribute combiner 145 exemplarily illustrated in FIG. 9, receives a sub-list of attribute ratings 140 exemplarily illustrated in FIG. 8, with the computed values of the weighted value present measure and the weighted credibility measure and creates a single combined attribute, that is, a unique attribute possessed. The MAMS invokes the attribute combiner 145 with a sub-list of attribute ratings 140 with computed values such that all entries in the sub-list of attributes present 140 are for the same attribute possessed. The attribute combiner 145 computes 148 a combined value present measure, that is, the merged value present measure. The match formula parameters used will change based on the match formula and not all match formulae support combining values. The match formula is Percents for the flow diagram exemplarily illustrated in FIG. 11 and the merged value present percent measure is computed as Sum (weighted value present measure)/Sum (credibility measure). The attribute combiner 145 computes 149 a combined unadjusted credibility measure as Sum (weighted credibility measure)/Sum (credibility measure). The attribute combiner 145 computes 150 a credibility bump as (Sum (weighted credibility measure)*coeff_credbump−coeff_credbump, where the coefficient coeff_credbump is a predefined constant. In an embodiment, the credibility bump is computed by a lookup of the Sum (weighted credibility measure), for example, as in VLOOKUP in Excel® of Microsoft Corporation. The attribute combiner 145 computes 151 a combined credibility measure, that is, the merged credibility measure, as (combined unadjusted credibility measure+credibility bump) that is adjusted to have a minimum value of 0 and a maximum value of 1. The attribute combiner 145 creates 152 a combined attribute tuple, that is, a tuple in the attributes possessed list, comprising the unique attribute possessed being the attribute from the sub-list of the attribute ratings 140 with the computed combined value present measure and the computed combined credibility measure. The attribute combiner 145 returns a single merged attribute or a combined attribute, that is, the unique attribute possessed.

Figure 12:
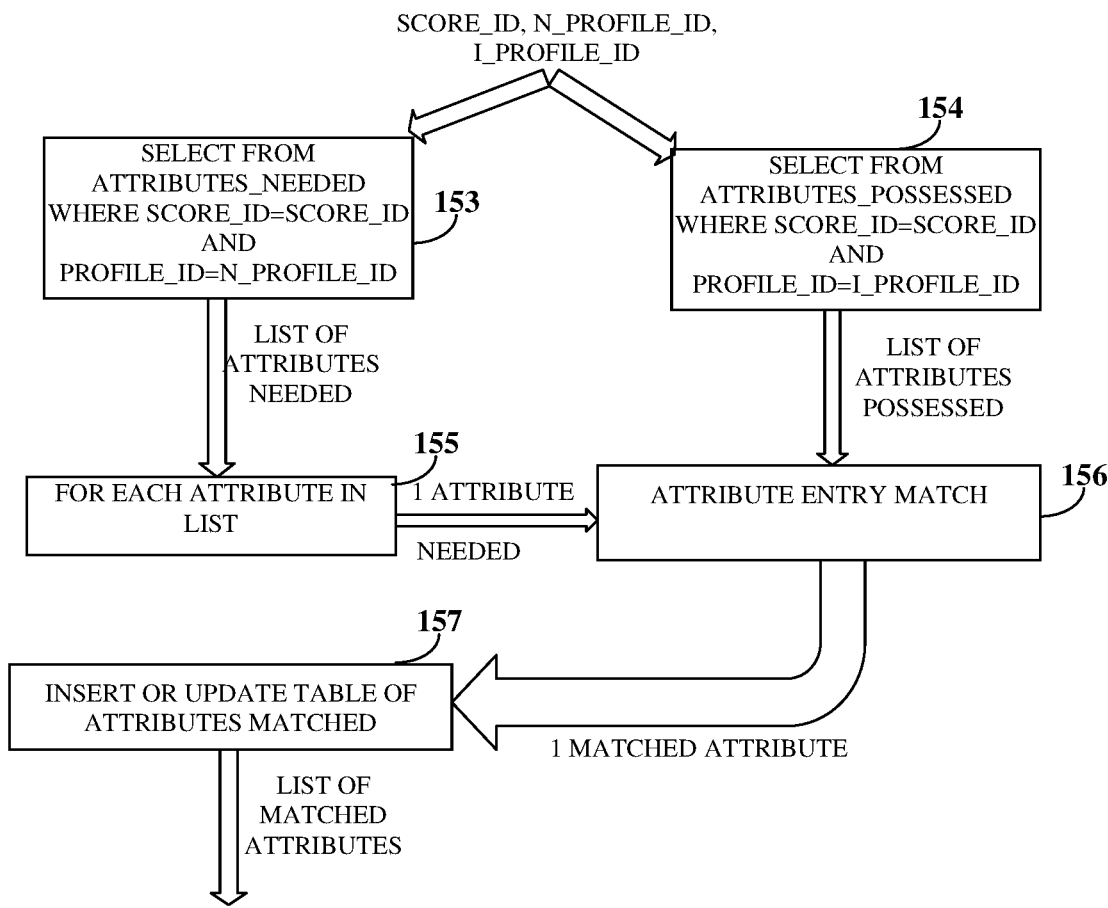
FIG. 12 exemplarily illustrates a flow diagram comprising the steps performed by the multi-directional attribute matching system for combining the attributes possessed list comprising the unique attributes possessed and the attributes needed list, for a side identified by SIDESPEC_ID in a side list to return a matched attribute list.

FIG. 12 exemplarily illustrates a flow diagram comprising the steps performed by the score_calc_i module of the multi-directional attribute matching system (MAMS) for combining the attributes possessed list comprising the unique attributes possessed and the attributes needed list, for a side identified by SIDESPEC_ID in the side list to return a matched attribute list. The matched attribute logic of the MAMS receives a SCORE_ID, N_PROFILE_ID, and I_PROFILE_ID. From the attributes needed list, the MAMS selects 153 the attributes needed where the SCORE_ID=received SCORE_ID and PROFILE_ID=N_PROFILE_ID and forms the list of attributes needed. Similarly, the MAMS selects 154 the attributes possessed with the SCORE_ID=SCORE_ID and PROFILE_ID=I_PROFILE_ID and forms the list of attributes possessed. For each attribute in the list of attributes needed 155, the MAMS invokes an attribute entry match module 156 with the list of attributes possessed and the list of attributes needed. The list of attributes needed drives the match, not the list of attributes possessed. That is, for example, a candidate had 100% competence as a brew master is irrelevant for a match where that skill is not needed. The list of attributes possessed has some value present measures and corresponding credibility measures that are merged value present measures and merged credibility measures generated according to FIG. 8 and some value present measures and corresponding credibility measures that are from the list of attribute ratings with a single occurrence of the attributes possessed. The attribute entry match module 156 returns a single matched attribute and saves the single matched attribute by inserting or updating 157 the matched attribute list of matched attributes as disclosed in the detailed description of FIG. 13.

Figure 13:
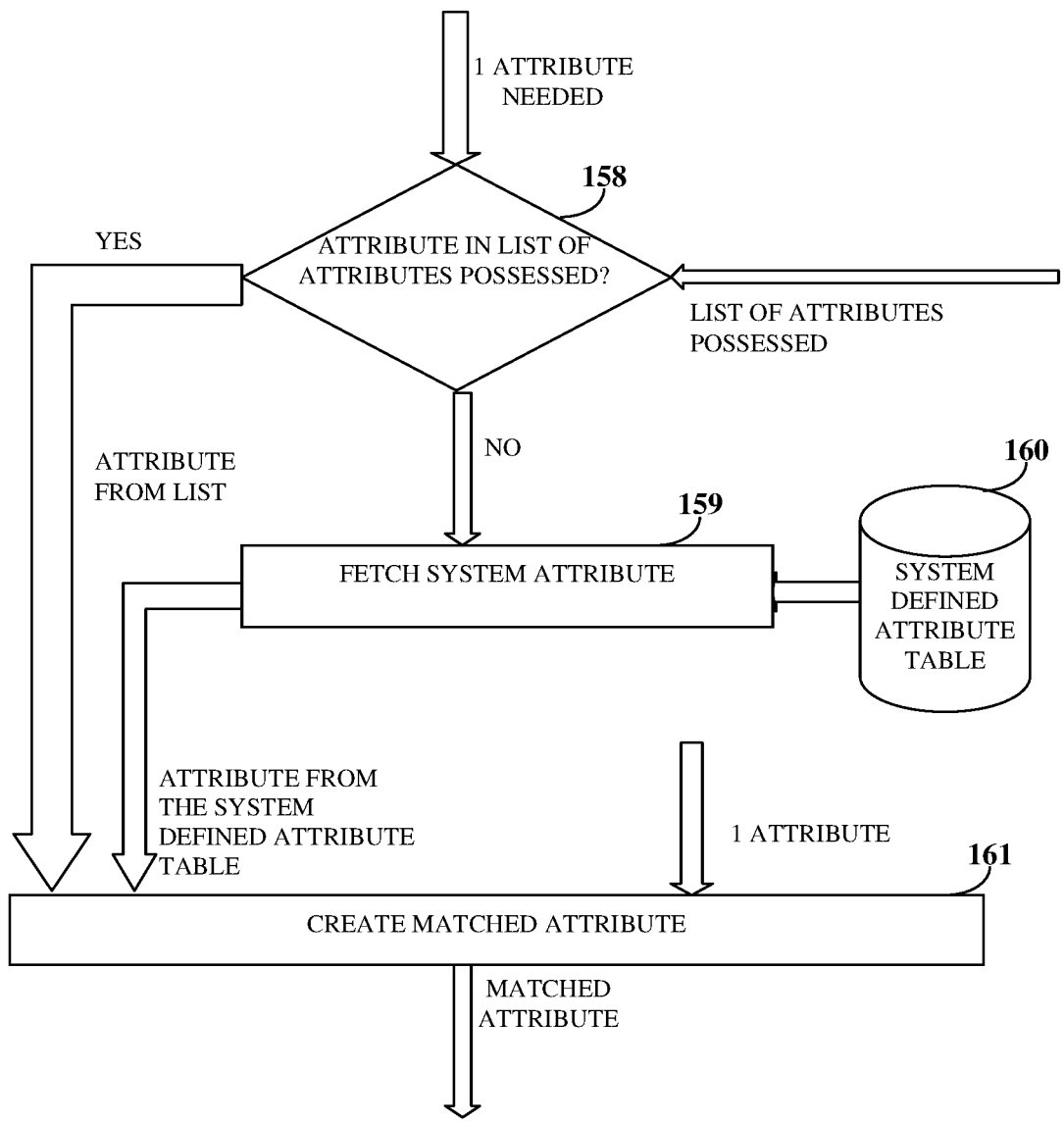
FIG. 13 exemplarily illustrates a flow diagram comprising the steps performed by the multi-directional attribute matching system for generating a single matched attribute from an attribute needed in the attributes needed list and an attribute possessed in the attributes possessed list.

FIG. 13 exemplarily illustrates a flow diagram comprising the steps performed by the multi-directional attribute matching system (MAMS) for generating a single matched attribute from an attribute needed in the attributes needed list and an attribute possessed in the attributes possessed list. The attribute entry match module 156 exemplarily illustrated in FIG. 12, examines 158 whether the list of attributes possessed contains the attribute needed. If the attribute needed is present in list of attributes possessed, the attribute entry match module 156 passes the attribute possessed that is same as the attribute needed as an attribute_present to a create matched attribute module 161. If the attribute needed is absent in the list of attributes possessed, the attribute entry match module 156 fetches 159 the attribute needed from a system defined attribute table 160, that is, the predefined attribute list and passes the fetched attribute needed to the create matched attribute module 161 as an attribute_present. The create matched attribute module 161 accepts the attribute_present and the attribute needed and creates a matched attribute tuple comprising a value needed measure, an attribute importance measure, and a requirement measure of the attribute needed and a merged attribute value present measure and a merged credibility measure of the attribute_present.

Figure 14:
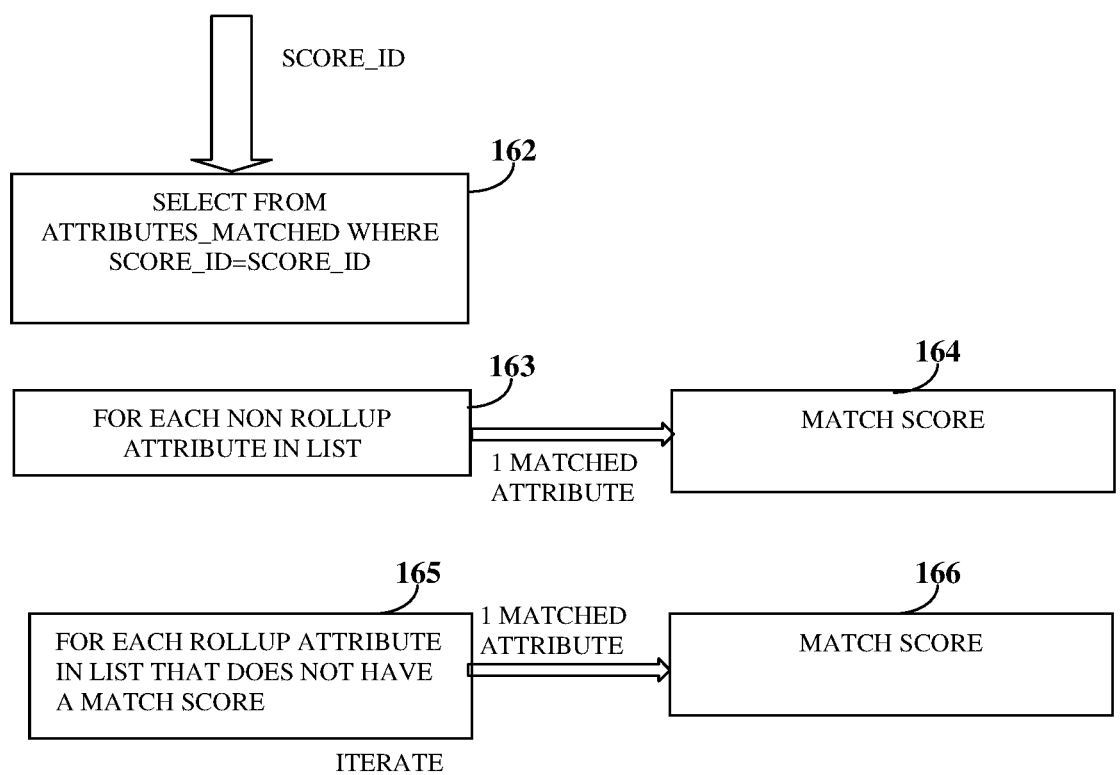
FIG. 14 exemplarily illustrates a flow diagram comprising the steps performed by a create matched attribute module of the multi-directional attribute matching system for generating an attribute match score for each of the matched attributes in the matched attribute list.

FIG. 14 exemplarily illustrates a flow diagram comprising the steps performed by the create matched attribute module 161 of the multi-directional attribute matching system (MAMS) for generating an attribute match score for each of the matched attributes in the matched attribute list. The create matched attribute module 161 is invoked by SCORE_ID. The create matched attribute module 161 selects 162 the matched attributes from the matched attribute list where SCORE_ID=SCORE_ID. The matched attributes without children or sub-attributes are processed first and later the sub-attributes are rolled up. In step 163, each non-rollup matched attribute in the matched attribute list is passed to a match score module 164 that adds to each matched attribute, additional values of a delta and an attribute match score and generates a scored matched attribute. The scoring is as per the match formula. In step 165, each rollup attribute in the matched attribute list that does not have an attribute match score, the create matched attribute module 161 rolls up the Sum (attribute match scores of the sub-attributes)/Sum (attribute importance measures of the sub-attributes) as disclosed in the detailed description of FIGS. 29A-29B of the matched attributes to the match score module 164. The match formula to perform this step 165 is RollUp. Each match formula calculates Has_Requirements. For the Rollup match formula, Has_Requirements is FALSE if any sub-attribute has a FALSE Has_Requirements. The process of rollups is iterated until there is no rollup without an attribute match score.

Figure 15:
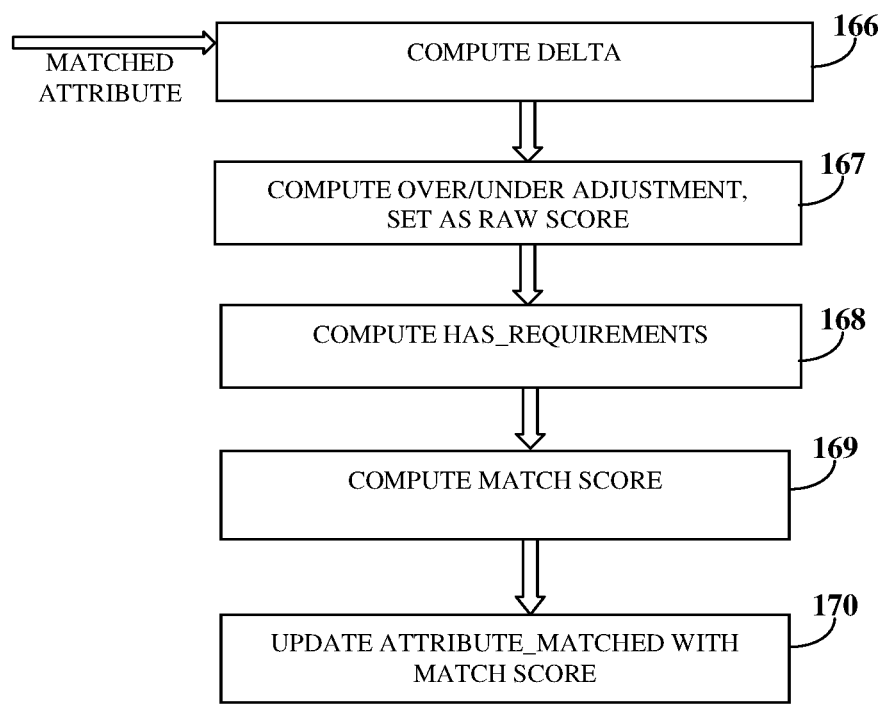
FIG. 15 exemplarily illustrates a flow diagram comprising the steps performed by a match score module of the multi-directional attribute matching system for generating a scored match attribute with an associated attribute match score, where the matched attribute has no sub-attributes.

FIG. 15 exemplarily illustrates a flow diagram comprising the steps performed by the match score module 164 of the multi-directional attribute matching system (MAMS) for generating a scored match attribute, that is, a matched attribute in the matched attribute list with an associated attribute match score, where the matched attribute has no sub-attributes. The match score module 164 exemplarily illustrated in FIG. 14, receives the matched attribute, that is, the attribute needed matching with an attribute possessed in the matched attribute list. The match score module 164 computes 166 the delta as difference in the value present measure, Amount_Present, and value needed measure, Amount_Needed. That is, the match score module 164 determines deviation in value present measure and the value needed measure. The match score module 164 computes 167 an over/under adjustment using a lookup of (delta/Amount_Needed) against a value measure deviation lookup table exemplarily illustrated in FIG. 36, that returns a numerical value for different data ranges of the value of the (delta/Amount_Needed). The match score module 164 further computes 168 Has_Requirements corresponding to each matched attribute in the matched attribute list. The Has_Requirements is Boolean and is set to TRUE if the value present measure satisfies the requirement measure associated with the attribute needed. The match score module 164 sets the Has_Requirements TRUE if there is no requirement measure associated with the attribute needed in the attributes needed list. The match score module 164 computes 169 an attribute match score as (attribute importance measure*credibility measure*over/under adjustment) for each matched attribute. The match formula is assumed to be Percents. The match score module 164 updates the matched attribute list with the additional values of delta and the attribute match score corresponding to each of the matched attributes. If the match formula is not Percents, the match score module 164 computes a raw score and computes the attribute match score using the computed raw score as disclosed in the detailed description of FIGS. 33A-33B and FIGS. 38A-38B.

Figure 16:
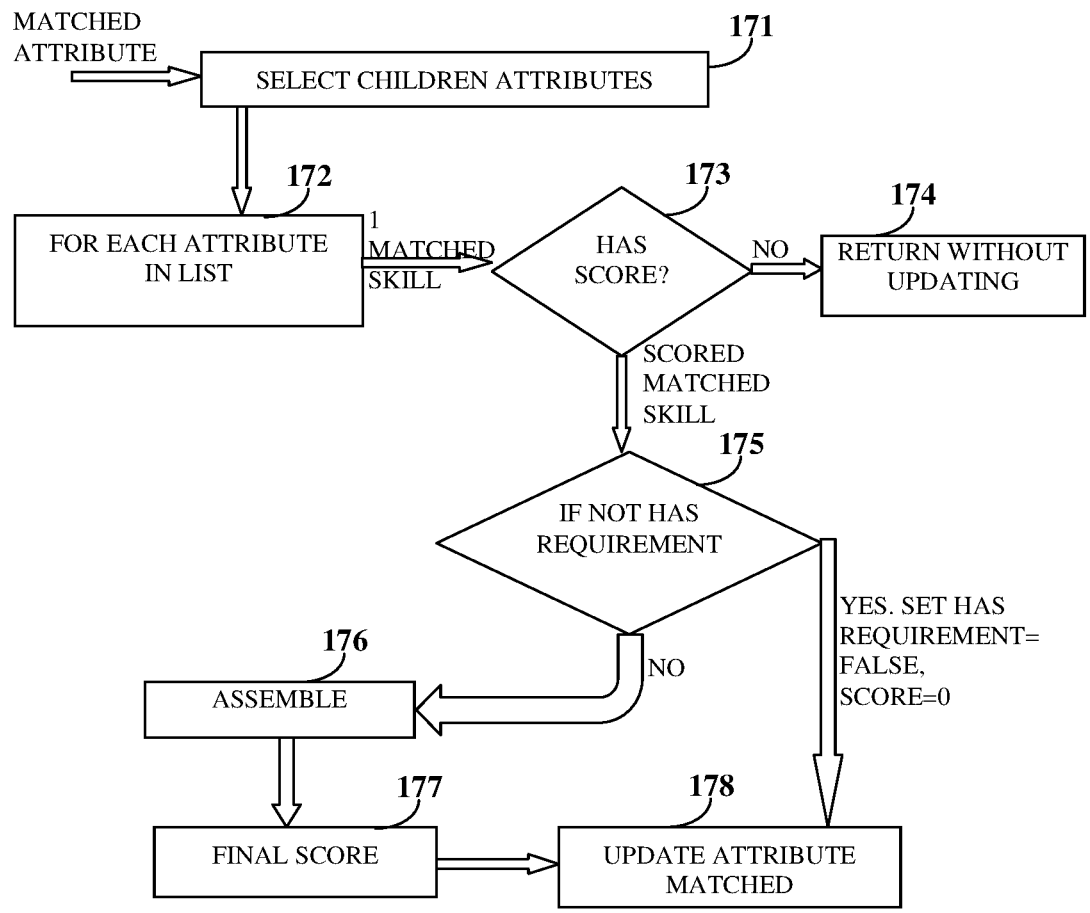
FIG. 16 exemplarily illustrates a flow diagram comprising the steps performed by the match score module of the multi-directional attribute matching system for generating a scored match attribute with an associated attribute match score, where the matched attribute has sub-attributes.

FIG. 16 exemplarily illustrates a flow diagram comprising steps performed by the match score module 164 of the multi-directional attribute matching system (MAMS) for generating a scored match attribute, that is, a matched attribute in the matched attribute list with an associated attribute match score, where the matched attribute has sub-attributes. The match score module 164 exemplarily illustrated in FIG. 14, receives the matched attribute matching with an attribute possessed in the matched attribute list and selects 171 the children attributes, that is, the sub-attributes of the matched attributes. The pseudo code for selecting the children attributes by the match score module 164 is as given below:

Select from Attributes Matched where SCORE_ID=SCORE_ID and POSSESSED_BY=POSSESSED_BY and ATTR_ID in (select ATTR_ID from attributes where PARENTATTR_ID=ATTR_ID)

For each attribute in the matched attribute list 172, the match score module 164 examines 173 if a corresponding attribute match score exists. If a corresponding attribute match score exists, the match score module 164 determines 175 if Has_Requirements exists, that is, Has Requirements is TRUE. If the corresponding attribute match score does not exist, the match score module 164 returns 174 without updating the attribute match score and continues with the next matched attribute. If the Has_Requirements exists, the match score module 164 sets the Has_Requirements field as FALSE and the attribute match score as 0. If the Has_Requirements does not exist, the match score module 164 assembles 176 the scored matched attributes in the matched attribute list with associated attribute match scores into a list and passes the list to a final score module 177 that returns a final score. The match score module 164 updates 178 the matched attributes in the matched attribute list with corresponding attribute match scores. The nested raw score of the parent attribute is given as Sum(attribute match scores of the direct children)/Sum(attribute importance measure of the direct children). The attribute match score of the parent attribute is given as the nested raw score*attribute importance measure.

FIG. 17 exemplarily illustrates a tabular representation of a side specification list for multi-directional match between different item profiles, for example, a person, a band, and a venue. Consider an example where a person wanting to engage a band in a venue. The multi-directional attribute matching system (MAMS) performs the matching of the person, the band, and the venue involving multiple sides of the multi-directional match are listed in the side list with corresponding SIDESPEC_ID and PARENT SIDESPEC_ID. Possible sides of the match are: The first side of the match is the person has needs that the band must fulfill. The second side of the match is the band has needs that the person must fulfill. The third side of the match is the person has needs that the venue must fulfill. The fourth side of the match is the venue has needs that the person must fulfill. The fifth side of the match is the band has needs that the venue must fulfill. The sixth side of the match is the venue has needs that the band must fulfill. The seventh side of the match is the needs of the person which is a roll up of the first side and the third side of the match. The eighth side of the match is the needs of the venue which is a roll up of the fourth side and the sixth side. The ninth side of the match is the needs of the band which is a roll up of the third side and the fifth side. The tenth side of the match is the event itself that is a rollup of the seventh side, eighth side, and the ninth side. As exemplarily illustrated in FIG. 17, out of the ten sides, only nine sides are listed out of which four sides have corresponding match formula as rollup and the five sides are scored. Each of the sides has a corresponding importance measures and in each of the sides, an item name and a need name are identified. For example, in the first side identified by the SIDESPEC_ID 102 and whose PARENT SIDESPEC_ID is 101 has the item name as band and the need name as person as the band has attributes possessed and the person has attributes needed. The relative importance of the venue needs is less than the relative importance of the person needs as the attribute match score for the venue needs carries only a weight of 0.3 relative to the weight of 0.5 for the person needs. The SIDESPEC_IDs of the rows in the side list that do not have a PARENT SIDESPEC_ID are passed as input in FIG. 1. SIDE_NAME is independent of the ATTR_ID. SIDE_NAME identifies the side that uses an attribute. The ATTR_ID in the side list is a reference to the predefined attribute list, similar to other references to ATTR_ID. The rows in the side list may have parent rows. The attribute match score associated with the attributes in the constituent sides is used to compute the final score for the match.

The multi-directional attribute matching system (MAMS) processes and stores different sets of N-sided matches in different side lists. One score rule in a side list could have a match only of what the employer wants. Another score rule can be matched between both employer and candidates. In another side list, the score rule can be all about persons, bands, and venues—all concurrently processed by the MAMS. Adding items such as people, bands, and venues into the MAMS would mean adding more rows in the predefined attribute list and adding match formulae to use the attributes associated with the added items. When a match is run, the attributes associated with the added items are classified into attributes possessed and attributed needed and listed in the attributes possessed list and attributes needed list specific to the item name and the need name in a match. In the side list, the matching between a job and a candidate can co-reside with the matching between a person, a band, and a venue, matching between a patient, a doctor, and a treatment, matching between an alternative, a facility, and an insurance.

FIGS. 18-38 exemplarily illustrate tabular representations of computations for determining a degree of match between candidate profiles and job profiles with respective attributes possessed and respective attributes needed of varying credibility and varying importance by the multi-directional attribute matching system (MAMS). FIG. 18 exemplarily illustrates a side list for a scenario of matching multiple candidates CAND_1, CAND_2, and CAND_3 with multiple jobs JOB_1, JOB_2, and JOB_3. As exemplarily illustrated, multiple sides in matching the candidates to the jobs are identified with SIDESPEC_IDs and PARENT SIDESPEC_IDs and the sides have corresponding importance measures. In each of the sides that have a match formula as score, the item name and the need name are identified. Matching one candidate to one job as specified by the row with SideSpec Id=1 is a bidirectional match as the candidate has needs from the job, as specified by the row with SideSpec Id=3 and the job has needs from the candidate as specified by the row with SideSpec Id=2. The different scenarios in matching candidates to jobs are, for example: CAND_1 possesses high skills with high credibility and needs high pay and spouse medical care. CAND_2 possesses moderate skills with moderate credibility and needs moderate pay and does not need spouse medical care. JOB_1 offers good compensation and has picky skill demands JOB_2 offers moderate compensation and has relaxed skill demands. The MAMS determines the degree of bi-directional match between the CAND_1 and JOB_1, CAND_1 and JOB_2, CAND_1 and JOB_3, CAND_2 and JOB_1, and CAND_2 and JOB_2, CAND_2 and JOB_3, CAND_3 and JOB_1, CAND_3 and JOB_2, and CAND_3 and JOB_3 by determining a final score for each combination of a candidate and a job as exemplarily illustrated in FIG. 19. The item profiles of the candidates and the jobs have both attributes possessed, with credibility levels, and attributes needed, with importance. The attributes are different sets of attributes, but each profile is offering attributes to and needing attributes from the other profile.

FIG. 19 exemplarily illustrates a fit score table comprising final scores and attribute match scores for the different combinations of candidates CAND_1, CAND_2, and CAND_3 and jobs JOB_1, JOB_2, and JOB_3 listed in the side list. As exemplarily illustrated in FIG. 1, the multi-directional attribute matching system (MAMS) receives a SIDESPEC_ID and list of names tuples associated with the SIDESPEC_ID from the side list exemplarily illustrated in FIG. 18 to create rows in the fit score table. The rows in the fit score table without PARENT SCORE_ID are the parent rows for the different combinations of candidates and jobs and final scores are computed for these rows using roll-up of the children rows. The rollup rows do not have a corresponding ATTR_ID. The rows in the fit score table with PARENT SCORE_ID are children rows. and the scores of the children rows are computed as disclosed in the detailed description of FIGS. 29A-29B. Thus, when invoked with tuples supplying names profile_ids and item_ids corresponding to every placeholder Item Name and Need Name, MAMS inserts into the fit score table rows corresponding with and linked to the side spec list but with the profile_ids and item_ids taken from the invocation tuples, FIG. 1, step 101. The MAMS selects from the fit score list a side whose linked side spec row formula is "score" and identified by the SIDESPEC_ID and PARENT SIDESPEC_ID. For example, the MAMS selects the row with a SCORE_ID=101 having a SIDESPEC_ID as 2 and PARENT SIDESPEC_ID as 1. For the selected side, the MAMS retrieves the attributes needed list, comprising the attributes needed in the item profiles from the predefined attribute list. The attributes needed list exemplarily illustrated in FIGS. 22A-22B comprises the attributes needed and second tuples corresponding to the attributes needed, for example, attributes needed for JOB_1 for the selected side having a SIDESPEC_ID as 2. The MAMS finds a matched attribute list by matching the attributes possessed in the attributes possessed list exemplarily illustrated in FIGS. 21A-21C, with the attributes needed in the attributes needed list exemplarily illustrated in FIGS. 22A-22B. For example, the MAMS finds a matched attribute list of CAND1 by matching the attributes possessed in the attributes list with the attributes needed for JOB1. The MAMS generates a table of matched attributes by creating a row for with the attribute possessed identified by the attribute id from the side specification entry for the match and from the profile_id of the item with the attributes needed, and for all of its sub-attributes, and with the values from the attributes possessed table for the attribute and for the profile_id of the item with the attributes possessed. For example, the MAMS generates a table of matched attributes for CAND_1 and JOB_1 as exemplarily illustrated in FIG. 28.

The MAMS generates an attribute match score for each of the matched attributes, for example, the attributes identified with ATTR_ID 13, 5, 4 and 14, in the generated matched attribute list from a raw score corresponding to each of the matched attributes using the value possessed measures and the credibility measures corresponding to the attributes possessed, and the value needed measures, the attribute importance measures, and the requirement measures associated with the attributes needed as exemplarily illustrated in FIG. 29. If a matched attribute has a match formulae of RollUp and the other matched attributes are hierarchical sub-attributes of the attribute in the matched attribute list, for example, the attribute with ATTR_ID 3 has sub-attributes of ATTR_ID 13, 5, 4, and 14, the MAMS computes a nested raw score corresponding to the attribute, for example, the attribute with ATTR_ID 3 from the attribute match scores and the important measures corresponding to the hierarchical sub-attributes as exemplarily illustrated in FIGS. 29A and 29B and 30. The match score module 164 determines the raw score corresponding to the attribute with ATTR_ID 3 as Sum (attribute match scores of the sub-attributes)/Sum (attribute importance measures of the sub-attributes)=(0.1204+ 0.0536+0.093+0.135)/(0.4+0.8+0.3+0.9)=0.1675 as exemplarily illustrated in FIG. 30. The match formula corresponding to ATTR_ID 3 is Rollup. That is, the attribute match scores of the sub-attributes are rolled up to determine the attribute match score corresponding to ATTR_ID 3. For determining the attribute match score using the match formula of Rollup, the attribute match score is given as attribute importance measure*computed raw score*credibility measure, where the credibility measure is equal to 1. The match score module 164 determines the attribute match score corresponding to the attribute with ATTR_ID 3 as attribute importance measure*computed raw score=0.7*0.1675=0.11725. The match score module 164 determines the nested raw score corresponding to the matched attribute with ATTR_ID 1 as Sum (attribute match scores of the sub-attributes)/Sum (attribute importance measures of the sub-attributes)=0.11725/0.7=0.1675. The attribute with ATTR_ID 3 is a sub-attribute of a matched attribute of ATTR_ID 1. Using the nested raw score and attribute importance measure corresponding to the parent attribute, for example, the attribute with ATTR_ID 1, the MAMS generates an attribute match score and Has Requirements measure for the parent attribute with ATTR_ID 1 as 0.17. This score, for example, 0.17 becomes the raw match score in the Fit Score table row that specified the match and the Has Requirement measure becomes the Has Requirement measure in this row for the SCORE_ID 101, as exemplarily illustrated in FIG. 19. A match score in the Fit Score table for the corresponding raw score is computed by multiplying the attribute match score by the importance from the linked side specification list row. For example, the match score is computed by multiplying (0.17*0.2) as 0.03 for the SCORE_ID 101.

The multi-directional attribute matching system (MAMS) computes the final score corresponding to SCORE_ID 100 as (need fit score*need fit score importance+item fit score*item fit score importance)/(need fit score importance+item fit score importance). Before computing the final score, the MAMS determines Has_Requirements corresponding to SCORE_ID 100 as Has_Requirements corresponding to SCORE_ID 101 AND Has_Requirements corresponding to SCORE_ID 102. If Has Requirements corresponding to SCORE_ID 100 is FALSE, the MAMS assigns the final score as 0. As exemplarily illustrated, the Has_Requirements corresponding to SCORE_ID 100 is TRUE and the final score is computed as (0.85*0.1+0.17*0.2)/(0.1+0.2)=0.40 as exemplarily illustrated in FIG. 19.

FIGS. 20A-20E exemplarily illustrates a predefined attribute list comprising the attributes possessed and the attributes needed by candidates and jobs. The attributes have a corresponding ATTR_ID and PARENTATTR_ID and have a hierarchy. The hierarchy is defined by the columns PARENTATTR_ID and LEVEL. The LEVEL is 0 if PARENT_ATTR_ID is null. If PARENT_ATTR_ID is not null, the LEVEL is one higher than the LEVEL of the row with the ATTR_ID that matches the PARENT_ATTR_ID. The attributes possessed are indicated with a FALSE or a TRUE for being multi-valued. The attributes possessed with MULTIVALUE=TRUE are merged in accordance with the detailed description of FIG. 8. The items, for example, jobs have multi-valued attributes possessed, such as, good food choices of nice people working in the jobs. The ratings corresponding to good food choices are collected from the ratings of the job in the list of attribute ratings similar to how PHP programming skills of a candidate are rated. For the "good food choices" and the "nice people" attributes, the over/under lookup in the value measure deviation lookup table are different so as not to penalize people for being too nice.

The different data types of the attributes are percentage, range, Boolean, and text. The value needed measures and the value present measures are expressed as percent, Booleans, range, and text. An example of the value needed measure in Boolean is a response to "must be free of TB" and the value present measure in Boolean is a response to "are you free of TB". Also, a credibility measure is associated with the value present measure and the values needed importance. For example, multiple parties supply a response to a question about a need similar to multiple parties rating PHP skills of a candidate and 3 responses are TRUE and 5 responses are FALSE. However, the responses of the party that supplied TRUE may have a higher credibility. In such cases, the result of merging of the multi-valued Boolean would be a Boolean with some uncertainty. The value present measure expressed in percent has a higher confidence compared to a value present measure expressed as a range. For example, to the question "How strong is Joe in PHP?" the responses from multiple parties are "I kind of think he is a 0.6", "I am pretty sure he is between 0.5 and 0.8", etc. For the different data types of the value present measures and the value needed measures of the attributes, there are different match formulae using match formula parameters. The different match formulae are Percents, Rollup, MoreIsBetter, At least, and MustHave. The match formulae are used in matching the attributes possessed with the attributes needed. The match formulae are invoked by the multi-directional attribute matching system (MAMS). The match formulae are used to compute the attribute match score for a row in the matched attribute list when comparing a value present measure having a corresponding credibility measure with a value needed measure having a corresponding attribute importance measure in the matched attribute list. The sides that have match formula as score in the fit score table are scored and corresponding attribute match scores are determined.

The match formulae can be given short names and stored in the match formula column in the predefined attribute list as exemplarily illustrated. The match formula parameters are data passed to the match formulae that affect the processing of the value present measures and the value needed measures, for example, "Over/Under Set Name: "basic". The datatype of the match formula parameters is text and the match formula parameters, illustrated as <OU>Skills</OU>, are an XML representation of the parameters passed to the match formulae, that is, an XML setting the OU attribute to be skills. The match formula parameters are used to specify a different set of over/under adjustment lookup rows in case of Percents match formula. The logic that implements the Percents match formula may use the XML representation as a key to the OverUnder table, that is, the value measure deviation lookup table exemplarily illustrated in FIG. 32. Also, the datatype of some rows in the predefined attribute list is none as the attributes have no value present measures and the attribute match scores are roll-up of the attribute match scores of the children or the sub-attributes using the Rollup match formula.

One of the match formulae is "no score". In this case, the attribute match score is not included in the computation of the fit score. Also, failing to meet a "Has_Requirements" value will still result in a final score of 0 as disclosed in the detailed description of FIG. 16. For example, the attribute "Medical Degree" may be required for a certain need. Not having the medical degree makes the attribute match score to be 0, but having the degree does not affect the attribute match score at all. All the attributes in the predefined attribute list may have corresponding default attribute importance measures and default values needed measures. All the attributes in the predefined attribute list may have corresponding default credibility measures and default values present measures. The attributes in the predefined attribute list that are indicated by the ISTRAIT flag are considered to be possessed to some degree by every item but are processed by the multi-directional attribute matching system (MAMS) in the same manner as are as attributes not indicated by the ISTRAIT flag.

FIGS. 21A-21C exemplarily illustrate an attributes possessed list comprising attributes possessed in the item profiles CAND_1, CAND_2, and CAND_3, JOB_1 and JOB_2 with corresponding value present measures and credibility measures. The attributes possessed by the items are all skills with less than 1 credibility. The attributes possessed by JOB_1, and JOB_2 are all ranges or Booleans with full credibility. Single-valued attributes possessed are present in the attributes possessed list and the multi-valued attributes possessed are merged as disclosed in the detailed description of FIGS. 26A-26F and stored in the attributes possessed list. On observation of the value present measures in JOB_1 and JOB_2, it is found that JOB_2 pays less, does not have healthcare for spouse, and has people that are not as nice. Also, on comparing the items CAND_1 and CAND_2, CAND_1 has lower overall skills and core traits. Furthermore, no sub-attribute with a parent attribute can be entered without the parent attribute also being entered recursively and if the sub-attribute has values for default value present measure, then even if the sub-attribute is not present in the attributes possessed list, the sub-attribute is treated as if it were present in the attributes possessed list when generating the matched attribute list. As observed in the attributes possessed list exemplarily illustrated in FIGS. 21A-21C, sub-attribute with ATTR_ID 27 in JOB_2 is not entered. However, it is implied that the sub-attribute has a default value present measure since the parent attribute ATTR_ID 22 is present in the attributes possessed list with value present measures. Also, the sub-attributes work environment and good food choices with ATTR_ID 29 and 31 do not have implied values for the value present measures.

FIGS. 22A-22B exemplarily illustrate an attributes needed list comprising attributes needed in the item profiles CAND_1, CAND_2, and CAND_3, JOB_1 and JOB_2 with corresponding requirement measures, attribute importance measures, and value needed measures. On observation of the value needed measures in the JOB_1 and JOB_2, it is found that JOB_2 needs less skills and does not need data mining at all. Also, on comparing the item profiles CAND_1 and CAND_2, CAND_1 needs an annual salary between 80K and 110K as compensation, the more the better, will not take a position without healthcare for self, will not take a position without healthcare for spouse, and wants a work environment with nice people and mediocre food. The attributes possessed list exemplarily illustrated in FIGS. 21A-21C and the attributes needed list exemplarily illustrated in FIGS. 22A-22B comprise a column PROFILE_ID that associates the entries within. In an embodiment, the item profile with a PROFILE_ID comprises information such as candidate name, address, and information related to files such as resumes for a candidate and information such as company name, location, description, etc., for a job.

FIG. 23 exemplarily illustrates a list of attribute ratings comprising attributes possessed in the item profile CAND_1 and corresponding sub-attributes rated by multiple reviewers. As exemplarily illustrated, multiple reviewers provide ratings corresponding to the different attributes possessed identified by ATTR_ID. The attributes identified with ATTR_ID 4, 5, 6, 7, 12, and 13 are sub-attributes of an attribute with ATTR_ID 3 as exemplarily illustrated in FIGS. 20A-20E. The attributes possessed are multi-valued with corresponding value present measures and credibility measures awarded by the reviewers. The multi-directional attribute matching system (MAMS) performs merging actions on the list of attribute ratings as exemplarily illustrated in FIGS. 26A-26F and generates an attributes possessed list as exemplarily illustrated in FIG. 25. In an embodiment, when matching between the item profiles is not performed, the multi-valued attributes are stored in the attributes possessed list with multiple occurrences. In this embodiment, when matching is performed, the multi-values attributes are passed to the list of attribute ratings and merging actions are performed as disclosed in the detailed description of FIGS. 26A-26F. The logic for merging resides in the match formula. Not all match formulae support merging as disclosed in the detailed description of FIGS. 20A-20E. Attributes with a datatype of text, for example, cannot be mathematically added. The match formulae that do not support combining ratings, and attributes with such corresponding match formulae cannot be present in the list of attribute ratings.

FIG. 24 exemplarily illustrates an attributes needed list comprising attributes needed in the item profile JOB_1 with corresponding requirement measures, attribute importance measures, and value needed measures. As exemplarily illustrated, the attribute with ATTR_ID 3 has a PARENTATTR_ID 1. The attributes with ATTR_ID 13, 4, 5, and 14 are sub-attributes of the parent attribute with ATTR_ID 3. FIG. 25 exemplarily illustrates the attributes possessed list generated on merging of the attributes possessed in the list of attribute ratings exemplarily illustrated in FIG. 23. The merging actions on the attributes possessed is exemplarily illustrated in FIG. 26A-26F and the multi-directional attribute matching system (MAMS) computes merged value present measures and merged credibility measures in the item profile CAND_1.

FIGS. 26A-26F exemplarily illustrates 6 sub-lists of the attributes possessed that are in the list of attribute ratings exemplarily illustrated in FIG. 23. As exemplarily illustrated in FIG. 26A, the multi-directional attribute matching system (MAMS) creates a sub-list of the attribute possessed, CONFIDENCE, with a corresponding value present measure of 1.00 and the corresponding credibility measure of 0.50. The compute attribute values module 143 exemplarily illustrated in FIG. 9, determines a weighted value present measure as value present measure*credibility measure=1.00*0.50=0.50, and a weighted credibility measure as credibility measure*credibility measure=0.50*0.50=0.25. The attribute combiner 145 exemplarily illustrated in FIG. 9, computes a merged value present measure as Sum (weighted value present measure)/Sum (credibility measure). Since there is only one occurrence of the attribute possessed CONFIDENCE in the sub-list, the Sum (value present measure)=1.00, the Sum (weighted value present measure)=0.50, and the Sum (credibility measure)=0.50. The attribute combiner 145 computes the merged value present measure as 0.50/0.50=1.00 and an unadjusted credibility measure as Sum(weighted credibility measure)/Sum(credibility measure)=0.25/0.5=0.5. The attribute combiner 145 computes the credibility bump as (Sum (weighted credibility measure) *coeff_credbump−coeff_credbump. The coeff_credbump is a constant preconfigured in the attribute combiner 145 as 0.1. The coeff_credbump defines the amount of credibility bump to provide to the N sub-lists. The coeff_credbump drives computations performed by the attribute combiner 145, affecting degree of adjustment to be made to the credibility measure. The attribute combiner 145 computes the credibility bump as (0.25*0.1)-0.1=−0.075. The attribute combiner 145 computes the merged credibility measure as (unadjusted credibility measure+credibility bump)=0.5-0.075=0.425~0.43.

Similarly, the multi-directional attribute matching system (MAMS) creates a sub-list of the attribute possessed, EXCEL, with corresponding value present measures 0.90, 0.70, and 0.90 and credibility measures of 0.40, 0.80, and 0.50 as exemplarily illustrated in FIG. 26B. The compute attribute values module 143 determines a weighted value present measure as value present measure*credibility measure and a weighted credibility measure as credibility measure*credibility measure for each of the occurrences of the attribute possessed, EXCEL, in the sub-list. The weighted value present measure is computed as 0.36, 0.56, and 0.45 and the weighted credibility measure is computed as 0.16, 0.64, and 0.25 respectively for the three occurrences of the attribute possessed, EXCEL, in the sub-list. The attribute combiner 145 computes a merged value present measure as Sum (weighted value present measure)/Sum (credibility measure). Sum (weighted value present measure)=1.37, Sum (credibility measure)=1.70, and Sum (weighted credibility measure)=1.05. The attribute combiner 145 computes the merged value present measure as 1.37/1.7=0.805~0.81 and the unadjusted credibility measure as Sum (weighted credibility measure)/Sum (credibility measure)=1.05/1.7=0.62. The attribute combiner 145 computes the credibility bump as (Sum (weighted credibility measure)*coeff_credbump−coeff_credbump with the coeff_credbump as 0.1. The attribute combiner 145 computes the credibility bump as (1.05*0.1)-0.1=0.005. The attribute combiner 145 computes the merged credibility measure as (unadjusted credibility measure+credibility bump)=0.62+0.005=0.625~0.62.

As exemplarily illustrated in FIG. 26C, a sub-list of 2 occurrences of the attribute possessed, INTEGRITY, with corresponding value present measures of 0.70 and 0.80 and corresponding credibility measures of 0.70 and 0.90 is created. The attribute combiner 145 computes a merged value present measure and a merged credibility measure as disclosed in the detailed description of FIGS. 26A-26B, as 0.76 and 0.84. Similarly, in FIG. 26D, a sub-list of a single report of the attribute possessed PHP with corresponding value present measure of 0.90 and a credibility measure of 0.30 is created. The attribute combiner 145 computes a merged value present measure and a merged credibility measure as disclosed in the detailed description of FIGS. 26A-26B, as 0.90 and 0.21. Similarly, in FIG. 26E, a sub-list of 3 reports of the attribute possessed MSWORD with corresponding value present measures of 0.50, 1.00, and 0.70 and credibility measures of 0.60, 0.10, and 0.80 is created. The attribute combiner 145 computes a merged value present measure and a merged credibility measure as disclosed in the detailed description of FIGS. 26A-26B, as 0.28 and 0.65. Similarly, in FIG. 26F, a sub-list of 5 reports of the attribute possessed DATA MINING with corresponding value present measures of 1.0, 0.20, 1.0, 0.25, and 1.0 and credibility measures of 0.10, 0.50, 0.10, 0.40, and 0.10 is created. The attribute combiner 145 computes a merged value present measure and a merged credibility measure as disclosed in the detailed description of FIGS. 26A-26B, as 0.42 and 0.31. The credibility measure and the value present calculated using the formula provided in the excel sheet provides the highlighted values which is different from the values provided in the excel sheet.

FIGS. 27A-27B exemplarily illustrate inserting a row corresponding to the parent attributes in the attributes possessed list exemplarily illustrated in FIG. 25 by the score_calc_i module of the multi-directional attribute matching system (MAMS). The attributes possessed list exemplarily illustrated in FIG. 25, comprises only sub-attributes with PARENTATTR_ID 3 as exemplarily illustrated in FIGS. 20A-20E. The attribute possessed SKILLS has ATTR_ID 3 and a PARENTATTR_ID 1. The attribute possessed SKILLS is a sub-attribute of the attribute possessed ITEM FIT SCORE. The score_calc_i module determines that the parent attributes are absent in the attributes possessed list and invokes ADD PARENT ATTRIBUTE POSSESSED IF NEEDED (PROFILE_ID, PARENT_ATTR_ID) function. The score_calc_i module inserts the rows exemplarily illustrated in FIG. 27A, from the predefined attribute list exemplarily illustrated in FIGS. 20A-20E, in the attributes possessed list exemplarily illustrated in FIG. 25 to generate the attributes possessed list exemplarily illustrated in FIG. 27B.

FIG. 28 exemplarily illustrates a matched attribute list created by the multi-directional attribute matching system (MAMS) by matching the attributes possessed in the attributes possessed list exemplarily illustrated in FIG. 27B, with the attributes needed in the attributes needed list exemplarily illustrated in FIG. 24. The sub-attribute of the attribute with ATTR_ID 14, DEPENDABILITY, in the attributes needed list exemplarily illustrated in FIG. 24, is absent in the attributes possessed list exemplarily illustrated in FIG. 27B. The attribute entry match module 156 exemplarily illustrated in FIG. 12, fetches the attribute needed, from the predefined attribute list exemplarily illustrated in FIGS. 20A-20E, along with a corresponding default value present measure and a default credibility measure. The attribute entry match module 156 inputs the value present measure and the credibility measure as 0.5 and 0.25 respectively in the matched attribute list. The SCORE_ID is 1 indicating matching of CAND_1 of a candidate as exemplarily illustrated in FIG. 27B and JOB_1 as exemplarily illustrated in FIG. 24.

FIG. 29 exemplarily illustrates the matched attribute list exemplarily illustrated in FIG. 28, comprising attribute match scores generated by the multi-directional attribute matching system (MAMS) on matching the attributes possessed in the attributes possessed list exemplarily illustrated in FIG. 27B, with the attributes needed in the attributes needed list exemplarily illustrated in FIG. 24. The match score module 164, exemplarily illustrated in FIG. 14, adds to each sub-attribute of the matched attribute, additional values of delta and determines a raw score, that is, the row match score using an over/under adjustment. The over/under adjustment is a conventional lookup, for example, performed by a VLOOKUP function in MS Excel® of Microsoft Corporation. The over/under adjustment is used for downgrading or penalizing matches with large differences between the attributes possessed and the attributes needed. The over/under adjustment is a conventional lookup and uses a dataset from FIG. 29 and the over/under set name passed in as a parameter to the value measure deviation lookup table as exemplarily illustrated in FIG. 32. FIG. 32 exemplarily illustrate the value measure deviation lookup table with two set names. The two set names are "Skills" and "HasMin". The "HasMin" penalizes smaller differences between the value present measures and the value needed measures but has no penalty for having a larger difference. The over/under adjustment under the set name "Skills", for example, would penalize an oral surgeon matched against a dental hygienist position as the dental surgeon is way over qualified. However, the over/under adjustment under the set name "HasMin" would not penalize oral surgeon matched against a dental hygienist position. Other over/under adjustments under different set names apart from "Skills" could even reward for over presence.

The match score module 164 computes delta as difference in a value present measure and a value needed measure. As exemplarily illustrated in FIG. 29, the delta for the matched attribute with ATTR_ID 14, is 0.50-0.90=−0.40. The match score module 164 determines an over/under adjustment using a lookup of (delta/value needed measure) against the value measure deviation lookup table exemplarily illustrated in FIG. 32. The value of (delta/value needed measure)=−0.40/0.90=−0.44~−0.5. The corresponding over/under adjustment from the value measure deviation lookup table is 0.6. The match score module 164 determines if Has_Requirements is TRUE. Since the Has_Requirements is TRUE, the match score module 164 assigns the over/under adjustment from the value measure deviation lookup table to the raw score corresponding to the sub-attribute ATTR_ID 14. The match score module 164 computes the attribute match score corresponding to the sub-attribute ATTR_ID 14 as (attribute importance measure*credibility measure*raw score)=0.90*0.25*0.60=0.135~0.14 as exemplarily illustrated in FIG. 32. Similarly, for the other matched attributes, the match score module 164 computes the attribute match scores as 0.12, 0.05, and 0.09 for the matched attributes with ATTR_ID as 13, 5, and 4 respectively. To assign the over/under adjustment as the raw score, the match score module determines if the match formula for the matched attribute is percent.

FIGS. 29A-29B exemplarily illustrate the matched attribute exemplarily illustrated in FIG. 29, comprising attribute match scores generated by the multi-directional attribute matching system (MAMS) on matching the attributes possessed in the attributes possessed list exemplarily illustrated in FIG. 27B, with the attributes needed in the attributes needed list exemplarily illustrated in FIG. 27. The match score module 164, exemplarily illustrated in FIG. 14, adds to each matched attribute in the matched attribute list, an attribute match score, that is, the row match score using a nested raw score corresponding to the matched attribute. The nested raw score is computed from the attribute match scores corresponding to the sub-attributes. As exemplarily illustrated in FIGS. 29A-29B, the attribute with ATTR_ID 3 has sub-attributes of ATTR_ID 13, 5, 4, and 14. The attribute with ATTR_ID 3 is a sub-attribute of a matched attribute of ATTR_ID 1. The match score module 164 determines the raw score corresponding to the attribute with ATTR_ID 3 as Sum (attribute match scores of the sub-attributes)/Sum (attribute importance measures of the sub-attributes)=(0.1204+0.0536+0.093+0.135)/(0.4+0.8+0.3+0.9)=0.1675 as exemplarily illustrated in FIG. 30. The match formula corresponding to ATTR_ID 3 is Rollup. That is, the attribute match scores of the sub-attributes are rolled up to determine the attribute match score corresponding to ATTR_ID 3. For determining the attribute match score using the match formula of Rollup, the attribute match score is given as attribute importance measure*computed raw score*credibility measure, where the credibility measure is equal to 1. The match score module 164 determines the attribute match score corresponding to the attribute with ATTR_ID 3 as attribute importance measure*computed raw score=0.7*0.1675=0.11725. The match score module 164 determines the nested raw score corresponding to the matched attribute with ATTR_ID 1 as Sum (attribute match scores of the sub-attributes)/Sum (attribute importance measures of the sub-attributes)=0.11725/0.7=0.1675. Similarly, the match formula corresponding to ATTR_ID 1 is Rollup. The match score module 164 determines the attribute match score corresponding to the matched attribute with ATTR_ID 1 as attribute importance measure*computed nested raw score=1*0.1675=0.1675. The match score module 164 determines the attribute match score corresponding to the matched attribute in the matched attribute list exemplarily illustrated in FIG. 29 as Sum (attribute match score)/Sum (attribute importance measure corresponding to the matched attribute)=0.1675/1=0.1675 as exemplarily illustrated in FIG. 31. The attribute match score and the Has_Requirements score from the row with ATTR_ID 1 is input into the Item Fit Score and Item Has Requirements columns in the fit score table exemplarily illustrated in FIG. 19.

FIGS. 33A-33C exemplarily illustrate inserting rows corresponding to attributes needed in an attributes needed list comprising attributes needed in the item profile CAND_1 by the score_calc_i module of the multi-directional attribute matching system (MAMS). The attributes needed list exemplarily illustrated in FIG. 33A, comprises attributes with PARENTATTR_ID 15, 22, and 23 as exemplarily illustrated in FIGS. 20A-20E. The parent attributes with ATTR_ID 15 and 2 are absent in the attributes needed list. The score_calc_i module determines that sub-attributes with ATTR_ID 29, 30, and 31 are absent from the attributes needed list. The score_calc_i invokes ADD PARENT ATTRIBUTE NEEDED IF NEEDED (PROFILE_ID, PARENT_ATTR_ID) function and inserts the parent attributes, that is, the attributes needed with ATTR_ID 15 and 2 as exemplarily illustrated in FIG. 33B as disclosed in the detailed description of FIG. 6. The score_calc_i module invokes ADD CHILDREN ATTRIBUTES NEEDED IF NEEDED (PROFILE_ID, ATTR_ID) function and inserts the sub-attributes with ATTR_ID 29 and 30 as exemplarily illustrated in FIG. 33B as disclosed in the detailed description of FIG. 7.

FIGS. 34A-34B exemplarily illustrate a matched attribute list comprising matched attributes generated on matching of the attributes possessed in the item profile JOB_1 and the attributes needed in the item profile CAND_1. The SCORE_ID is set to 1. The attributes needed in the item profile CAND_1 are fetched from the attributes needed list resulting from FIGS. 33A-33C and the attributes possessed in the item profile JOB_1 are fetched from the attributes possessed list exemplarily illustrated in FIGS. 21A-21C and the multi-directional attribute matching system (MAMS) generates the matched attribute list exemplarily illustrated in FIGS. 34A-34B. The match formulae used to perform the matching between the attributes possessed and the attributes needed are Rollups, Percents, MustHaves, and MoreIsBetter. The Percents match formula is used by the sub-attributes with ATTR_ID 30 and 31. Using the Percents match formula, the raw scores are computed using a delta and an over/under adjustment as disclosed in the detailed description of FIG. 29. The sub-attribute Nice Place to Work with ATTR_ID 30 possessed by JOB_1 exceeded the needs of CAND_1 and the over/under adjustment is determined to be 1, that is, there is no adjustment and accordingly the attribute match score is computed. The sub-attribute Good Food with ATTR_ID 31 possessed by JOB_1 is below the expectations of CAND_1 by 0.1 or 25%. Using the over/under adjustment in the value measure deviation lookup table, the match score module 164 determines the over/under adjustment as 0.4 and accordingly the attribute match score is computed.

The Rollup match formula is used by the attributes needed and the sub-attributes with ATTR_ID 2, 15, 16, 22, 23, and 29. Using the Rollup match formula, the nested raw score is computed and an attribute match score is computed similar to the computation of the nested raw score and the attribute match score as disclosed in the detailed description of FIGS. 29A-29B. The MustHave match formula is used by the sub-attributes with ATTR_ID 24 and 25 similar to as exemplarily illustrated in FIGS. 35A-35B. The MustHave match formula compares Boolean values of value present measures and value needed measures. The Boolean values for value present measures and value needed measures are merged as exemplarily illustrated in FIGS. 36A-36B. In the TRUE table, the rows in the table exemplarily illustrated in FIGS. 36A-36B where value present measures are TRUE are considered. The weighted value present measure=1*credibility measures for the rows with TRUE value present measures. The weighted credibility is computed as credibility measure*credibility measure for the rows with TRUE value present measures. In the FALSE table, the rows in the table exemplarily illustrated in FIGS. 36A-36B where value present measures are FALSE are considered. The weighted value present measure=1*credibility measures for the rows with TRUE value present measures. The weighted credibility is computed as credibility measure*credibility measure for the rows with TRUE value present measures. If the value present measures in the table exemplarily illustrated in FIGS. 36A-36B are all TRUE or all FALSE, the merging actions are performed as exemplarily illustrated in FIGS. 26A-26F. If the value needed Boolean is FALSE, irrespective of the value of the value present Boolean, the raw score corresponding to the sub-attribute in the matched attribute list is assigned as 1. If the value needed Boolean is TRUE and the value present Boolean is TRUE, the raw score is assigned as 1 as the need possesses what the item wants. If the value needed Boolean is TRUE and the value present Boolean is FALSE, the raw score is assigned as 0 as the need does not possess what the item wants. The attribute match score for the sub-attributes with ATTR_ID 24 and 25 is computed as raw score*attribute importance measure*credibility measure.

The MorelsBetter match formula is used by the sub-attribute with ATTR_ID 17 similar to as exemplarily illustrated in FIG. 37. The MorelsBetter match formula compares the minimum values and maximum values in ranges of the value present measures and the value needed measures. The minimum values and maximum values in ranges of the value present measures and the value needed measures are merged as exemplarily illustrated in FIG. 38. If the value present minimum is below the value needed minimum, the delta is computed. If the value present maximum is greater than the value needed maximum, the delta is computed. Over/under adjustment is performed on the delta as done in the Percents match formula. The match score module 164 computes the raw score as over/under adjustment*MIN (VALUE PRESENT MAX, VALUE NEEDED MAX)/VALUE_NEEDED_MAX. The match score module 164 computes the nested raw score and the attribute match score for SCORE_ID 102 similar to the computation of the nested raw score and the attribute match score for SCORE_ID 102 as disclosed in the detailed description of FIGS. 29A-29B. The attribute match score and the Has_Requirements from the row with ATTR_ID 2 is input into the Need Fit Score and Need_Has_Requirements columns in the fit score table exemplarily illustrated in FIG. 19 and the final score for the bi-directional match between CAND_1 and JOB_1 is found as disclosed in the detailed description of FIG. 19.

Figure 39:
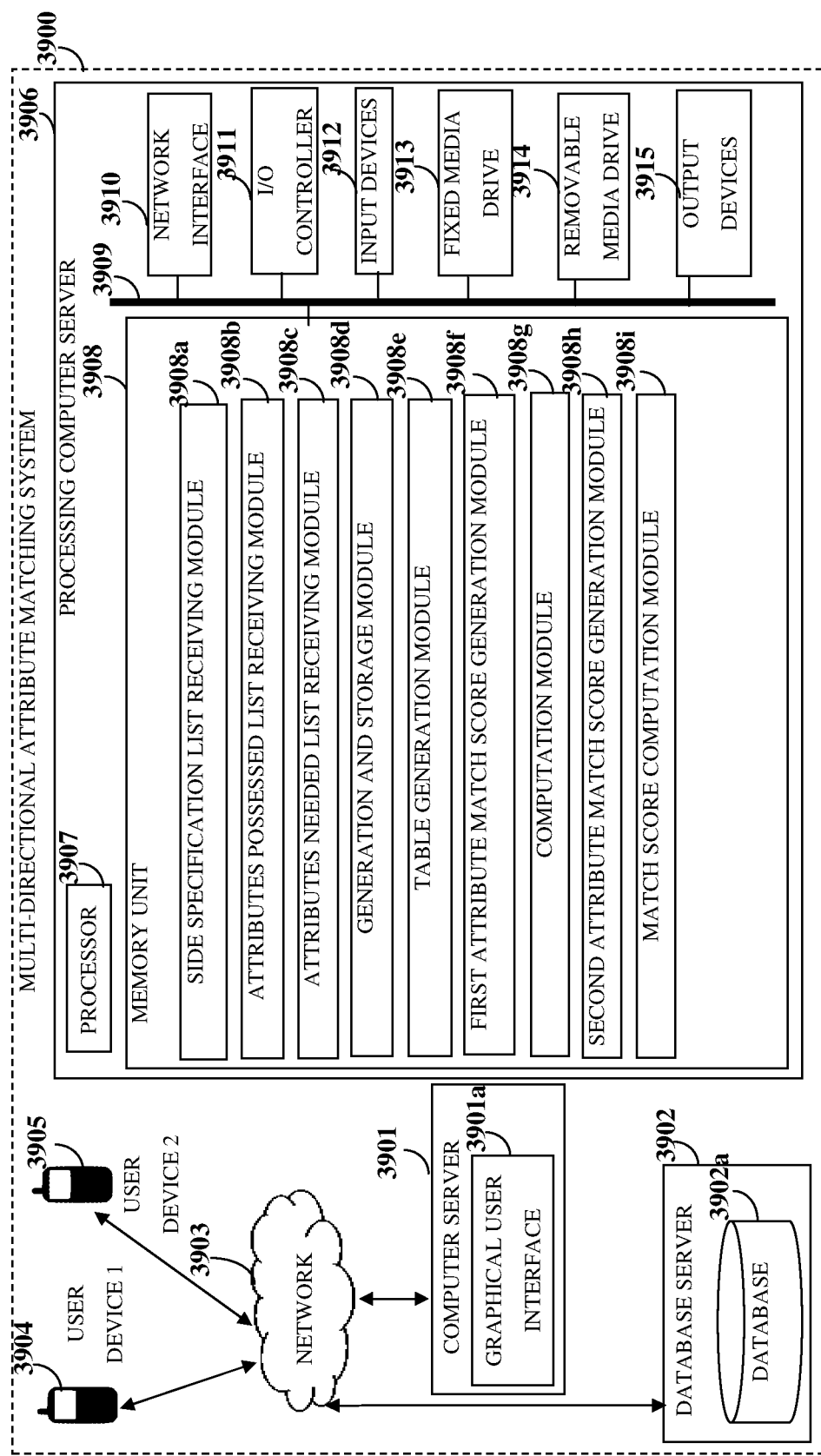
FIG. 39 exemplarily illustrates a multi-directional attribute matching system incorporating a computer system architecture comprising at least one computer server for determining a degree of match between the item profiles with respective attributes possessed of varying credibility and respective attributes needed of varying importance.

FIG. 39 exemplarily illustrates a multi-directional attribute matching system (MAMS) 3900 incorporating a computer system architecture comprising at least one computer server 3901 for determining a degree of match between the item profiles with respective attributes possessed of varying credibility and respective attributes needed of varying importance. The multi-directional attribute matching system (MAMS) 3900 is a computer system that is programmable using a high level computer programming language. In an embodiment, the multi-directional attribute matching system (MAMS) 3900 uses programmed and purposeful hardware. The multi-directional attribute matching system (MAMS) 3900 is implemented on a computing device, for example, a personal computer, a tablet computing device, a mobile computer, a portable computing device, a laptop, a touch device, a workstation, a server, portable electronic device, a network enabled computing device, an interactive network enabled communication device, any other suitable computing equipment, combinations of multiple pieces of computing equipment, etc. In an embodiment, the computing equipment is used to implement applications such as media playback applications, a web browser, an electronic mail (email) application, a calendar application, etc. In another embodiment, the computing equipment, for example, one or more servers are associated with one or more online services. In an embodiment, the multi-directional attribute matching system (MAMS) 3900 is configured as a web based platform, for example, a website hosted on a server or a network of servers.

The multi-directional attribute matching system (MAMS) 3900 comprises at least one computer server 3901, at least one database server 3902, and at least one processing computer server 3906. The computer server 3901 renders graphical user interfaces 3901a to multiple user devices 3904 and 3905. As used herein, user devices are, for example, personal computers, laptops, tablet computing devices, mobile computers, mobile phones, smartphones, portable computing devices, personal digital assistants, laptops, wearable computing devices such as the Google Glass® of Google Inc., the Apple Watch® of Apple Inc., etc., touch centric devices, workstations, client devices, portable electronic devices, network enabled computing devices, interactive network enabled communication devices, any other suitable computing equipment, combinations of multiple pieces of computing equipment, etc., possessed by different entities, for interacting with the MAMS 3900. In an embodiment, the user devices 3904 and 3905 are hybrid computing devices that combine the functionality of multiple devices. Examples of a hybrid computing device comprise a cellular telephone that includes a media player functionality, a gaming device that includes a wireless communications capability, a cellular telephone that includes a document reader and multimedia functions, and a portable device that has network browsing, document rendering, and network communication capabilities. For purposes of illustration, the user devices 3904 and 3905 are user devices of a recruitment system of entities such as offices, educational institutes, hospitals, restaurants, etc.

The processing computer server 3906 comprising at least one processor is communicatively coupled to the database server 3902 via a network 3903. The network is, for example, one of the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks. In an embodiment, the multi-directional attribute matching system (MAMS) 3900 is accessible to the satellite internet of users, for example, through a broad spectrum of technologies and devices such as cellular phones, tablet computing devices, etc., with access to the internet.

As exemplarily illustrated in FIG. 39, the multi-directional attribute matching system (MAMS) 3900 comprises a non-transitory computer readable storage medium, for example, a memory unit 3908 for storing programs and data, and at least one processor 3907 communicatively coupled to the non-transitory computer readable storage medium. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media including a dynamic random access memory (DRAM), which typically constitute a main memory. Volatile media comprise, for example, a register memory, a processor cache, a random access memory (RAM), etc. Transmission media comprise, for example, coaxial cables, copper wire, fiber optic cables, modems, etc., including wires that constitute a system bus coupled to the processor 3907. The non-transitory computer readable storage medium is configured to store computer program instructions defined by modules, for example, 3908*a*, 3908*b*, 3908*c*, 3908*d*, 3908*e*, 3908*f*, 3908*g*, 3908*h*, 3908*i*, 141, 143, 145, 156, 161, 164, 177 etc., of the multi-directional attribute matching system (MAMS) 3900. The modules 3908*a*, 3908*b*, 3908*c*, 3908*d*, 3908*e*, 3908*f*, 3908*g*, 3908*h*, 3908*i*, 141, 143, 145, 156, 161, 164, 177 are installed and stored in the memory unit 3908 of the multi-directional attribute matching system (MAMS) 3900. The memory unit 3908 is used for storing program instructions, applications, and data. The memory unit 3908 is, for example, a random access memory (RAM) or another type of dynamic storage device that stores information and instructions for execution by the processor 3907. The memory unit 3908 also stores temporary variables and other intermediate information used during execution of the instructions by the processor 3907. The multi-directional attribute matching system (MAMS) 3900 further comprises a read only memory (ROM) or another type of static storage device that stores static information and instructions for the processor 3907.

The processor 3907 is configured to execute the computer program instructions defined by the modules, for example, 3908*a*, 3908*b*, 3908*c*, 3908*d*, 3908*e*, 3908*f*, 3908*g*, 3908*h*, 3908*i* 141, 143, 145, 156, 161, 164, 177 etc., of the multi-directional attribute matching system (MAMS) 3900. The processor 3907 refers to any of one or more microprocessors, central processing unit (CPU) devices, finite state machines, computers, microcontrollers, digital signal processors, logic, a logic device, an user circuit, an application specific integrated circuit (ASIC), a field-programmable gate array (FPGA), a chip, etc., or any combination thereof, capable of executing computer programs or a series of commands, instructions, or state transitions. In an embodiment, the processor 3907 is implemented as a processor set comprising, for example, a programmed microprocessor and a math or graphics co-processor. The processor 3907 is selected, for example, from the Intel® processors such as the Itanium® microprocessor or the Pentium® processors, Advanced Micro Devices (AMD®) processors such as the Athlon® processor, UltraSPARC® processors, microSPARC® processors, hp® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The multi-directional attribute matching system (MAMS) 3900 disclosed herein is not limited to employing a processor 3907. In an embodiment, the multi-directional attribute matching system (MAMS) 3900 employs a controller or a microcontroller.

As exemplarily illustrated in FIG. 39, the multi-directional attribute matching system (MAMS) 3900 further comprises a data bus 3909, a network interface 3910, an input/output (I/O) controller 3911, input devices 3912, a fixed media drive 3913 such as a hard drive, a removable media drive 3914 for receiving removable media, output devices 3915, etc. The data bus 3909 permits communications between the modules, for example, 3908*a*, 3908*b*, 3908*c*, 3908*d*, 3908*e*, 3908*f*, 3908*g*, 3908*h*, 3908*i* 141, 143, 145, 156, 161, 164, 177 etc., of the multi-directional attribute matching system (MAMS) 3900. The network interface 3910 enables connection of the multi-directional attribute matching system (MAMS)) 3900 to the network 3903. In an embodiment, the network interface 3910 is provided as an interface card also referred to as a line card. The network interface 3910 comprises, for example, one or more of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on a transmission control protocol (TCP)/internet protocol (IP), interfaces based on wireless communications technology such as satellite technology, radio frequency (RF) technology, near field communication, etc. The I/O controller 3911 controls input actions and output actions performed by the multi-directional attribute matching system (MAMS) 3900.

The display screen, via the graphical user interface (GUI) 3901*a*, displays the multi-directional match between different item profiles. The display screen is, for example, a video display, a liquid crystal display, a plasma display, an organic light emitting diode (OLED) based display, etc. The multi-directional attribute matching system (MAMS) 3900 provides the GUI 3901*a* on the display screen. The GUI 3901*a* is, for example, an online web interface, a web based downloadable application interface, a mobile based downloadable application interface, etc. The display screen displays the GUI 3901*a*. The input devices 3912 are used for inputting data into the multi-directional attribute matching system (MAMS) 3900. The input devices 3912 are, for example, a keyboard such as an alphanumeric keyboard, a microphone, a joystick, a pointing device such as a computer mouse, a touch pad, a light pen, a physical button, a touch sensitive display device, a track ball, a pointing stick, any device capable of sensing a tactile input, etc. The output devices 3915 output the results of operations performed by the multi-directional attribute matching system (MAMS) 3900.

The multi-directional attribute matching system (MAMS) 3900 comprises at least one computer server 3901, one database server 3902, and at least one processing computer server 3906. The at least one computer server 3901 of the multi-directional attribute matching system (MAMS) 3900 determines a degree of match between the item profiles with respective attributes possessed of varying credibility and respective attributes needed of varying importance. The at least one database server 3902 of the multi-directional attribute matching system (MAMS) 3900 hosts one or more databases for storing a predefined attribute list, an attributes possessed list, an attributes needed list, and a matched attribute list.

The modules of the multi-directional attribute matching system (MAMS) 3900 comprise a side specification list receiving module 3908a, an attributes possessed list receiving module 3908b, an attributes needed list receiving module 3908c, a generation and storage module 3908d, a table generation module 3908e, a first attribute match score generation module 3908f, a computation module 3908g, a second attribute match score generation module 3908h, a match score computation module 3908i, a combine module 141, an attribute entry match module 156, a create matched attribute module 161, a match score module 164, and a final score module 177. The combine module 141 further comprises a compute attribute value module 143 and an attribute combiner 145. The combine module 141, the attribute entry match module 156, the create matched attribute module 161, the match score module 164 and the final score module 177 are exemplarily illustrated in the detailed description of FIGS. 10-16. The side specification list receiving module 3908a of the multi-directional attribute matching system (MAMS) 3900 receives a side specification list comprising rows that specify one of importance weighted rollup along with subrows of importance weighted rollup and inclusion of a specific attribute score formed by matching attributes needed by an item profile against item possessed from another item profile. The side specification rows are listed as parent rows or hierarchical sub-rows of the parent rows in the side specification list. The profiles are represented by abstract place holder names in side specification rows. When invoked with id of a parent row in the side specification list, and with tuples that associate profile names to actual profile ids, entries are made in a fit score table corresponding to the parent row from the side specification list and for each of the hierarchical sub-rows of the parent rows using actual profile ids. The rows inserted into the fit score table retain links to the side list to which the inserted rows correspond to the side specification table.

The attributes possessed list receiving module 3908b of the multi-directional attribute matching system (MAMS) 3900 receives the attributes possessed list comprising multiple attributes possessed, a profile_id, an attribute_id from a predefined attribute list. The attributes possessed are listed as parent attributes or hierarchical sub-attributes of the parent attributes in the predefined attribute list. The attributes possessed list comprises the attributes possessed and first tuples corresponding to the attributes possessed. The first tuples comprise value present measures corresponding to the attributes possessed and credibility measures indicating credibility of the value present measures. The attributes needed list receiving module 3908c of the multi-directional attribute matching system (MAMS) 3900 receives the attributes needed list. The attributes needed list comprising the attributes needed from the predefined attribute list. The attributes needed are listed as parent attributes or hierarchical sub-attributes of the parent attributes in the predefined attribute list. The attributes needed list comprises the attributes needed, and second tuples corresponding to the attributes needed. The second tuples comprise requirement measures, corresponding attribute importance measures, and value needed measures associated with the attributes needed. The value present measures and the value needed measures are of different data types comprising a percentage, a numerical range, a Boolean value, and a text.

The generation and storage module 3908d of the multi-directional attribute matching system (MAMS) 3900 generates and stores, for every row in the fit score table that specifies a match, a raw score and Has Requirements measure computed using the Item_id and Profile_id of the item with attributes possessed, and the Item_id and Profile_id of the item with attributes needed. The table generation module 3908e of the multi-directional attribute matching system (MAMS) 3900 generates a table of matched attributes by creating a row for the attribute possessed identified by the attribute id from the side specification entry for the match and from the profile_id of the item with the attributes needed, and for all of its sub-attributes, and with the values from the attributes possessed table for the attribute and for the profile_id of the item with the attributes possessed.

The first attribute match score generation module 3908f of the multi-directional attribute matching system (MAMS) 3900 generates an attribute match score for each of the matched attributes in the generated matched attribute list from a raw score corresponding to each of the matched attributes using the value possessed measures and the credibility measures corresponding to the attributes possessed, and the value needed measures, the attribute importance measures, and the requirement measures associated with the attributes needed. The computation module 3908g of the multi-directional attribute matching system (MAMS) 3900 computes a nested raw score corresponding to the parent attribute using the attribute match scores corresponding to the hierarchical sub-attributes, if a matched attribute is a parent attribute and the other matched attributes are hierarchical sub-attributes of the parent attribute in the matched attribute list.

The second attribute match score generation module 3908h of the multi-directional attribute matching system (MAMS) 3900 generates an attribute match score and Has Requirements measure for the parent attribute using the nested raw score and attribute importance measure corresponding to the parent attribute. The score match row identified by the attribute id from side specification entry for the match becomes the raw score in the Fit Score table. The Has Requirement measure becomes the Has Requirement measure in the same row in the Fit Score table identified by the attribute id from the side specification entry for the match. A match score in the Fit Score table for the corresponding raw score is computed by multiplying the raw score match by the importance measures from the linked side specification list row.

The match score computation module 3908i of the multi-directional attribute matching system (MAMS) 3900 computes a match score for every row in the fit score table that specifies a rollup using the importances as weights in the aggregation of the match scores of the sub rows into a single match score, wherein the Has Requirements measure is true, if the Has Requirements measure is true for every sub-row. The multi-directional attribute matching system uses the match score and Has Requirements measure of the parent row in the Fit Score table as the final score defining the degree of match between each of the items.

The database server 3902 of the multi-directional attribute matching system (MAMS) 3900 can be any storage area or medium that can be used for storing data and files. In an embodiment, the multi-directional attribute matching system (MAMS) 3900 stores the received information in external databases, for example, a structured query language (SQL) data store or a not only SQL (NoSQL) data store such as the Microsoft® SQL Server®, the Oracle® servers, the MySQL® database of MySQL AB Company, the mongoDB® of MongoDB, Inc., the Neo4j graph database of Neo Technology Corporation, the Cassandra database of the Apache Software Foundation, the HBase™ database of the Apache Software Foundation, etc. In an embodiment, the database server 3902 can be remotely accessed by the multi-directional attribute matching system (MAMS) 3900 via the network 3903. In another embodiment, the database server 3902 is configured as a cloud based database implemented in a cloud computing environment, where computing resources are delivered as a service over the network 3903.

Computer applications and programs are used for operating the modules of the multi-directional attribute matching system (MAMS) 3900. The programs are loaded onto the fixed media drive 3913 and into the memory unit 3908 of the multi-directional attribute matching system (MAMS) 3900 via the removable media drive 3914. In an embodiment, the computer applications and programs are loaded directly on the multi-directional attribute matching system (MAMS) 3900 via the network 3903. The processor 3907 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., etc. The multi-directional attribute matching system (MAMS) 3900 employs the operating system for performing multiple tasks. The operating system is responsible for management and coordination of activities and sharing of resources of the multi-directional attribute matching system (MAMS) 3900. The operating system further manages security of the multi-directional attribute matching system (MAMS) 3900, peripheral devices connected to the multi-directional attribute matching system (MAMS) 3900, and network connections. The operating system employed on the multi-directional attribute matching system (MAMS) 3900 recognizes, for example, inputs provided by a user of the multi-directional attribute matching system (MAMS) 3900 using one of the input devices 3912, the output devices 3915, files, and directories stored locally on the fixed media drive 3913. The operating system on the multi-directional attribute matching system (MAMS) 3900 executes different programs using the processor 3907. The processor 3907 and the operating system together define a computer platform for which application programs in high level programming languages are written.

The processor 3907 of the multi-directional attribute matching system (MAMS) 3900 retrieves instructions defined by the side specification list receiving module 3908a, the attributes possessed list receiving module 3908b, the attributes needed list receiving module 3908c, the generation and storage module 3908d, the table generation module 3908e, the first attribute match score generation module 3908f, the computation module 3908g, the second attribute match score generation module 3908h, and the match score computation module 3908i, for performing respective functions disclosed above. The processor 3907 retrieves instructions for executing the modules, for example, 3908a, 3908b, 3908c, 3908d, 3908e, 3908f, 3908g, 3908h, 3908i, 141, 143, 145, 156, 161, 164, 177 etc., of the multi-directional attribute matching system (MAMS) 3900 from the memory unit 3908. A program counter determines the location of the instructions in the memory unit 3908. The program counter stores a number that identifies the current position in the program of each of the modules, for example, 3908a, 3908b, 3908c, 3908d, 3908e, 3908f, 3908g, 3908h, 3908i, 141, 143, 145, 156, 161, 164, 177 etc., of the multi-directional attribute matching system (MAMS) 3900. The instructions fetched by the processor 3907 from the memory unit 3908 after being processed are decoded. The instructions are stored in an instruction register in the processor 3907. After processing and decoding, the processor 3907 executes the instructions, thereby performing one or more processes defined by those instructions.

At the time of execution, the instructions stored in the instruction register are examined to determine the operations to be performed. The processor 3907 then performs the specified operations. The operations comprise arithmetic operations and logic operations. The operating system performs multiple routines for performing a number of tasks required to assign the input devices 3912, the output devices 3915, and the memory unit 3908 for execution of the modules, for example, 3908a, 3908b, 3908c, 3908d, 3908e, 3908f, 3908g, 3908h, 3908i, 141, 143, 145, 156, 161, 164, 177 etc., of the multi-directional attribute matching system (MAMS) 3900. The tasks performed by the operating system comprise, for example, assigning memory to the modules, for example, 3908a, 3908b, 3908c, 3908d, 3908e, 3908f, 3908g, 3908h, 3908i, 141, 143, 145, 156, 161, 164, 177 etc., of the multi-directional attribute matching system (MAMS) 3900 and to data used by the multi-directional attribute matching system (MAMS) 3900, moving data between the memory unit 3908 and disk units, and handling input/output operations. The operating system performs the tasks on request by the operations and after performing the tasks, the operating system transfers the execution control back to the processor 3907. The processor 3907 continues the execution to obtain one or more outputs. The outputs of the execution of the modules, for example, 3908a, 3908b, 3908c, 3908d, 3908e, 3908f, 3908g, 3908h, 3908i, 141, 143, 145, 156, 161, 164, 177 etc., of the multi-directional attribute matching system (MAMS) 3900 are displayed to a user of the multi-directional attribute matching system (MAMS) 3900 on the output device 3915. In an embodiment, one or more portions of the multi-directional attribute matching system (MAMS) 3900 are distributed across one or more computer systems (not shown) coupled to the network 3903.

The non-transitory computer readable storage medium having embodied thereon, computer program codes comprising instructions executable by at least one processor 3907 for determining a degree of match between the item profiles with respective attributes possessed of varying credibility and respective attributes needed of varying importance. The computer program codes comprise a first computer program code for receiving a side specification list comprising rows that specify one of importance weighted rollup along with subrows of importance weighted rollup and inclusion of a specific attribute score formed by matching attributes needed by an item profile against item possessed from another item profile, wherein the side specification rows are listed as one of parent rows and hierarchical sub-rows of the parent rows in the side specification list, wherein the profiles are represented by abstract place holder names in side specification rows, wherein entries are made in a fit score table corresponding to the parent row from the side specification list and for each of the hierarchical sub-rows of the parent rows using actual profile ids when invoked with id of a parent row in the side specification list, and with tuples that associate profile names to actual profile ids, and wherein the rows inserted into the fit score table retain links to the side list to which the inserted rows correspond to the side specification table; a second computer program code for receiving the attributes possessed list comprising multiple attributes possessed, a profile_id, an attribute_id from a predefined attribute list, wherein the attributes possessed are listed as one of parent attributes and hierarchical sub-attributes of the parent attributes in the predefined attribute list, wherein the attributes possessed list comprises the attributes possessed and first tuples corresponding to the attributes possessed, and wherein the first tuples comprise value present measures corresponding to the attributes possessed and credibility measures indicating credibility of the value present measures; a third computer program code for receiving the attributes needed list comprising the attributes needed from the predefined attribute list, wherein the attributes needed are listed as one of parent attributes and hierarchical sub-attributes of the parent attributes in the predefined attribute list, and wherein the attributes needed list comprises the attributes needed, and second tuples corresponding to the attributes needed, wherein the second tuples comprise requirement measures, corresponding attribute importance measures, and value needed measures associated with the attributes needed, and wherein the value present measures and the value needed measures are of different data types comprising a percentage, a numerical range, a Boolean value, and a text; a fourth computer program code for generating and storing, for every row in the fit score table that specifies a match, a raw score and Has Requirements measure computed using the Item_id and Profile_id of the item with attributes possessed, and the Item_id and Profile_id of the item with attributes needed; a fifth computer program code for generating a table of matched attributes by creating a row for the attribute possessed identified by the attribute id from the side specification entry for the match and from the profile_id of the item with the attributes needed, and for all of its sub-attributes, and with the values from the attributes possessed table for the attribute and for the profile_id of the item with the attributes possessed; a sixth computer program code for generating an attribute match score for each of the matched attributes in the generated matched attribute list from a raw score corresponding to each of the matched attributes using the value possessed measures and the credibility measures corresponding to the attributes possessed, and the value needed measures, the attribute importance measures, and the requirement measures associated with the attributes needed; a seventh computer program code for computing a nested raw score corresponding to the parent attribute using the attribute match scores corresponding to the hierarchical sub-attributes, if a matched attribute is a parent attribute and the other matched attributes are hierarchical sub-attributes of the parent attribute in the matched attribute list; an eighth computer program code for generating an attribute match score and Has Requirements measure for the parent attribute using the nested raw score and attribute importance measure corresponding to the parent attribute, wherein the score match row identified by the attribute id from side specification entry for the match becomes the raw score in the Fit Score table, wherein the has requirement measure becomes the has requirement measure in the same row in the Fit Score table identified by the attribute id from the side specification entry for the match, and wherein a match score in the Fit Score table for the corresponding raw score is computed by multiplying the raw score match by the importance measures from the linked side specification list row; and a ninth computer program code for computing a match score for every row in the fit score table that specifies a rollup using the importances as weights in the aggregation of the match scores of the sub rows into a single match score, wherein the Has Requirements measure is true, if the Has Requirements measure is true for every sub-row, and wherein the multi-directional attribute matching system uses the match score and Has Requirements measure of the parent row in the Fit Score table as the final score defining the degree of match between each of the items.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor or a similar device. In different embodiments, the "non-transitory computer readable storage media" further refers to a single medium or multiple media, for example, a centralized database, a distributed database, and/or associated caches and servers that store one or more sets of instructions that are read by a computer, a processor or a similar device. The "non-transitory computer readable storage media" further refers to any medium capable of storing or encoding a set of instructions for execution by a computer, a processor or a similar device and that causes a computer, a processor or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in a number of manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Pen®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the computer implemented method and the multi-directional attribute matching system (MAMS) 3900 disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the computer implemented method and the multi-directional attribute matching system (MAMS) 3900 disclosed herein are implemented as programmed elements, or non-programmed elements, or any suitable combination thereof.

Where databases 3902*a* are described such as the database server 3902, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats including relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the multi-directional attribute matching system (MAMS) 3900, the databases are integrated to communicate with each other for enabling simultaneous updates of data linked across the databases, when there are any updates to the data in one of the databases.

The computer implemented method and the multi-directional attribute matching system (MAMS) 3900 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The computer implemented method and the multi-directional attribute matching system (MAMS) 3900 disclosed herein are not limited to a particular computer system platform, processor, operating system, or network. In an embodiment, one or more aspects of the computer implemented method and the multi-directional attribute matching system (MAMS) 3900 disclosed herein are distributed among one or more computer systems, for example, servers configured to provide one or more services to one or more client computers, or to perform a complete task in a distributed system. For example, one or more aspects of the computer implemented method and the multi-directional attribute matching system (MAMS) 3900 disclosed herein are performed on a client-server system that comprises components distributed among one or more server systems that perform multiple functions according to various embodiments. These components comprise, for example, executable, intermediate, or interpreted code, which communicate over a network using a communication protocol. The computer implemented method and the multi-directional attribute matching system (MAMS) 3900 disclosed herein are not limited to be executable on any particular system or group of systems, and are not limited to any particular distributed architecture, network, or communication protocol.

The foregoing examples have been provided merely for explanation and are in no way to be construed as limiting of the method and the multi-directional attribute matching system (MAMS) 3900 disclosed herein. While the method and the MAMS 3900 have been described with reference to various embodiments, it is understood that the words, which have been used herein, are words of description and illustration, rather than words of limitation. Furthermore, although the method and the MAMS 3900 have been described herein with reference to particular means, materials, and embodiments, the method and the MAMS 3900 are not intended to be limited to the particulars disclosed herein; rather, the method and the MAMS 3900 extend to all functionally equivalent structures, methods and uses, such as are within the scope of the appended claims. While multiple embodiments are disclosed, it will be understood by those skilled in the art, having the benefit of the teachings of this specification, that the method and the MAMS 3900 disclosed herein are capable of modifications and other embodiments may be effected and changes may be made thereto, without departing from the scope and spirit of the method and the MAMS 3900 disclosed herein.

We claim:

1. A computer system for multi-directional attribute matching, said computer system comprising:
    at least one computer server for determining a degree of match between item profiles with respective attributes possessed of varying credibility and respective attributes needed of varying importance;
    at least one database server hosting one or more databases for storing a predefined attribute list, an attributes possessed list, an attributes needed list, and a matched attribute list;
    at least one processing computer server comprising at least one processor communicatively coupled to the database server via a network, said at least one processor configured to execute computer program instructions defined by modules of said multi-directional attribute matching system, said modules of said computer system for multi-directional attribute matching system comprising:
        a side specification list receiving module for receiving a side specification list comprising hundreds of rows that specify one of importance weighted rollup along with subrows of importance weighted rollup and inclusion of a specific attribute score formed by matching attributes needed by an item profile against attributes possessed by another item profile, wherein said side specification rows are listed as one of parent rows and hierarchical sub-rows of said parent rows in said side specification list, wherein said item profiles are represented by abstract place holder names in side specification rows, wherein entries are made in a fit score table corresponding to said parent row from said side specification list and for each of said hierarchical sub-rows of said parent rows using actual profile ids when invoked with id of a parent row in said side specification list, and with tuples that associate profile names to actual profile ids, wherein rows inserted into said fit score table retain links to said side list to which said rows inserted correspond to said side specification table, and wherein said multi-directional attribute matching, by said computer system, comprises matching of the hundreds of rows from the side specification list based on multiple interrelated factors;

an attributes possessed list receiving module for receiving said attributes possessed list comprising attributes possessed, a profile_id, an attribute_id from said predefined attribute list, wherein said attributes possessed are listed as one of parent attributes and hierarchical sub-attributes of said parent attributes in said predefined attribute list, wherein said attributes possessed list comprises said attributes possessed and first tuples corresponding to said attributes possessed, and wherein said first tuples comprise value present measures corresponding to said attributes possessed and credibility measures indicating credibility of said value present measures;

an attributes needed list receiving module for receiving said attributes needed list comprising said attributes needed from said predefined attribute list, wherein said attributes needed are listed as one of parent attributes and hierarchical sub-attributes of said parent attributes in said predefined attribute list, and wherein said attributes needed list comprises said attributes needed, and second tuples corresponding to said attributes needed, wherein said second tuples comprise requirement measures, corresponding attribute importance measures, and value needed measures associated with said attributes needed, and wherein said value present measures and said value needed measures are of different data types comprising a percentage, a numerical range, a Boolean value, and a text;

a generation and storage module for generating and storing, for every row in the fit score table that specifies a match, a raw score and has requirements measure computed using item_id and the profile_id of item with attributes possessed, and the item_id and the profile_id of the item with said attributes needed;

a table generation module for generating a table of matched attributes by creating a row for the attribute possessed identified by the attribute id from the side specification entry for the match and from the profile_id of the item with the attributes needed, and for all of its sub-attributes, and with the values from attributes possessed table for the attribute and for the profile_id of the item with the attributes possessed;

a first attribute match score generation module for generating an attribute match score for each of the matched attributes in a generated matched attribute list from a raw score corresponding to each of the matched attributes using the value possessed measures and the credibility measures corresponding to the attributes possessed, and the value needed measures, the attribute importance measures, and the requirement measures associated with the attributes needed;

a computation module for computing a nested raw score corresponding to the parent attribute using attribute match scores corresponding to the hierarchical sub-attributes, if a matched attribute is a parent attribute and other matched attributes are hierarchical sub-attributes of the parent attribute in the matched attribute list;

a second attribute match score generation module for generating an attribute match score and has requirements measure for the parent attribute using the nested raw score and attribute importance measure corresponding to the parent attribute, wherein said score match row identified by said attribute id from side specification entry for said match becomes said raw score in said fit score table, wherein said has requirements measure becomes said has requirements measure in same row in said fit score table identified by said attribute id from said side specification entry for said match, and wherein a match score in said fit score table for said corresponding raw score is computed by multiplying said raw score match by said importance measures from said linked side specification list row; and a match score computation module for computing the match score for every row in the fit score table that specifies a rollup using importances as weights in aggregation of the match scores of the sub rows into a single match score, wherein said has requirements measure is true, if said has requirements measure is true for every sub-row, and wherein said multi-directional attribute matching system uses the single match score and said has requirements measure of said parent row in the fit score table as final score defining said degree of match between each of said items;

wherein input data to said computer system comprising the side specification list, the attributes possessed list, and the attributes needed list, is processed and transformed into output data comprising the table of matched attributes, the raw score, the nested raw score, the attribute match score, different types of the match scores, and the final score for determining said degree of match between said item profiles with the respective attributes possessed of varying credibility and the respective attributes needed of varying importance.

2. The computer system of claim 1, wherein side match is one parent attribute needed, and all of its subrows of one profile id against said attributes possessed from another profile_id.

3. The computer system of claim 1, wherein said attributes possessed and said attributes needed are properties or domains of expertise of items extracted from said item profiles in said predefined attribute list.

4. The computer system of claim 1, wherein said value needed measure is a quantized value of proficiency of an item in satisfying requirements of a need.

5. The computer system of claim 1, wherein said requirement measures is a Boolean value associated with an attribute needed representing that said value present measures of said attribute possessed by an item is required to be possessed to some degree where said attribute possessed is identical to said attribute needed.

6. The computer system of claim 1, wherein said attribute importance measure is a quantized value representing a degree to which presence of an attribute needed in said attributes possessed list is needed for the computation of the parent attribute needed for an item.

7. A method for multi-directional attribute matching, said method comprising:

providing a computer system comprising a computer system architecture with a plurality of servers for determining a degree of match between item profiles with respective attributes possessed of varying credibility and respective attributes needed of varying importance;

receiving a side specification list comprising hundreds of rows that specify one of importance weighted rollup along with subrows of importance weighted rollup and inclusion of a specific attribute score formed by matching attributes needed by an item profile against attributes possessed by another item profile, wherein said side specification rows are listed as one of parent rows and hierarchical sub-rows of said parent rows in said side specification list, wherein said item profiles are represented by abstract place holder names in side specification rows, wherein entries are made in a fit score table corresponding to said parent row from said side specification list and for each of said hierarchical sub-rows of said parent rows using actual profile ids when invoked with id of a parent row in said side specification list, and with tuples that associate profile names to actual profile ids, wherein rows inserted into said fit score table retain links to said side list to which said rows inserted correspond to said side specification table, and wherein said multi-directional attribute matching, by said computer system, comprises matching of the hundreds of rows from the side specification list based on multiple interrelated factors;

receiving said attributes possessed list comprising attributes possessed, a profile_id, an attribute_id from a predefined attribute list, wherein said attributes possessed are listed as one of parent attributes and hierarchical sub-attributes of said parent attributes in said predefined attribute list, wherein said attributes possessed list comprises said attributes possessed and first tuples corresponding to said attributes possessed, and wherein said first tuples comprise value present measures corresponding to said attributes possessed and credibility measures indicating credibility of said value present measures;

receiving attributes needed list comprising said attributes needed from said predefined attribute list, wherein said attributes needed are listed as one of parent attributes and hierarchical sub-attributes of said parent attributes in said predefined attribute list, and wherein said attributes needed list comprises said attributes needed, and second tuples corresponding to said attributes needed, wherein said second tuples comprise requirement measures, corresponding attribute importance measures, and value needed measures associated with said attributes needed, and wherein said value present measures and said value needed measures are of different data types comprising a percentage, a numerical range, a Boolean value, and a text;

generating and storing, for every row in the fit score table that specifies a match, a raw score and has requirements measure computed using item_id and the profile_id of item with attributes possessed, and the item_id and the profile_id of the item with said attributes needed;

generating a table of matched attributes by creating a row for attribute possessed identified by the attribute id from the side specification entry for the match and from the profile_id of the item with the attributes needed, and for all of its sub-attributes, and with the values from attributes possessed table for the attribute and for the profile_id of the item with the attributes possessed;

generating an attribute match score for each of the matched attributes in a generated matched attribute list from a raw score corresponding to each of the matched attributes using the value possessed measures and the credibility measures corresponding to the attributes possessed, and the value needed measures, the attribute importance measures, and the requirement measures associated with the attributes needed;

computing a nested raw score corresponding to the parent attribute using attribute match scores corresponding to the hierarchical sub-attributes, if a matched attribute is a parent attribute and other matched attributes are hierarchical sub-attributes of the parent attribute in a matched attribute list;

generating an attribute match score and said has requirements measure for the parent attribute using the nested raw score and attribute importance measure corresponding to the parent attribute, wherein said score match row identified by said attribute id from side specification entry for said match becomes said raw score in said fit score table, wherein said has requirements measure becomes said has requirements measure in same row in said fit score table identified by said attribute id from said side specification entry for said match, and wherein a match score in said fit score table for said corresponding raw score is computed by multiplying said raw score match by said importance measures from said linked side specification list row; and computing a match score for every row in the fit score table that specifies a rollup using importances as weights in aggregation of the match scores of the sub rows into a single match score, wherein said has requirements measure is true, if said has requirements measure is true for every sub-row, and wherein said multi-directional attribute matching system uses the single match score and said has requirements measure of said parent row in the fit score table as final score defining said degree of match between each of said items;

whereby input data to the computer system comprising the side specification list, the attributes possessed list, and the attributes needed list, is processed and transformed into output data comprising the table of matched attributes, the raw score, the nested raw score, the attribute match score, different types of the match scores, and the final score for determining said degree of match between said item profiles with the respective attributes possessed of varying credibility and the respective attributes needed of varying importance.

8. The method of claim 7, wherein side match is one parent attribute needed, and all of its subrows of one profile id against said attributes possessed from another profile_id.

9. The method of claim 7, wherein said attributes possessed and said attributes needed are properties or domains of expertise of items extracted from said item profiles in said predefined attribute list.

10. The method of claim 7, wherein said value needed measure is a quantized value of proficiency of an item in satisfying requirements of a need.

11. The method of claim 7, wherein said requirement measures is a Boolean value associated with an attribute needed representing that said value present measures of said attribute possessed by an item is required to be possessed to some degree where said attribute possessed is identical to said attribute needed.

12. The method of claim 7, wherein said attribute importance measure is a quantized value representing a degree to which presence of an attribute needed in said attributes possessed list is needed for the computation of the parent attribute needed for an item.

13. A non-transitory computer readable storage medium having embodied thereon, computer program codes comprising instructions executable by at least one processor of a computer system for multi-directional attribute matching, said computer program codes comprising:

a first computer program code for receiving a side specification list comprising hundreds of rows that specify one of importance weighted rollup along with subrows of importance weighted rollup and inclusion of a specific attribute score formed by matching attributes needed by an item profile against attributes possessed by another item profile, wherein said side specification rows are listed as one of parent rows and hierarchical sub-rows of said parent rows in said side specification list, wherein said item profiles are represented by abstract place holder names in side specification rows, wherein entries are made in a fit score table corresponding to said parent row from said side specification list and for each of said hierarchical sub-rows of said parent rows using actual profile ids when invoked with id of a parent row in said side specification list, and with tuples that associate profile names to actual profile ids, wherein rows inserted into said fit score table retain links to said side list to which said rows inserted correspond to said side specification table, and wherein said multi-directional attribute matching, by said computer system, comprises matching of the hundreds of rows from the side specification list based on multiple interrelated factors;

a second computer program code for receiving said attributes possessed list comprising attributes possessed, a profile_id, an attribute_id from a predefined attribute list, wherein said attributes possessed are listed as one of parent attributes and hierarchical sub-attributes of said parent attributes in said predefined attribute list, wherein said attributes possessed list comprises said attributes possessed and first tuples corresponding to said attributes possessed, and wherein said first tuples comprise value present measures corresponding to said attributes possessed and credibility measures indicating credibility of said value present measures;

a third computer program code for receiving attributes needed list comprising said attributes needed from said predefined attribute list, wherein said attributes needed are listed as one of parent attributes and hierarchical sub-attributes of said parent attributes in said predefined attribute list, and wherein said attributes needed list comprises said attributes needed, and second tuples corresponding to said attributes needed, wherein said second tuples comprise requirement measures, corresponding attribute importance measures, and value needed measures associated with said attributes needed, and wherein said value present measures and said value needed measures are of different data types comprising a percentage, a numerical range, a Boolean value, and a text;

a fourth computer program code for generating and storing, for every row in the fit score table that specifies a match, a raw score and has requirements measure computed using item_id and the profile_id of item with attributes possessed, and the item_id and the profile_id of the item with attributes needed;

a fifth computer program code for generating a table of matched attributes by creating a row for the attribute possessed identified by the attribute id from the side specification entry for the match and from the profile_id of the item with the attributes needed, and for all of its sub-attributes, and with the values from attributes possessed table for the attribute and for the profile_id of the item with the attributes possessed;

a sixth computer program code for generating an attribute match score for each of the matched attributes in a generated matched attribute list from a raw score corresponding to each of the matched attributes using the value possessed measures and the credibility measures corresponding to the attributes possessed, and the value needed measures, the attribute importance measures, and the requirement measures associated with the attributes needed;

a seventh computer program code for computing a nested raw score corresponding to the parent attribute using attribute match scores corresponding to the hierarchical sub-attributes, if a matched attribute is a parent attribute and other matched attributes are hierarchical sub-attributes of the parent attribute in a matched attribute list;

an eighth computer program code for generating an attribute match score and has requirements measure for the parent attribute using the nested raw score and attribute importance measure corresponding to the parent attribute, wherein said score match row identified by said attribute id from side specification entry for said match becomes said raw score in said fit score table, wherein said has requirements measure becomes said has requirements measure in same row in said fit score table identified by said attribute id from said side specification entry for said match, and wherein a match score in said fit score table for said corresponding raw score is computed by multiplying said raw score match by said importance measures from said linked side specification list row; and a ninth computer program code for computing the match score for every row in the fit score table that specifies a rollup using importances as weights in aggregation of the match scores of the sub rows into a single match score, wherein said has requirements measure is true, if said has requirements measure is true for every sub-row, and wherein a multi-directional attribute matching system uses the single match score and said has requirements measure of said parent row in the fit score table as final score defining a degree of match between each of said items;

wherein said computer program codes process and transform input data to said computer system comprising the side specification list, the attributes possessed list, and the attributes needed list, into output data comprising the table of matched attributes, the raw score, the nested raw score, the attribute match score, different types of the match scores, and the final score for determining said degree of match between said item profiles with the respective attributes possessed of varying credibility and the respective attributes needed of varying importance.

\* \* \* \* \*